(12) United States Patent
Arisada et al.

(10) Patent No.: US 10,530,717 B2
(45) Date of Patent: Jan. 7, 2020

(54) DISPLAY CONTROL METHOD, INFORMATION PROCESSING APPARATUS, AND TERMINAL

(71) Applicant: LINE Corporation, Shibuya-ku, Tokyo (JP)

(72) Inventors: Hiroaki Arisada, Tokyo (JP); Tasuku Okuda, Tokyo (JP)

(73) Assignee: LINE CORPORATION, Tokyo (JP)

( * ) Notice: Subject to any disclaimer, the term of this patent is extended or adjusted under 35 U.S.C. 154(b) by 115 days.

(21) Appl. No.: 15/083,490

(22) Filed: Mar. 29, 2016

(65) Prior Publication Data
US 2017/0111299 A1 Apr. 20, 2017

(30) Foreign Application Priority Data
Oct. 20, 2015 (JP) ................................. 2015-206660

(51) Int. Cl.
| | | |
|---|---|---|
| G06F 3/048 | (2013.01) | |
| H04L 12/58 | (2006.01) | |
| G06F 3/0481 | (2013.01) | |
| G06F 3/0482 | (2013.01) | |

(52) U.S. Cl.
CPC .......... *H04L 51/046* (2013.01); *G06F 3/0482* (2013.01); *G06F 3/04817* (2013.01); *H04L 51/32* (2013.01)

(58) Field of Classification Search
CPC .................................................. G06F 3/04817
See application file for complete search history.

(56) References Cited

U.S. PATENT DOCUMENTS

| | | | |
|---|---|---|---|
| 5,544,302 A | 8/1996 | Nguyen | |
| 5,598,524 A | 1/1997 | Johnston, Jr. et al. | |
| 5,696,915 A | 12/1997 | Johnston, Jr. et al. | |
| 5,754,178 A | 5/1998 | Johnston, Jr. et al. | |
| 6,778,497 B1 * | 8/2004 | Choi | ..................... H04L 1/1607 370/231 |
| 6,842,775 B1 | 1/2005 | Chastain et al. | |
| 7,030,861 B1 | 4/2006 | Westerman et al. | |
| RE40,153 E | 3/2008 | Westerman et al. | |

(Continued)

FOREIGN PATENT DOCUMENTS

| | | | |
|---|---|---|---|
| JP | 2003076639 A | 3/2003 | |
| JP | 2008149040 A | 7/2008 | |

(Continued)

OTHER PUBLICATIONS

Office Action for corresponding Japanese Application No. 2015-206660 dated Oct. 18, 2016.

(Continued)

*Primary Examiner* — Claudia Dragoescu
(74) *Attorney, Agent, or Firm* — Harness, Dickey & Pierce, P.L.C.

(57) ABSTRACT

A display control method is for performing a process executed by a computer including a processor. The process includes reporting a theme to two or more user terminals; receiving options selected at the two or more user terminals with respect to the theme, from the two or more user terminals; and displaying, on a display device, the options and user information items regarding users who selected the options, in display areas provided for the respective options.

17 Claims, 50 Drawing Sheets

(56) References Cited

U.S. PATENT DOCUMENTS

| | | |
|---|---|---|
| 8,667,403 B2 | 3/2014 | Kwon et al. |
| 9,215,412 B2 | 12/2015 | Gottlieb |
| 9,632,658 B2 | 4/2017 | Holz |
| 9,680,761 B2 | 6/2017 | Abbott |
| 9,696,867 B2 | 7/2017 | Holz |
| 9,794,080 B2 | 10/2017 | Li et al. |
| 9,804,742 B2 | 10/2017 | Lee et al. |
| 2003/0177191 A1 | 9/2003 | Kawashima et al. |
| 2004/0078443 A1 | 4/2004 | Malik |
| 2004/0078444 A1 | 4/2004 | Malik |
| 2004/0078445 A1 | 4/2004 | Malik |
| 2005/0021540 A1 | 1/2005 | McKee et al. |
| 2005/0080866 A1 | 4/2005 | Kent et al. |
| 2005/0080868 A1 | 4/2005 | Malik |
| 2006/0021023 A1* | 1/2006 | Stewart ............... G06Q 10/06 726/17 |
| 2007/0022005 A1 | 1/2007 | Hanna |
| 2007/0177803 A1 | 8/2007 | Elias et al. |
| 2007/0220005 A1 | 9/2007 | Castro Castro |
| 2008/0125158 A1 | 5/2008 | Shostak |
| 2008/0172294 A1 | 7/2008 | McGuire et al. |
| 2009/0047983 A1 | 2/2009 | Klassen et al. |
| 2009/0307623 A1 | 12/2009 | Agarawala et al. |
| 2010/0037153 A1 | 2/2010 | Rogers |
| 2010/0146405 A1 | 6/2010 | Uoi et al. |
| 2010/0207901 A1 | 8/2010 | Shin |
| 2010/0235758 A1 | 9/2010 | Shen |
| 2010/0273454 A1 | 10/2010 | Lee et al. |
| 2011/0215914 A1 | 9/2011 | Edwards |
| 2011/0246952 A1 | 10/2011 | Tsao |
| 2012/0071208 A1 | 3/2012 | Lee et al. |
| 2012/0151385 A1 | 6/2012 | Li |
| 2012/0185797 A1 | 7/2012 | Thorsen et al. |
| 2012/0317503 A1 | 12/2012 | Noh et al. |
| 2013/0069969 A1 | 3/2013 | Chang et al. |
| 2013/0073990 A1 | 3/2013 | Park et al. |
| 2013/0120280 A1 | 5/2013 | Kukulski |
| 2013/0132868 A1 | 5/2013 | Hackett et al. |
| 2013/0179800 A1 | 7/2013 | Jeong et al. |
| 2013/0346525 A1* | 12/2013 | Chen ....................... H04L 51/26 709/206 |
| 2014/0033098 A1 | 1/2014 | Uota |
| 2014/0100961 A1 | 4/2014 | Lee et al. |
| 2014/0160030 A1 | 6/2014 | Wright et al. |
| 2014/0196060 A1 | 7/2014 | Gheorghe et al. |
| 2014/0201674 A1 | 7/2014 | Holz |
| 2014/0237394 A1 | 8/2014 | Park |
| 2014/0250384 A1 | 9/2014 | Eaton et al. |
| 2014/0274217 A1 | 9/2014 | Lee et al. |
| 2014/0281862 A1* | 9/2014 | Dailey ................ G06F 17/2235 715/205 |
| 2014/0324993 A1 | 10/2014 | Li et al. |
| 2015/0074555 A1 | 3/2015 | Yoon et al. |
| 2015/0077508 A1 | 3/2015 | Gottlieb |
| 2015/0256353 A1 | 9/2015 | Busey et al. |
| 2016/0036737 A1* | 2/2016 | Atamel ................ H04L 51/046 715/752 |
| 2016/0050157 A1 | 2/2016 | Abbott |
| 2016/0065529 A1* | 3/2016 | Katayama ............ G06F 3/0481 715/752 |
| 2016/0197866 A1 | 7/2016 | Cha |
| 2016/0299636 A1* | 10/2016 | Lindenberg ........... G06F 3/0481 |
| 2017/0063744 A1* | 3/2017 | Banerjee ............... H04L 51/046 |
| 2017/0180782 A1 | 6/2017 | Li |
| 2017/0242577 A1 | 8/2017 | Tan et al. |
| 2018/0006835 A1 | 1/2018 | Li et al. |
| 2018/0101283 A1 | 4/2018 | Lee et al. |

FOREIGN PATENT DOCUMENTS

| | | |
|---|---|---|
| JP | 2010533906 A | 10/2010 |
| JP | 201365306 A | 4/2013 |
| JP | 2013140594 A | 7/2013 |

OTHER PUBLICATIONS

U.S. Office Action dated Jan. 31, 2018 issued in co-pending U.S. Appl. No. 15/083,471.

U.S. Final Office Action dated May 17, 2018 issued in co-pending U.S. Appl. No. 15/083,471.

U.S. Appl. No. 15/083,471, filed Mar. 29, 2016.

U.S. Office Action dated Feb. 28, 2019 issued in co-pending U.S. Appl. No. 15/083,471.

U.S. Office Action dated Aug. 12, 2019 issued in co-pending U.S. Appl. No. 15/083,471.

* cited by examiner

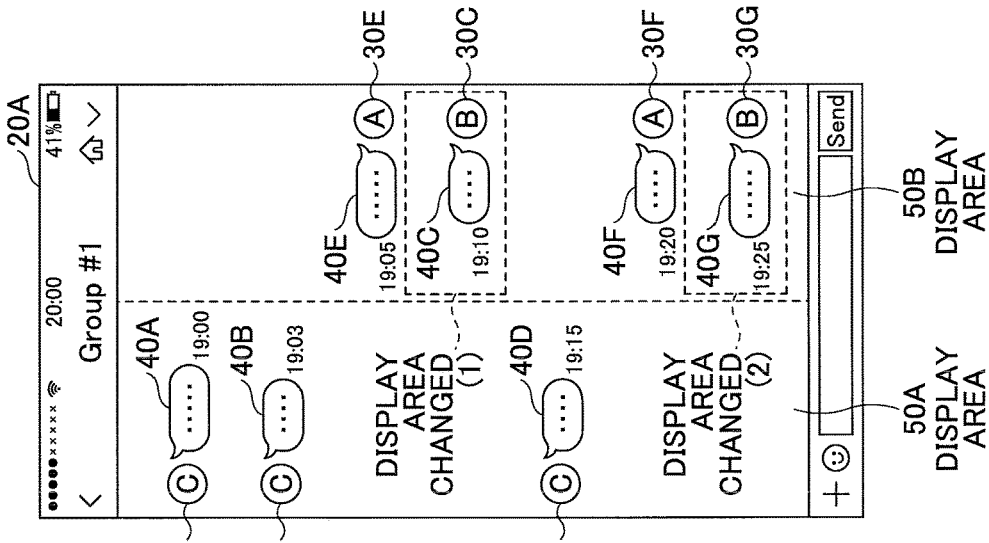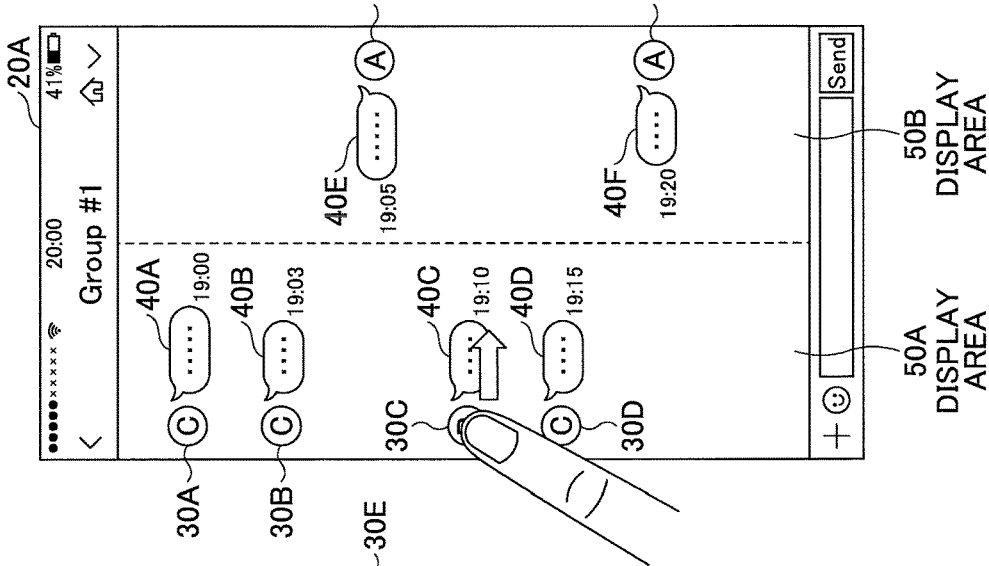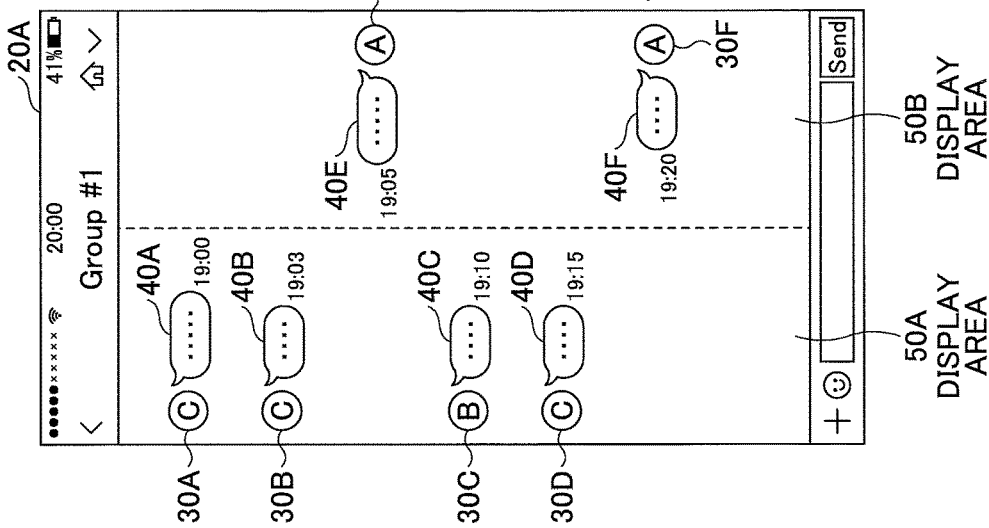

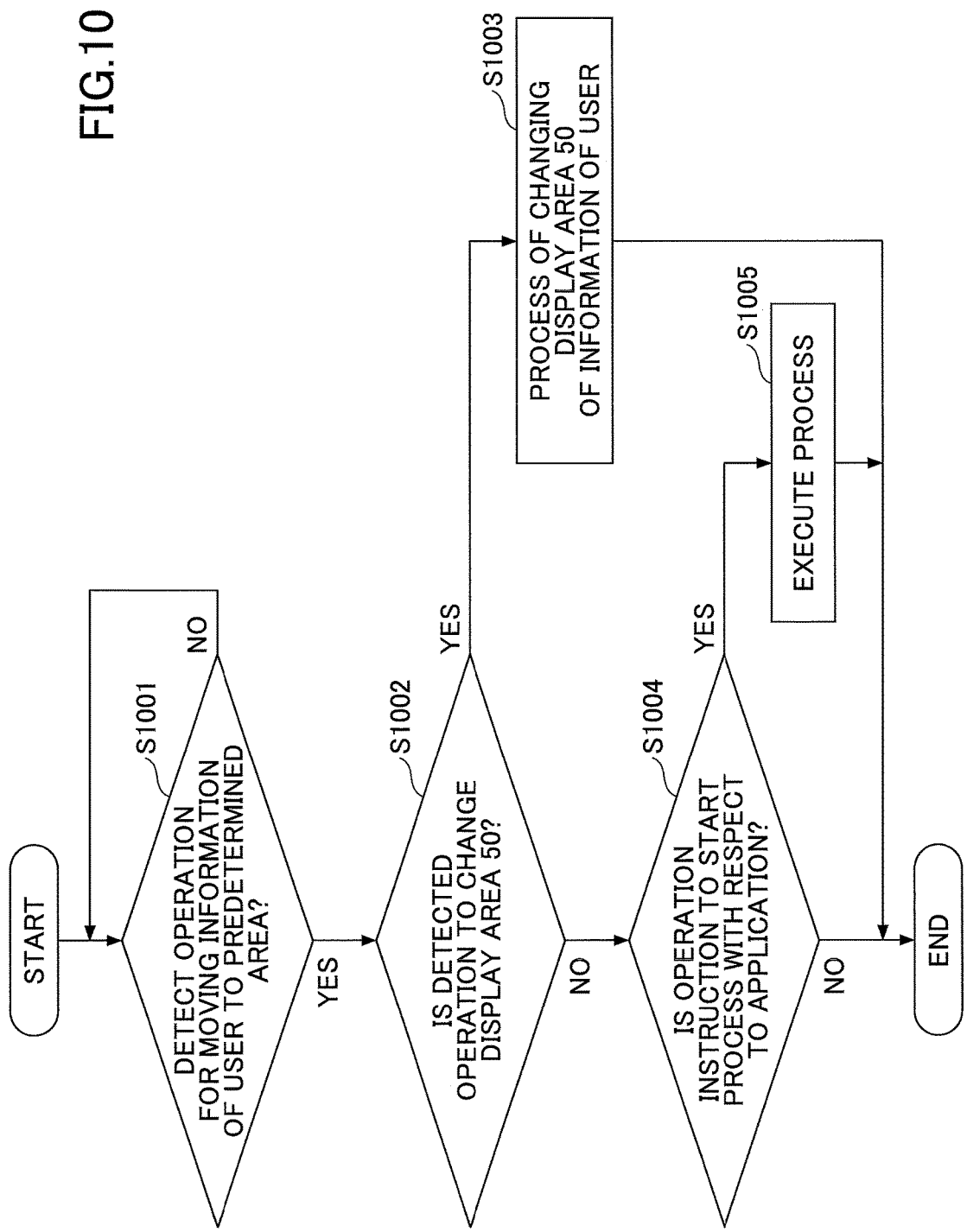

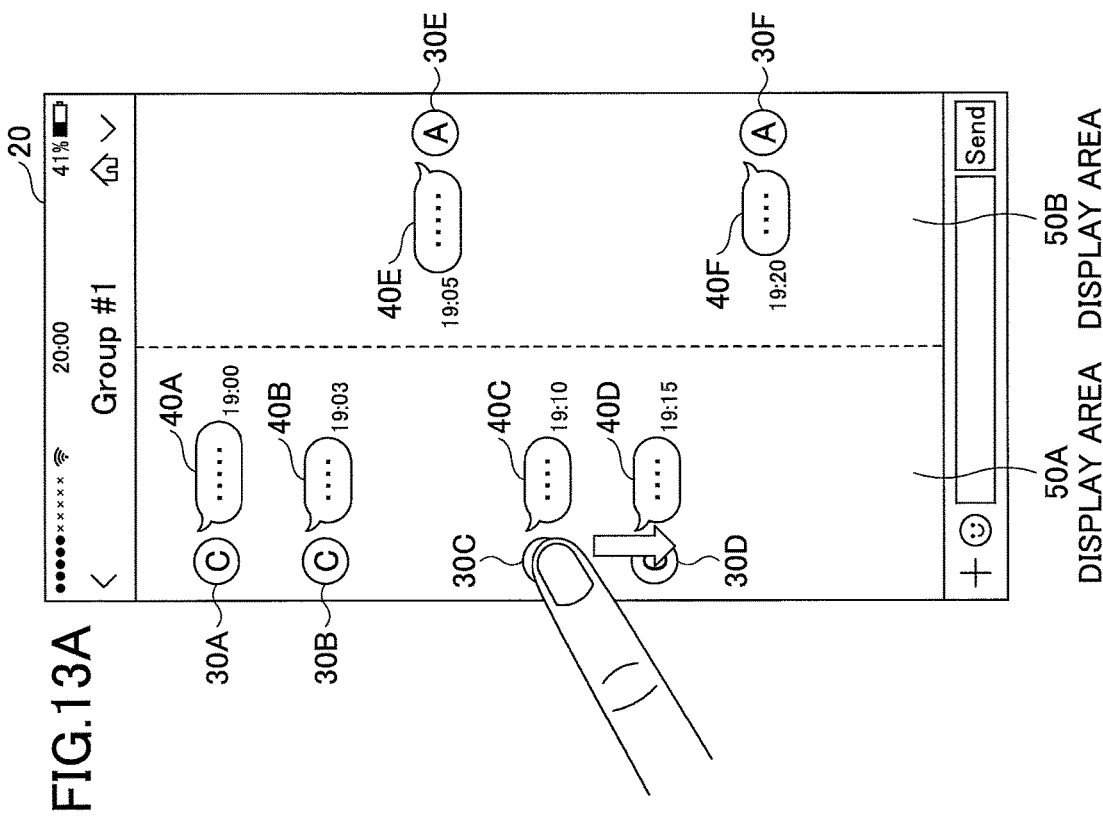

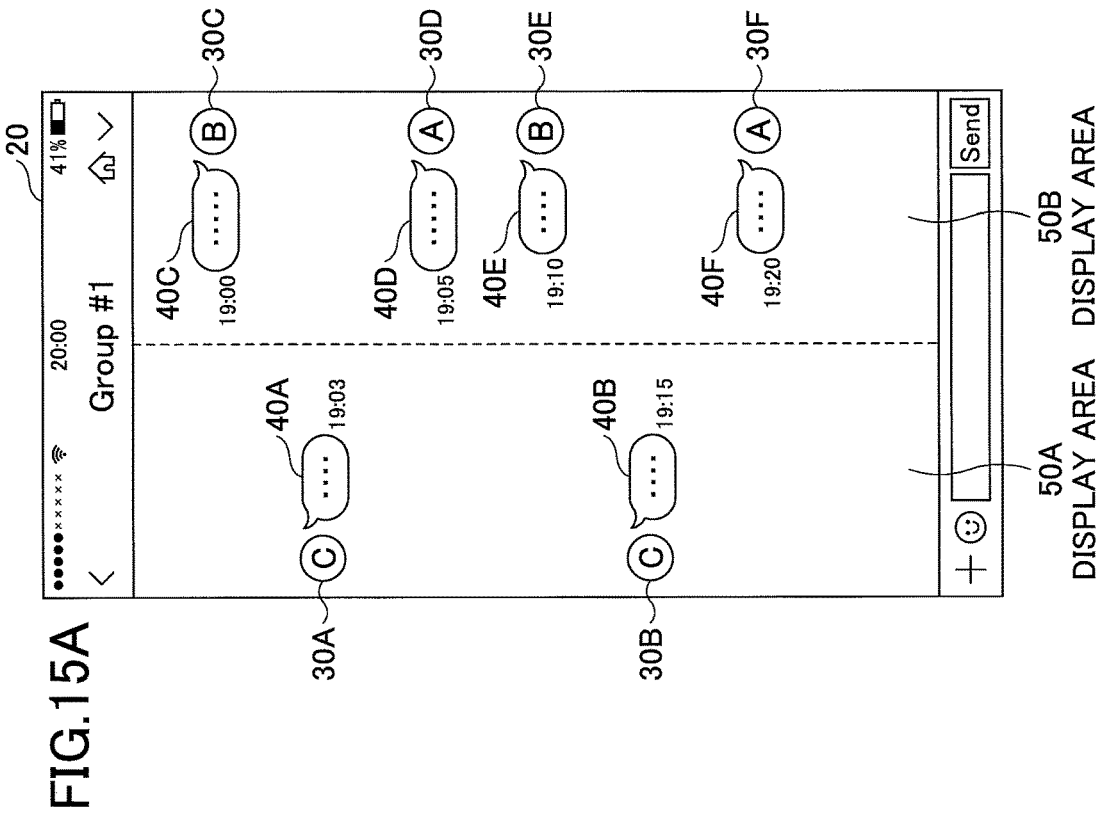

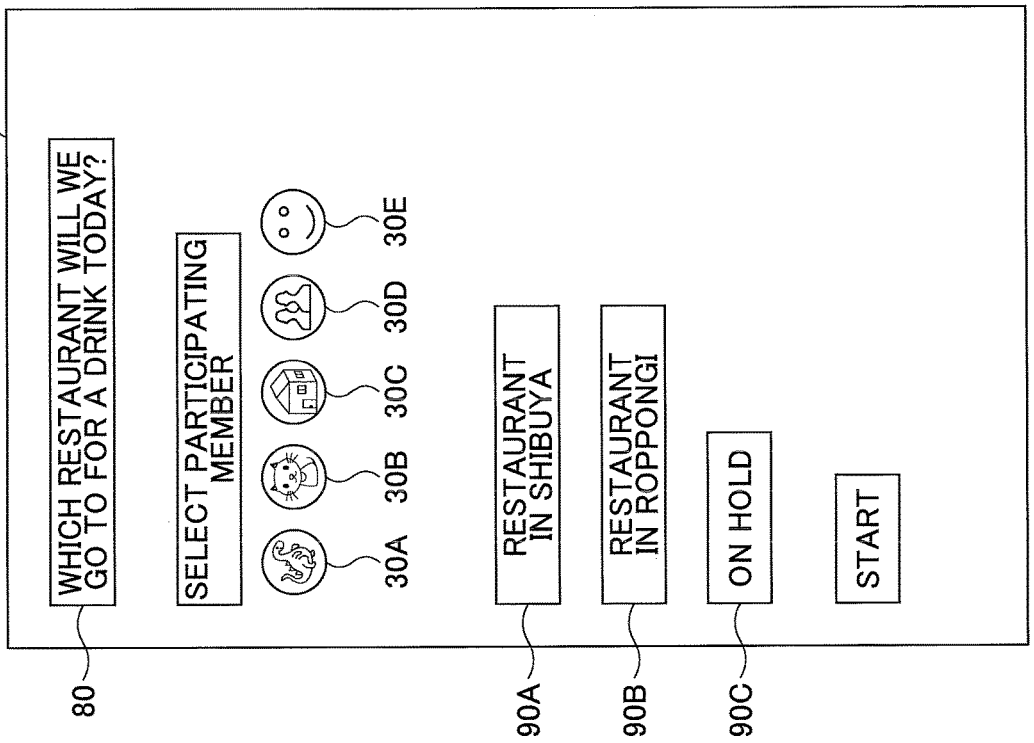
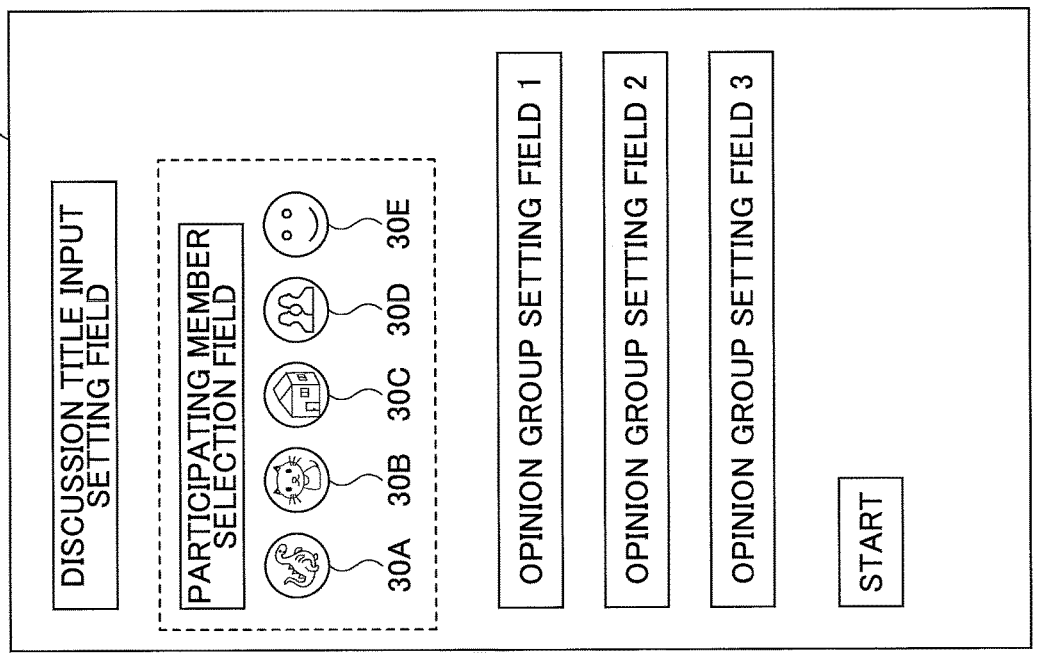

FIG.20

| DISCUSSION TITLE (DR ID) | OPINION GROUP | USER | MESSAGE (TRANSMISSION TIME) | ORGANIZER FLAG |
|---|---|---|---|---|
| | OG ID1 | USER A | ... | ✓ |
| | OG ID2 | USER B | ... | |
| | OG ID2 | USER D | ... | |
| | OG ID3 | USER C | ... | |

135

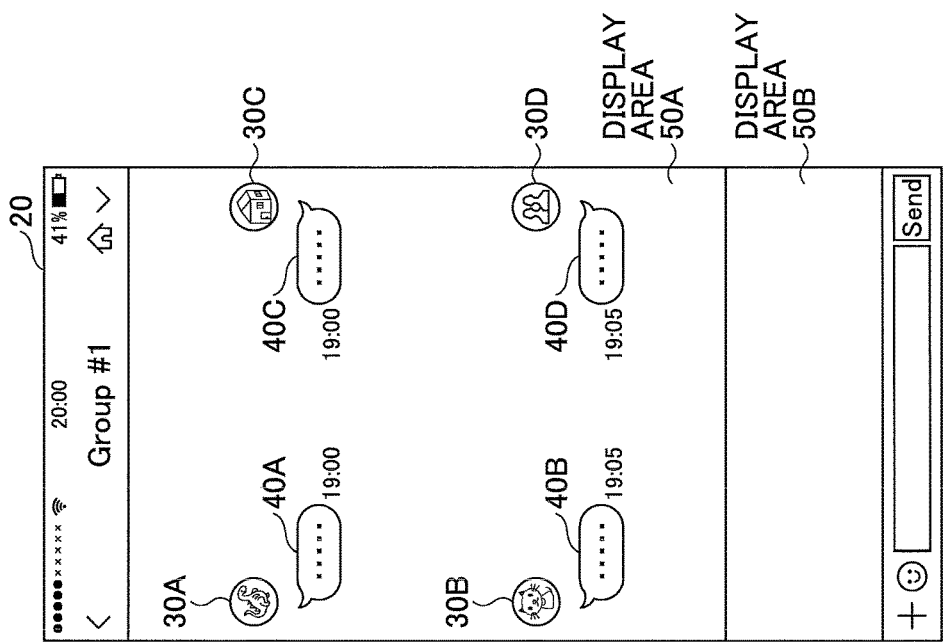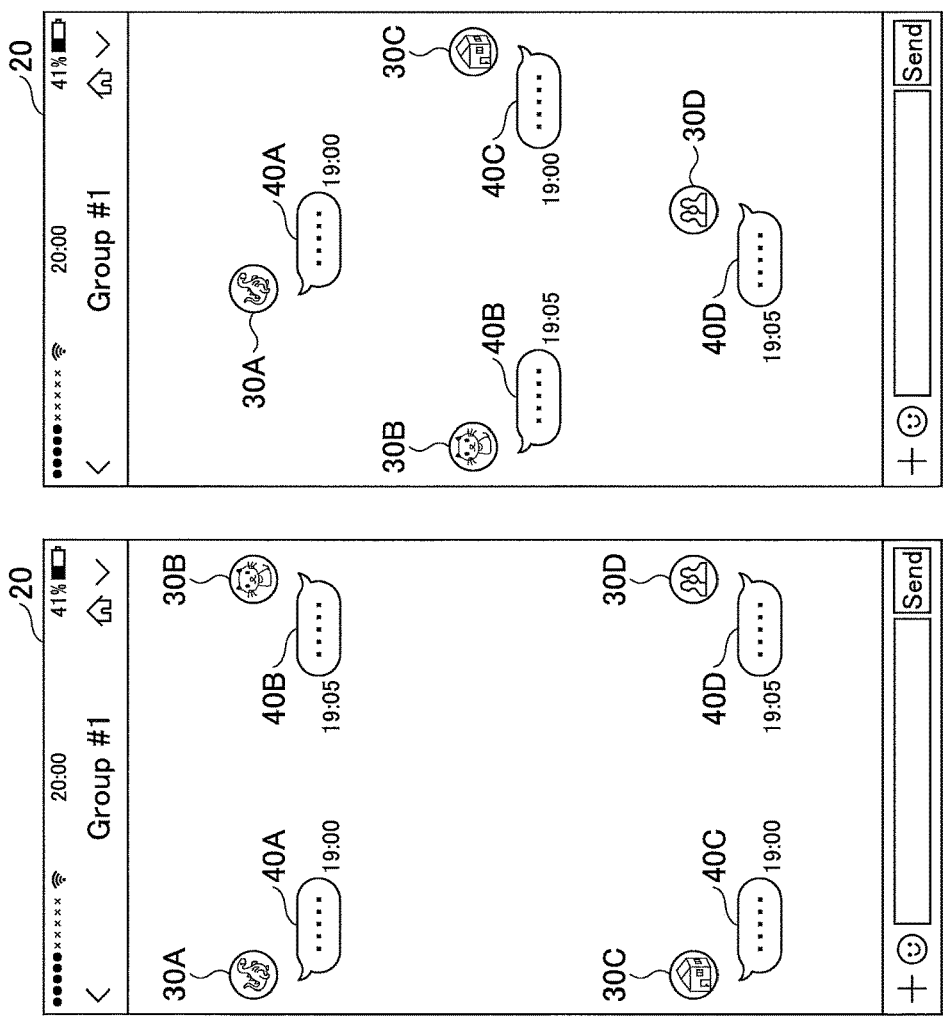

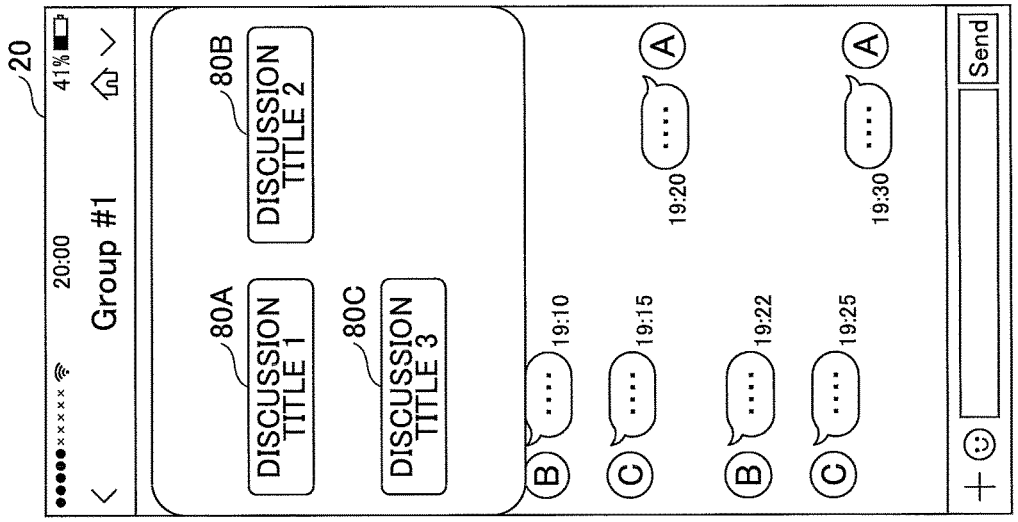
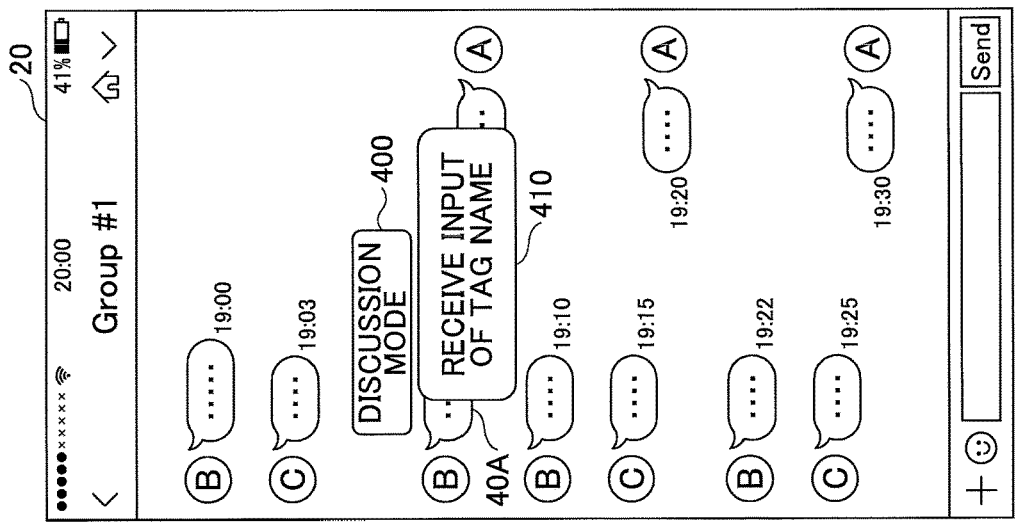
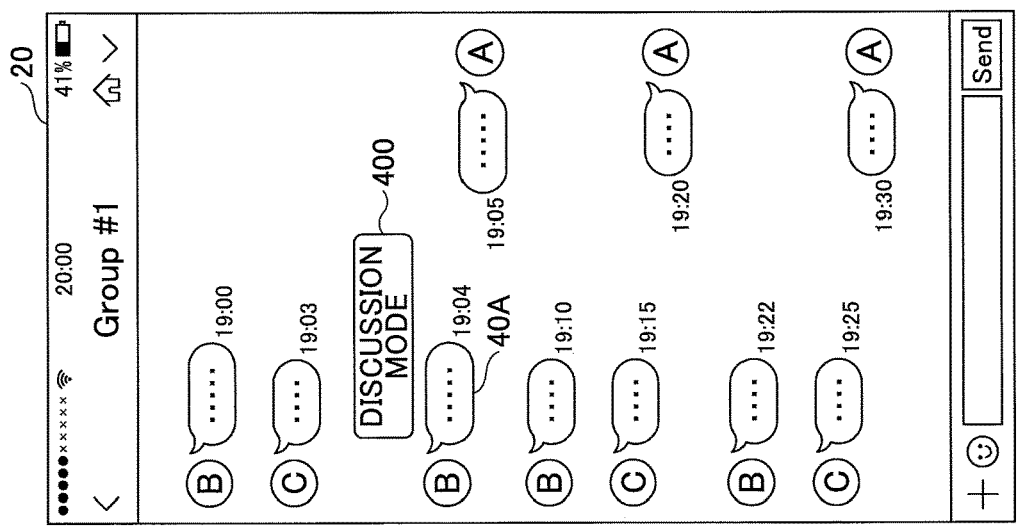

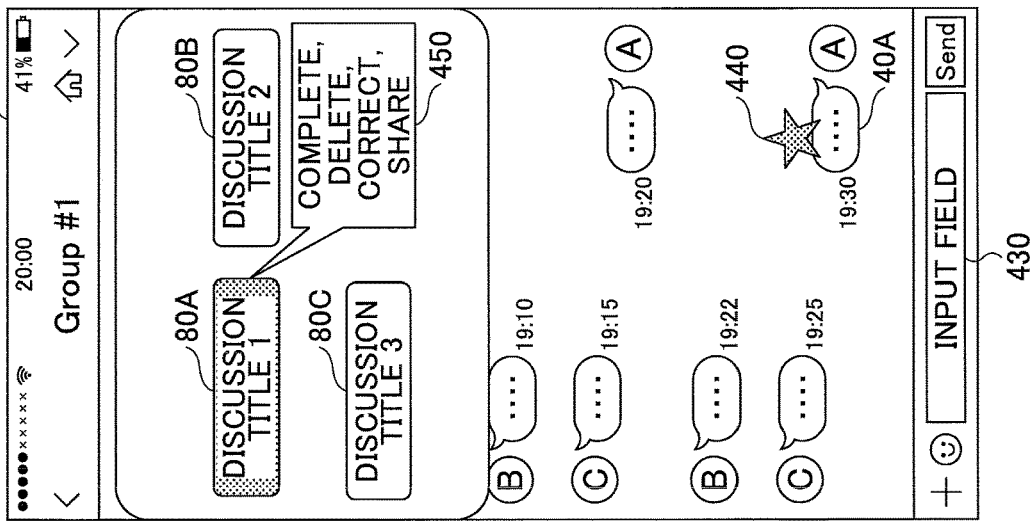
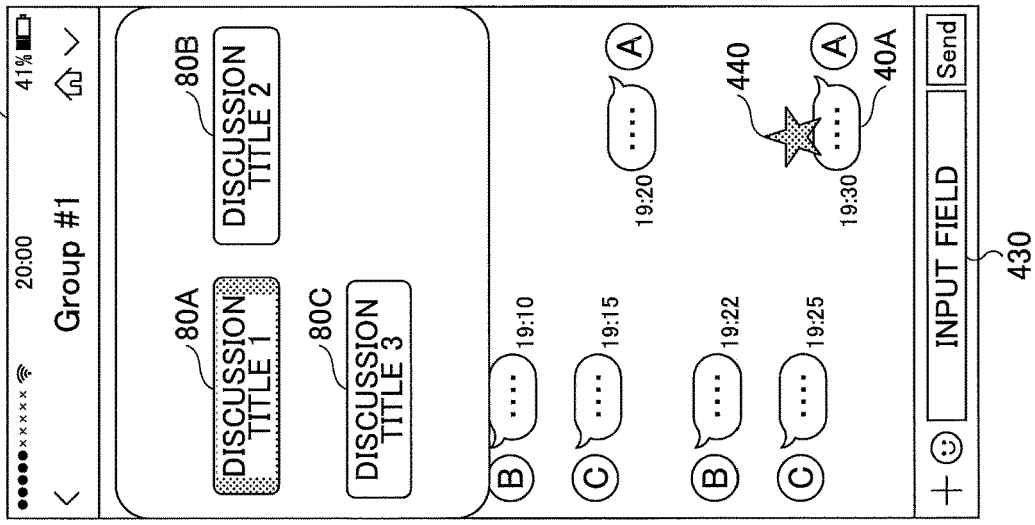
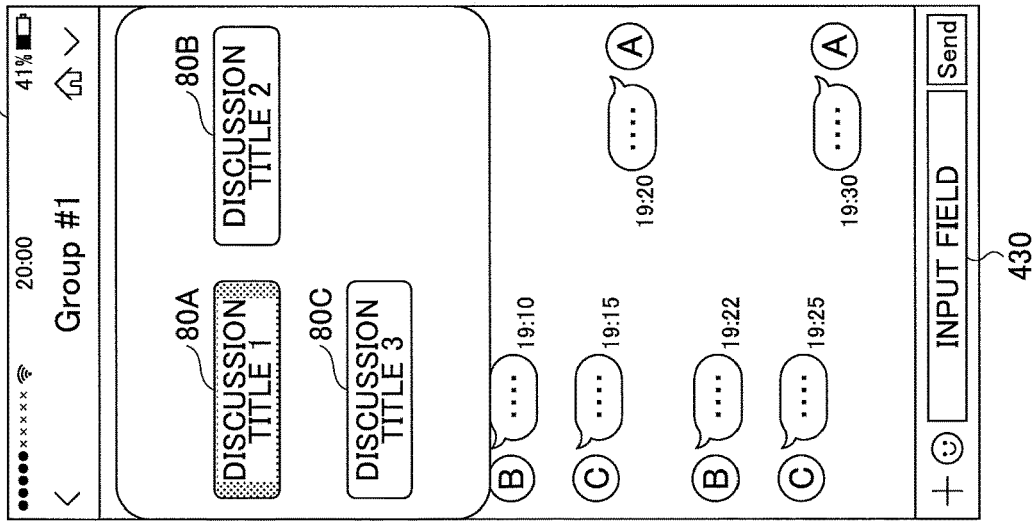

DISPLAY CONTROL METHOD, INFORMATION PROCESSING APPARATUS, AND TERMINAL

BACKGROUND OF THE INVENTION

1. Field of the Invention

The present invention relates to a display control method, an information processing apparatus, and a terminal.

2. Description of the Related Art

Along with the popularization of SNS (Social Network Service), chat messages are widely being exchanged among a plurality of SNS users with the use of their respective terminals.

When chat messages are frequently exchanged among a plurality of users, there have been cases where it is difficult to confirm the messages displayed on the terminal in a timely manner and recognize the status of discussions.

In order to solve such a problem, there is proposed a method of setting themes for the messages, sorting the messages that are sent and received in units of themes, and confirming the messages to confirm the development, etc., of the discussion (for example, Patent Document 1).

Patent Document 1: Japanese National Publication of International Patent Application No. 2010-533906

By the conventionally proposed method, it is possible to organize the messages in units of themes; however, it has been difficult to recognize the present status of the discussion in a real-time manner. Particularly, it has been difficult to recognize the opinions of the respective users regarding a predetermined theme by using chat messages exchanged among a plurality of users, and elicit a conclusion.

SUMMARY OF THE INVENTION

The present invention provides a display control method, an information processing apparatus, and a terminal, in which one or more of the above-described disadvantages are eliminated.

According to an aspect of the present invention, there is provided a display control method for performing a process executed by a computer including a processor, the process including reporting a theme to two or more user terminals; receiving options selected at the two or more user terminals with respect to the theme, from the two or more user terminals; and displaying, on a display device, the options and user information items regarding users who selected the options, in display areas provided for the respective options.

According to an aspect of the present invention, there is provided an information processing apparatus including a processor configured to execute a process including reporting a theme to two or more user terminals, and receiving options selected at the two or more user terminals with respect to the theme, from the two or more user terminals; and controlling the two or more user terminals to display, on a display device, the options and user information items regarding users who selected the options, in display areas provided for the respective options.

According to an aspect of the present invention, there is provided a user terminal including a processor configured to execute a process including receiving a theme and options selected at other user terminals with respect to the theme, from an information processing apparatus; and displaying, on a display device, the options and user information items regarding users who selected the options, in display areas provided for the respective options.

According to an aspect of the present invention, there is provided a non-transitory computer-readable recording medium storing a program that causes a computer including a processor to execute a process performed in a user terminal, the process including receiving a theme from an information processing apparatus; receiving options selected at other user terminals with respect to the theme, from the information processing apparatus; and displaying, on a display device, the options and user information items regarding users who selected the options, in display areas provided for the respective options.

BRIEF DESCRIPTION OF THE DRAWINGS

Other objects, features and advantages of the present invention will become more apparent from the following detailed description when read in conjunction with the accompanying drawings, in which:

FIGS. 2A through 2C illustrate display screens of a terminal of a user in the information processing system according to the first embodiment;

FIG. 10 is an example of a flowchart relevant to a process by the terminal according to the first embodiment;

FIGS. 13A and 13B illustrate examples of transitions of a display screen when activating the process performed by the terminal according to the first embodiment (part 1);

FIGS. 15A through 15D illustrate examples of transitions of a display screen to a default display in the terminal according to the first embodiment;

FIGS. 18A through 18C illustrate examples of setting screens of the discussion mode in the terminal according to a second embodiment;

FIG. 20 illustrates an example of the discussion mode management table according to the second embodiment;

FIGS. 34A through 34C illustrate examples of display screens (display example) when the discussion mode is executed in the terminal according to modified example 1;

FIGS. 35A through 35O illustrate examples of display screens (tag setting part 1) when the discussion mode is executed in the terminal according to modified example 2;

FIGS. 36A through 36C illustrate examples of display screens (tag setting part 2) when the discussion mode is executed in the terminal according to modified example 2;

DETAILED DESCRIPTION OF THE PREFERRED EMBODIMENTS

First Embodiment

Overview

Figure 1:
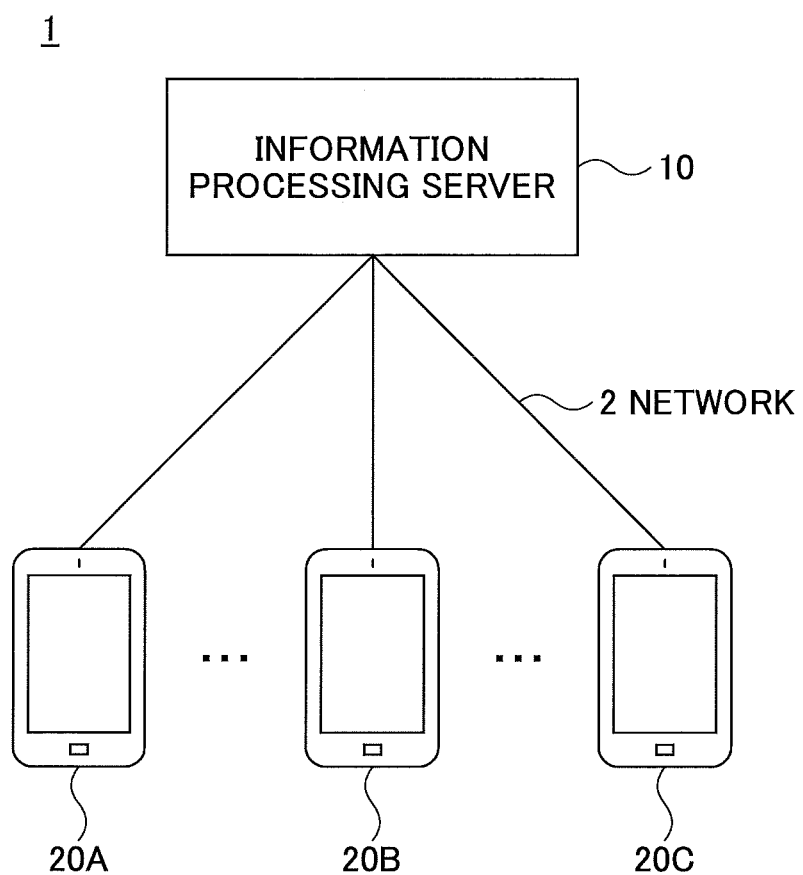
FIG. 1 illustrates an example of a system configuration of an information processing system according to a first embodiment.

FIG. 1 illustrates an example of a system configuration of an information processing system 1 according to a first embodiment. The information processing system 1 includes an information processing server 10 and a plurality of terminals 20 (terminal 20A, terminal 20B, terminal 20C). The information processing server 10 and the terminals 20 are connected via a network 2. The network 2 includes a wired network and a wireless network.

The terminal 20 is a smartphone, a tablet terminal, a PC (Personal Computer), a mobile phone, a game console, a touch pad, an electronic book reader, a wearable terminal, etc.

The information processing server 10 provides SNS (Social Network Service) to the users of the terminals 20. By installing an application of SNS in the terminal 20 and connecting to the information processing server 10, the user of the terminal 20 is able to receive an SNS service provided from the information processing server 10.

Note that in the following embodiment, a display control method in a social network service is mainly described; however, the present embodiment is applicable to a display control method of displaying user information in chronological order. For example, the present embodiment is applicable to a method of displaying user names and comments in various websites, etc., in the Internet.

The terminal 20 may receive an SNS service by using a web browser, etc., and connecting to the information processing server 10.

The information processing server 10 provides, for example, a service (chat service) of exchanging messages 40 among users of the SNS service, a timeline service, etc.

FIGS. 2A through 2C illustrate examples of display screens of the terminal 20 of the user in the information processing system 1 according to the first embodiment.

FIGS. 2A through 2C illustrate display screens of a terminal 20A of a user A when the user A users a chat service provided from the information processing server 10, by using the terminal 20.

FIG. 2A illustrates a default display when chat messages 40 are being exchanged among a user A, a user B, and a user C who belong to Group #1. The messages 40 of the respective users are displayed together with icons 30 indicating the respective users. The messages 40 are sequentially displayed from the top to the bottom of the screen, in chronological order.

The message 40 that a user A himself has sent by the terminal 20A is displayed, for example, in a display area 50B on the right side of the terminal 20A. The messages 40 from the user B and the user C who are chat counterpart are displayed, for example, in a display area 50A on the left side of the terminal 20A of the user A.

The feature of the first embodiment is that the terminal 20 is capable of changing the display area 50 of the messages 40 in units of users, according to instructions from the user.

FIG. 2B illustrates the user A of the terminal 20A executing an operation with respect to the icon 30C of the user B. After the icon 30C is selected, the terminal 20A receives, from the user A, an operation for changing the display area 50 of messages 40 of the user B, from a display area 50A to a display area 50B. FIG. 2B illustrates an example where the display area 50 is changed as the icon 30C of the user B is swiped toward the display area 50B.

FIG. 2C illustrates the icon 30C of the user B and a message 40C associated with the icon 305 being displayed in the display area 50B, upon receiving the operation from the user A. After the display area 50 is changed, the messages 40 of the user B are displayed in the display area 50B.

As described above, by the method of changing the display area 50 according to the first embodiment, the user of the terminal 20 is able to select the display area 50 of messages 40, etc., for each user.

Accordingly, the user of the terminal 20 is able to change the display area 50 of the messages 40 of the respective users, in consideration of the number of people in the group participating in the chat service, the amount of messages 40 of users participating in the chat, etc.

In the example of FIGS. 2A through 2C, a description is given of a case where the display area 50 is changed for icons 30 and messages 40 of the user B from and after the icon 30C that receives the instruction to change the display area 50; however, the messages 40, etc., of the user B before the change instruction is received may also be collectively changed into the display area 50B. Furthermore, the display area 50 of the user A himself of the terminal 20A may obviously be changed.

When the display area 50 of the user A himself is changed, it may be difficult to identify the messages, etc., of the user A himself. Therefore, a display unit 220 (see FIG. 5) may display the information such as messages of the user A by highlighting the information, changing the background color, setting the gradation of the background, etc., such that the information can be easily identified.

When the terminal 20A receives a selection of a display area 50 from the user A (for example, a tapping operation is received), the input screen is activated within a predetermined time, and then a message is sent from the terminal 20A, the selected display area 50 may be used as the display area for displaying the information of the user A.

Furthermore, when the terminal 20A receives an instruction to activate the input screen, receives a selection of a display area 50 from the user A within a predetermined time (for example, a tapping operation is received), and then a message is sent from the terminal 20, the selected display area 50 may be used as the display area for displaying the information of the user A.

An example where the icon 30 is selected is described above; however, the display area 50 for displaying the information of a user may be changed by receiving a selection of information of the user displayed on the screen other than the icon 30 and an instruction to change the display area 50. For example, a message 40 of the user may be selected.

The operation to the icon 30, etc., from the user A is an instruction to change the display area 50 to the icon 30, etc., and the operation is obviously not limited to swiping. The display area 50 for displaying the information of the user such as the icons 30 and messages 40, may be changed by a swiping operation, a flicking operation, a long-pressing operation, a dragging operation, a tapping operation, or a combination of these operations. Note that the information of the user may be referred to as user information.

Hardware Configuration

Next, the hardware configurations of the devices included in the information processing system 1 are described.

(1) Information Processing Server

The information processing server 10 has a configuration of a general computer.

Figure 3:
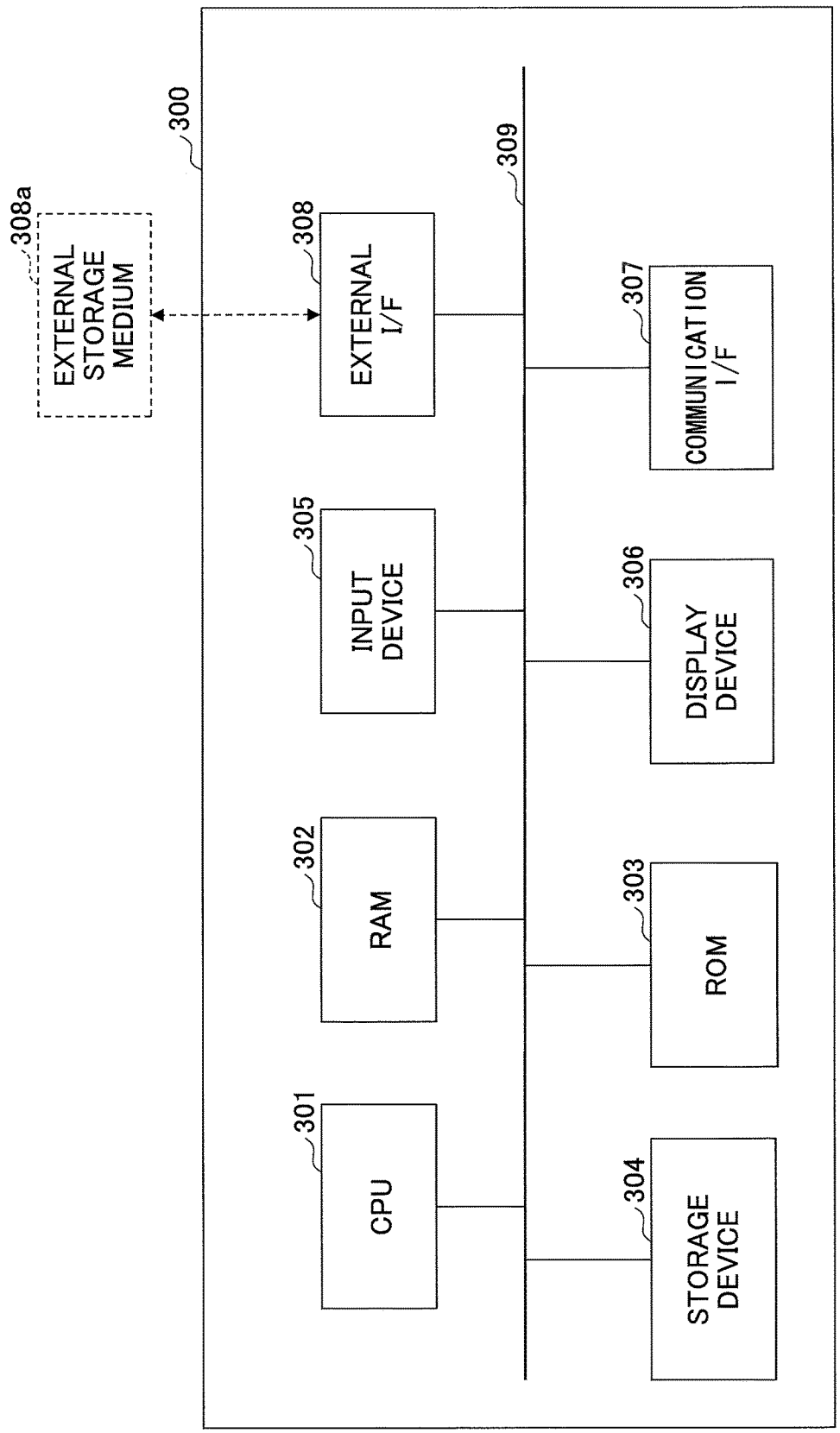
FIG. 3 illustrates an example of a hardware configuration of a computer according to the first embodiment.

FIG. 3 illustrates an example of a hardware configuration of a computer according to the first embodiment. In FIG. 3, a computer 300 includes, for example, a CPU (Central Processing Unit) 301, a RAM (Random Access Memory) 302, a ROM (Read-Only Memory) 303, a storage device 304, an input device 305, a display device 306, a communication I/F (Interface) 307, an external I/F 308, a bus 309, etc.

The CPU 301 is an arithmetic device for implementing control and functions of the computer 300, by loading programs and data from a memory such as the ROM 303 and the storage device 304 in to the RAM 302, and executing processes. The ROM 303 stores programs and data, such as BIOS (Basic Input/Output System) that is executed when the computer 300 is activated, settings of OS (Operating System), various settings, etc. The RAM 302 is a volatile memory for temporarily holding programs and data. The storage device 304 is a high-capacity storage device storing programs and data.

The input device 305 is, for example, a keyboard, a mouse, etc., which is used by the user for inputting various operation signals. The display device 306 is, for example, a display, etc., and displays processing results by the computer 300. Note that the input device 305 and/or the display device 306 may have a mode of being connected and used according to need.

The communication I/F 307 is an interface that connects the computer 300 to the network 2. The external I/F 308 is an interface between the computer 300 and an external device. An example of the external device is an external storage medium 308a. Accordingly, the computer 300 is able to read and/or write in the external storage medium 308a via the external I/F 308. Examples of the external storage medium 308a are various optical disks, various memory cards, etc.

The CPU 301 can realize the functions of the information processing server 10 by executing programs stored in the ROM 303, etc.

(2) Terminal

Figure 4:
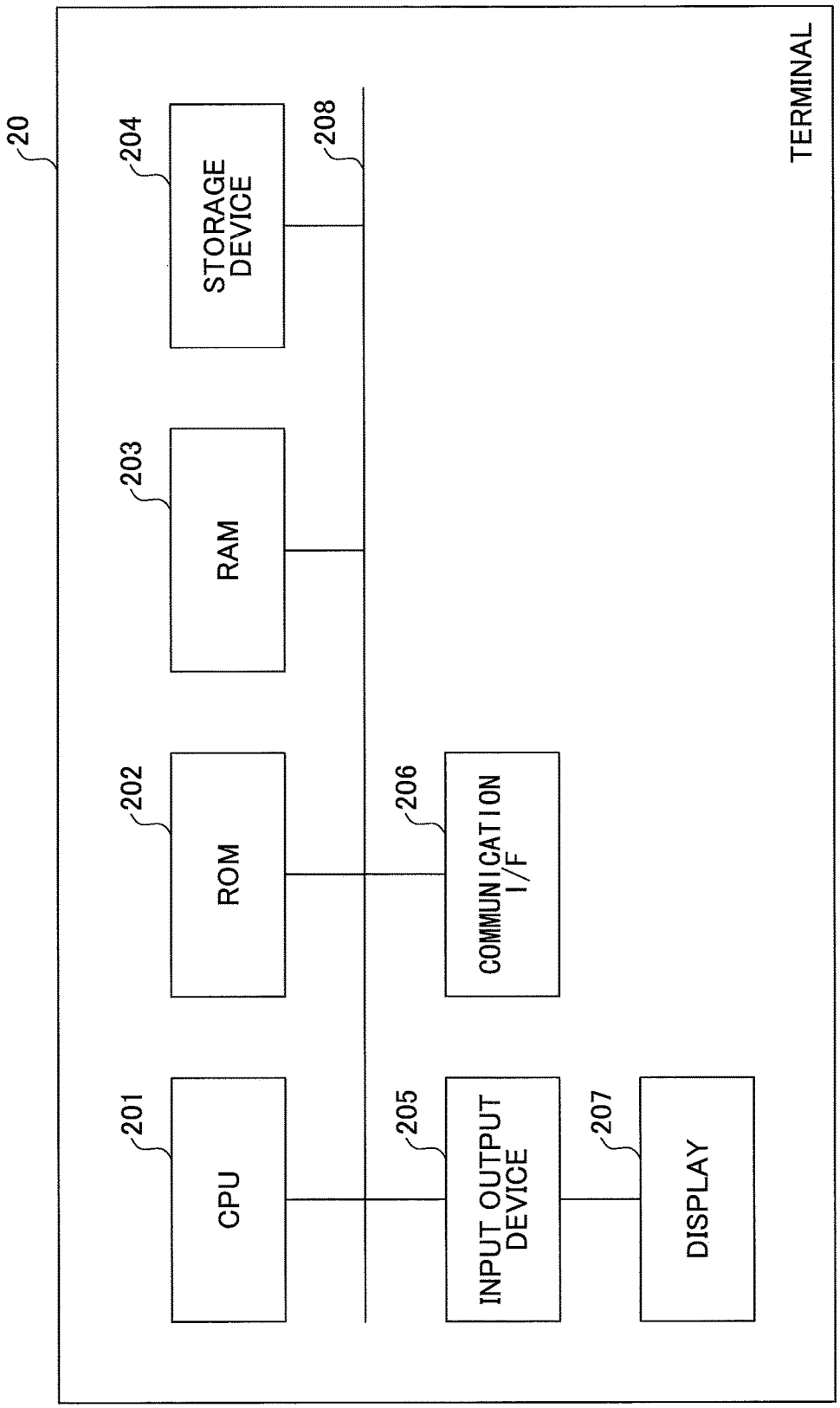
FIG. 4 illustrates an example of a hardware configuration of the terminal according to the first embodiment.

FIG. 4 illustrates an example of a hardware configuration of the terminal 20 according to the first embodiment.

The terminal 20 includes a CPU 201, a ROM 202, a RAM 203, a storage device 204, a input output device 205, a communication I/F 206, and a display 207 (display device). Note that the hardware elements of the terminal 20 are connected to each other via a bus 208.

The storage device 204 stores various programs. The CPU 201 is a computer for executing various programs stored in the storage device 204.

The ROM 202 is a non-volatile memory. The ROM 202 stores various programs, data, etc., needed for the CPU 201 to execute various programs stored in the storage device 204.

The RAM 203 is a main storage such as a DRAM (Dynamic Random Access Memory), a SRAM (Static Random Access Memory), etc. The RAM 203 functions as a work area that is expanded when various programs are executed by the CPU 201.

The input output device 205 includes functions of an input device for inputting various instructions to the terminal 20 and an output device for outputting processing results processed by the terminal 20. The input output device 205 is connected to a display 207. In the present embodiment, the display 207 may be a touch reactive display (touch panel).

The communication I/F 206 performs communication between the terminal 20 and the information processing server 10 via the network 2.

The CPU 201 can realize the functions of the terminal 20 by executing programs stored in the storage device 204, etc.

Functional Configuration

Figure 5:
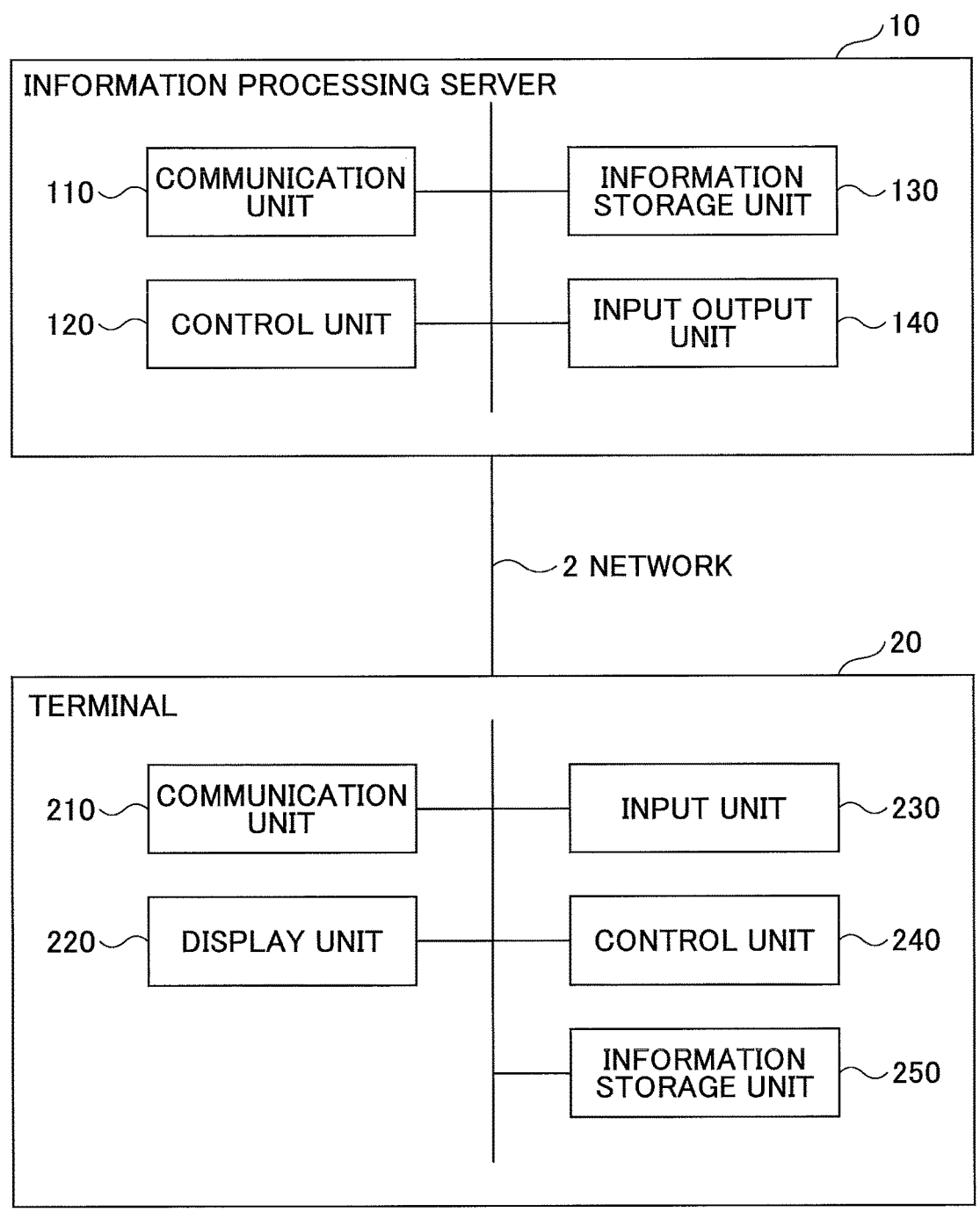
FIG. 5 illustrates an example of functional configurations of the information processing server and the terminal according to the first embodiment.

With reference to FIG. 5, a description is given of functional configurations of the information processing server 10 and the terminal 20 according to the first embodiment. FIG. 5 illustrates an example of functional configurations of the information processing server 10 and the terminal 20 according to the first embodiment.

(1) Information Processing Server

The information processing server 10 includes a communication unit 110, a control unit 120, an information storage it 130, and an input output unit 140.

The functions of the information processing server 10 cooperate with each other has follows. The information processing server 10 receives, from the terminal 20A of the user A, a report to move first information, which is information of a user B and which is displayed in the display area 50A of the terminal 20A, to the display area 50B. The control unit 120 displays second information, which is information of the user B received by the terminal 20A after the first information, in the display area 50B.

Specifically, the function units have the following functions.

The communication unit 110 sends various signals to the terminal 20 of the user, based on instructions from the control unit 120. Various signals to the terminal 20 are control signals for providing an SNS service, various reports of services, messages 40 from other users, reports of posts 60 to the timeline by other users, etc. Furthermore, the communication unit 110 receives various signals relevant to the SNS service from the terminal 20 of the user, and reports the received signals to the control unit 120. Various signals from the terminal 20 of the user are messages 40 to other users, posts 60 to the timeline, requests for setting changes to the information processing server 10, etc.

The control unit 120 implements various kinds of control to the terminal 20 of the user via the communication unit 110. The control unit 120 receives, from the terminal 20A of the user A via the communication unit 110, a request to change the display area 50 of the information of the user B, from the display area 50A to the display area 50B. In response to this request, the control unit 120 instructs the information storage unit 130 to store the display area 50B as the display area 50 of the information of the user B.

When new information of the user B is received, which is to be sent from the user B to the user A, the control unit 120 sets the display area 50B as the display area 50 of the information of the user B. After setting the display area 50, the control unit 120 sends information of the user B to the terminal 20A of the user A, via the communication unit 110.

The information of the user B is chat messages 40 in SNS, icons 30 expressing the transmission source of the messages 40, posts 60 to the timeline in SNS, icons 30 expressing the post sources, etc.

When three or more users send and receive chat messages 40, the control unit 120 may implement display control of the display areas 50 of the respective messages 40.

A description is given of a case where, for example, when the user A of the terminal 20A, the user B of the terminal 20B, and the user C of the terminal 20C are exchanging messages 40, the information processing server 10 receives, from the terminal 20A of the user A, an instruction to set the messages 40 of the user B in the display area 50B. In this case, when messages 40 from the user B to the user A and the user C are received, the control unit 120 may set the display area 50 of these messages 40 in the terminal 20A of the user A to be the display area 50B, and also set the display area 50 of these messages 40 in the terminal 20C of the user C to be the display area 50B. Here, the display area 50A may be the area on the left side of the screen and the display area 50B may be the area on the right side of the screen.

When the control unit 120 receives an instruction to display all users in a single display area 50 from the terminal 20, the control unit 120 may instruct the terminal 20 via the communication unit 110, to move the information of the respective users back to the default display areas 50. This is because if the information of the users is disproportionately placed in a single display area 50, the information of the users may be difficult to view. Here, the default display areas 50 mean, for example, that the information of the user of the terminal 20 is displayed in the display area 50B on the right side and the information of users other than the user of the terminal 20 is displayed in the display area 50A on the left side.

The information storage unit 130 stores various kinds of information to be provided to the information processing server 10. For example, the information storage unit 130 stores information such as posts 60 of users, messages 40 sent to and received by the users, etc., for each of the users.

Furthermore, the information storage unit 130 stores information relevant to the display area 50 of the information of the user, according to instructions from the control unit 120.

The input output unit 140 receives various kinds of input to the information processing server 10, and displays various kinds of information to the administrator of the information processing server 10.

(2) Terminal

The terminal 20 includes a communication unit 210, a display unit 220, an input unit 230, a control unit 240, and an information storage unit 250.

The functions of the terminal 20 cooperate with each other as follows. The display unit 220 generates a display area 50A and a display area 50B for displaying information of users. The input unit 230 receives an instruction to move first information, which is information of the user B and which is displayed in the display area 50A, to the display area 50B.

The display unit 220 displays the first information in the display area 50B, and displays second information, which is information of the user B received after the first information, in the display area 50B.

The communication unit 210 sends and receives various signals with the information processing server 10. The communication unit 210 sends messages 40, posts 60 from the user of the terminal 20, etc., to the information processing server 10, based on instructions from the control unit 240. Furthermore, the communication unit 210 may send a request relevant to the setting of the display area 50 of the messages 40, based on instructions from the control unit 240.

The display unit 220 generates a display area 50A and a display area 50B, and displays information of the user in the set display area 50, based on instructions from the control unit 240.

Furthermore, the display unit 220 changes the display area 50 set for the information of the user, based on instructions from the control unit 240. For example, the display unit 220 changes the display area 50 of the information of the user B, from the display area 50A to the display area 50B, based on instructions from the control unit 240.

The input unit 230 receives various operations from the user of the terminal 20. The input unit 230 receives a selection of information of a user displayed on the display unit 220 and an instruction to change the display area 50 of the selected information of a user, and reports the instruction to the control unit 240.

Note that the selection of the information of a user and an instruction to change the display area 50 may be realized by various methods. Here, a description is given of a case where the display unit 220 is formed of a display and the input unit 230 is a touch panel formed in the same area as the display. The input unit 230 determines that an instruction to change the display area 50 of the information of the user is received, based on a selection of information of a user displayed on the display, such as a touch operation, and a predetermined operation to the information of a user selected by the touch operation.

Here, for example, information of a user is information of the user of the terminal 20 and information of a user relevant to the user of the terminal 20. The information of a user is the icon 30, the message 40, the post 60, etc., of the user.

Furthermore, in addition to changing the display area 50, when the information of the user is selected and a predetermined operation is executed, the input unit 230 may determine that a process relevant to the selected user has been input. A process relevant to the selected user is, for example, a process of sending a one-on-one message 40 to the selected user, a process of withdrawing the selected user from the chat group, etc.

The control unit 240 implements various kinds of control with respect to the functions of the terminal 20. The control unit 240 instructs the communication unit 210 to send messages 40, posts 60 from the user of the terminal 20, etc., to the information processing server 10. Furthermore, the control unit 240 may send a request relevant to setting the display area 50 of the messages 40, via the communication unit 210. The control unit 240 instructs the display unit 220 to display the information of the user in the display area 50 determined based on an instruction from the user received by the input unit 230.

The control unit 240 instructs the information storage unit 250 to store information relevant to the display area 50 of the information of the user received from the input unit 230. When new information of the user is received, the control unit 240 refers to the information storage unit 250, and identifies the display area 50 for displaying the new information of the user.

When the input unit 230 receives an instruction to display all of the users in a single display area 50 from the user of the terminal 20, that is, when there will be no information of a user displayed in the other display area 50, the control unit 240 may instruct the display unit 220 to move the information of the respective users back to the default display areas 50. This is because if the information of the users is disproportionately placed in a single display area 50, the information of the users may be difficult to view.

Furthermore, in response to an operation with respect to information of a user received by the input unit 230, the control unit 240 executes a process relevant to the selected user.

The information storage unit 250 stores various kinds of information of the user of the terminal 20. Furthermore, the information storage unit 250 stores the display area 50 for displaying the information of a user for each of the users, based on instructions from the control unit 240.

Note that among the functions described above, the functions provided in both the information processing server 10 and the terminal 20 may be realized by using the function of either the information processing server 10 or the terminal 70.

Setting of Display Area

Figure 6:
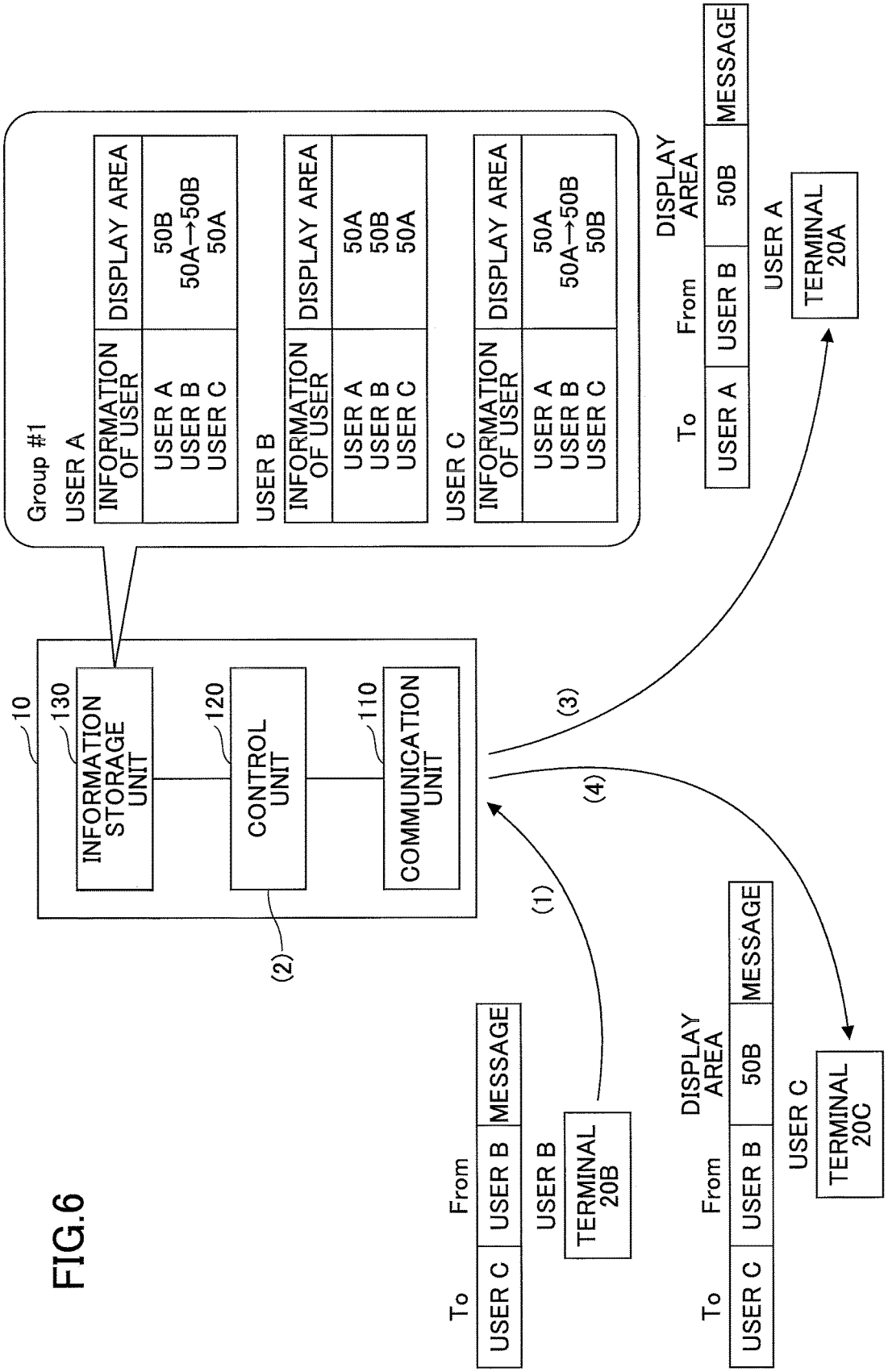
FIG. 6 illustrates an example of setting the display area by the information processing server according to the first embodiment.
Figure 7:
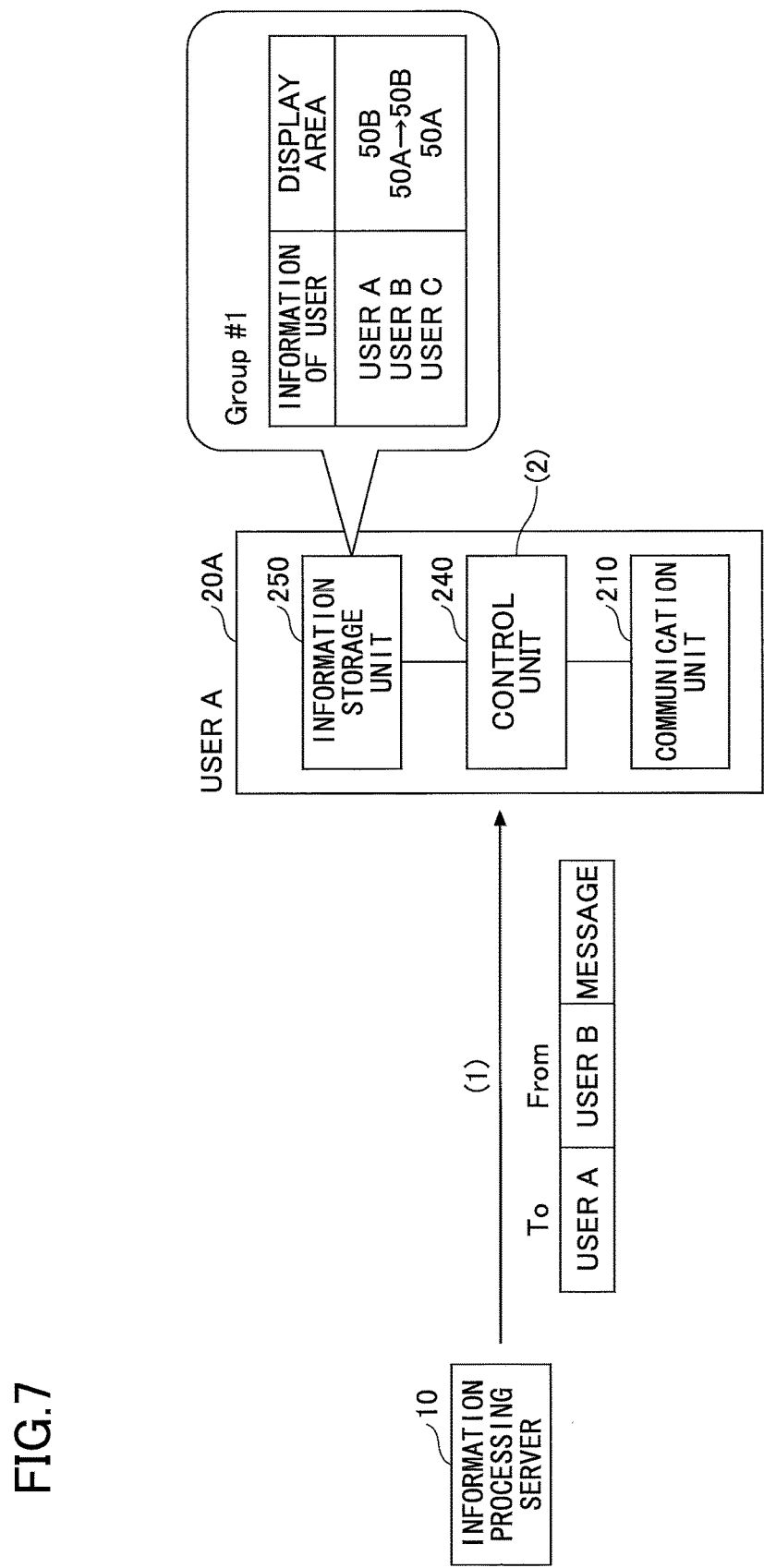
FIG. 7 illustrates an example of setting the display area by the terminal according to the first embodiment.

With reference to FIGS. 6 and 7, a description is given of operations of making a setting to display the information of a user in the display area 50 received from the user.

(1) Setting by Information Processing Server

As illustrated in FIG. 6, the information storage unit 130 stores the information of users and the display areas 50 in association with each other, with respect to the user A, the user B, and the user C belonging to Group #1. When a request to change the display area 50 of the information of a user is not received from the terminal 20, the information storage unit 130 stores the default settings of the information of users and the display areas 50.

The control unit 120 of the information processing server 10 receives a request to change the display area 50 for displaying the information of a user, from the terminal 20. When this change request is received, the control unit 120 instructs the information storage unit 130 to change the area for displaying the information of a user.

In FIG. 6, the control unit 120 of the information processing server 10 receives, from the terminal 20A of a user A, a change request to change the display area 50 of the information of a user B belonging to Group #1, to the display area 50B. In response to receiving this change request, the control unit 120 instructs the information storage unit 130 to change the display area 50 of the information of the user B, from the display area 50A to the display area 50B.

The information storage unit 130 may store the change of the area for displaying the information of a user, together with the time when the instruction is received from the control unit 120.

When the change request from the terminal 20A includes a message to change the display of the information of the user B from the display area 50A to the display area 50B in the terminals 20 of all users belonging to Group #1, the control unit 120 instructs the information storage unit 130 to change the display of the user B from the display area 50A to the display area 50B, in all of the terminals 20 belonging to Group #1 except for the terminal 20B of the user B. FIG. 6 illustrates the information of the user B being changed to be displayed in the display area 50B, in the terminals 20 of the user A and the user C. That is, in conjunction with the change request from the terminal 20A of the user A, the display area 50 of the information of the user B is changed in the terminal 20C of the user C.

After the change is made such that the information of the user B is displayed in the display area 50B, the information processing server 10 receives a message 40 addressed to the user A and the user C from the terminal 20B of the user B ((1) of FIG. 6). Then, the control unit 120 of the information processing server 10 refers to the information storage unit 130, and confirms that the information of the user B is set to be displayed in the display area 50B. The control unit 120 sets an information element indicating that the display area 50 of the received message 40 is "display area 50B", in the message 40 ((2) of FIG. 6).

The terminal 20A of the user A and the terminal 20C of the user C receive the message 40 including the information element indicating that the display area 50 of the message 40 is the "display area 50B", and display the message 40 in the display area 50B of the respective terminals 20 ((3), (4) of FIG. 6).

(2) Setting by Terminal

The above describes the method of setting the display area 50 by the information processing server 10; however, the display area 50 may be set by the terminal 20.

FIG. 7 illustrates an example of setting the display area 50 by the terminal 20 according to the first embodiment.

As illustrated in FIG. 7, the information storage unit 250 of the terminal 20A of the user A stores the information of users and the display areas 50 in association with each other, for each of the user A, the user B, and the user C belonging to Group #1. When the input unit 230 has not received an instruction to change the display area 50 of the information of a user, the information storage unit 250 stores the default settings of the information of users and the display areas 50.

The information storage unit 250 may store the time when an instruction to change the display area is received, and the information of a user for which a change is received (for example, a message) in association with each other, in addition to the identifier of the Group (Group #1), the identifiers of the users (user A, user B, user C) belonging to Group #1, and display areas of the respective users.

When the input unit 230 receives an instruction to change the display area 50 from a user, the control unit 240 of the terminal 20A of the user A stores the instruction in the information storage unit 250.

The example of FIG. 7 illustrates the control unit 240 of the terminal 20A changing the display area 50 of the information of the user B from the display area 50A to the display area 50B, in response to the input unit 230 receiving an instruction from the user A.

(1) of FIG. 7 indicates the terminal 20A receiving the message 40 from the user B via the information processing server 10. In the received message 40, an information element indicating the display area 50 is not set.

When the message 40 is received, the control unit 240 refers to the information storage unit 250, and confirms that the display area 50 for displaying the information of the user B is the display area 50B ((2) of FIG. 7).

The control unit 240 instructs the display unit 220 to display the message 40 received from the user B, in the display area 50B.

<Operation Procedures>

(1) Operation Sequence

Figure 8:
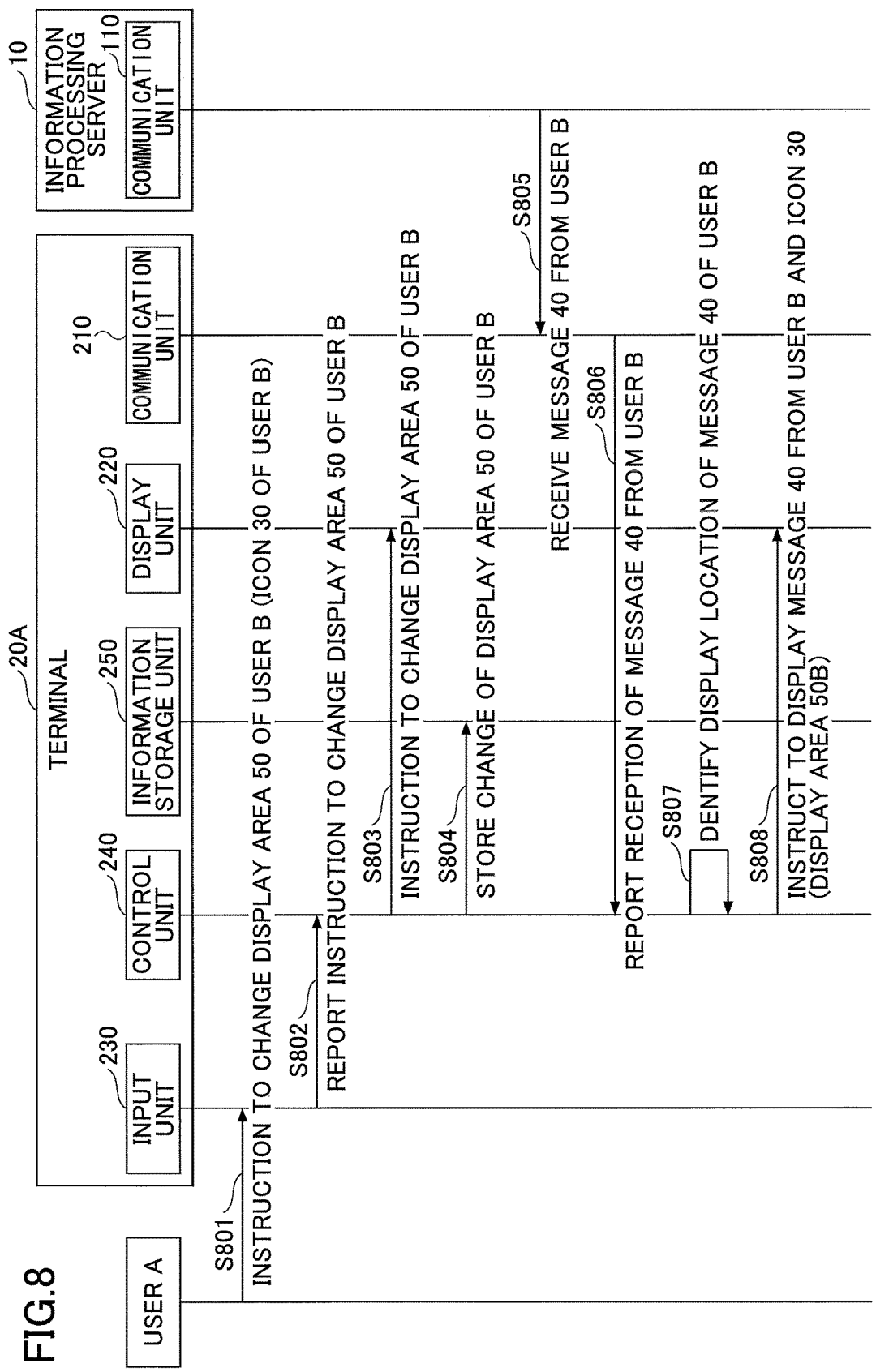
FIG. 8 illustrates an example of an operation sequence according to the first embodiment (part 1)

FIG. 8 illustrates an example of an operation sequence according to the first embodiment (part 1). FIG. 8 illustrates an operation sequence in the case where the terminal 20 implements control of changing the display position of information of a user.

In step S801 the input unit 230 of the terminal 20A receives, from the user A, an instruction to change the display area 50 of the information of the user B, from the display area 50A to the display area 50B. This instruction may be executed by selecting an icon 30 of the user B displayed on the display unit 220, and performing a predetermined operation. Note that this instruction may be executed by selecting a message 40 of the user B displayed on the display unit 220, and performing a predetermined operation.

In step S802, the input unit 230 reports, to the control unit 240, that the input unit 230 has received an instruction to change the display area 50 of the user B from the display area 50A to the display area 50B. This report includes information indicating which icon 30, among one or more icons 30 of the user B, been selected.

In step S803, the control unit 240 instructs the display unit 220 to change the display area 50 for displaying information such as the selected icon 30 of user B and the message 40, etc., accompanying the icon 30, from the display area 50A to the display area 50B. The display unit 220 displays the information of users such as the icons 30 and the messages 40 in chronological order. The control unit 240 instructs the display unit 220 to change the display area 50 for displaying the information of the user B to be displayed, from and after the selected icon 30 of the user B, from the display area 50A to the display area 50B.

In step S804, the control unit 240 instructs the information storage unit 250 to change the display area 50 stored for the user B, from the display area 50A to the display area 50B.

In step S805, the communication unit 210 of the terminal 20A receives the message 40 from the user B, via the information processing server 10.

In step S806, the communication unit 210 reports to the control unit 240 that the message 40 has been received from the user B.

In step S807, the control unit 240 refers to the information storage unit 250, and identifies that the display area 50 of the message 40 of the user B, is the display area 50B.

In step S808, the control unit 240 instructs the display unit 220 to display the message 40 of the user B and the icon 30 corresponding to the message 40, in the display area 50B.

As described above, when the information of the user B is selected, and the display area 50 of the selected user B is changed to the display area 50B, the information of the user B from and after the selected information is displayed in the display area 50B.

Note that in step S801, the terminal 20A is changing the display area 50 in response to receiving an instruction from the user A; however, the display area 50 may be changed in response to receiving an instruction from the information processing server 10. This instruction may be sent from the information processing server 10 in response to an operation of another terminal 20. For example, when the displays of the terminals 20 of users belonging to the same group are to be unified, the display area 50 may be changed in response to receiving an instruction from the information processing server 10.

Figure 9:
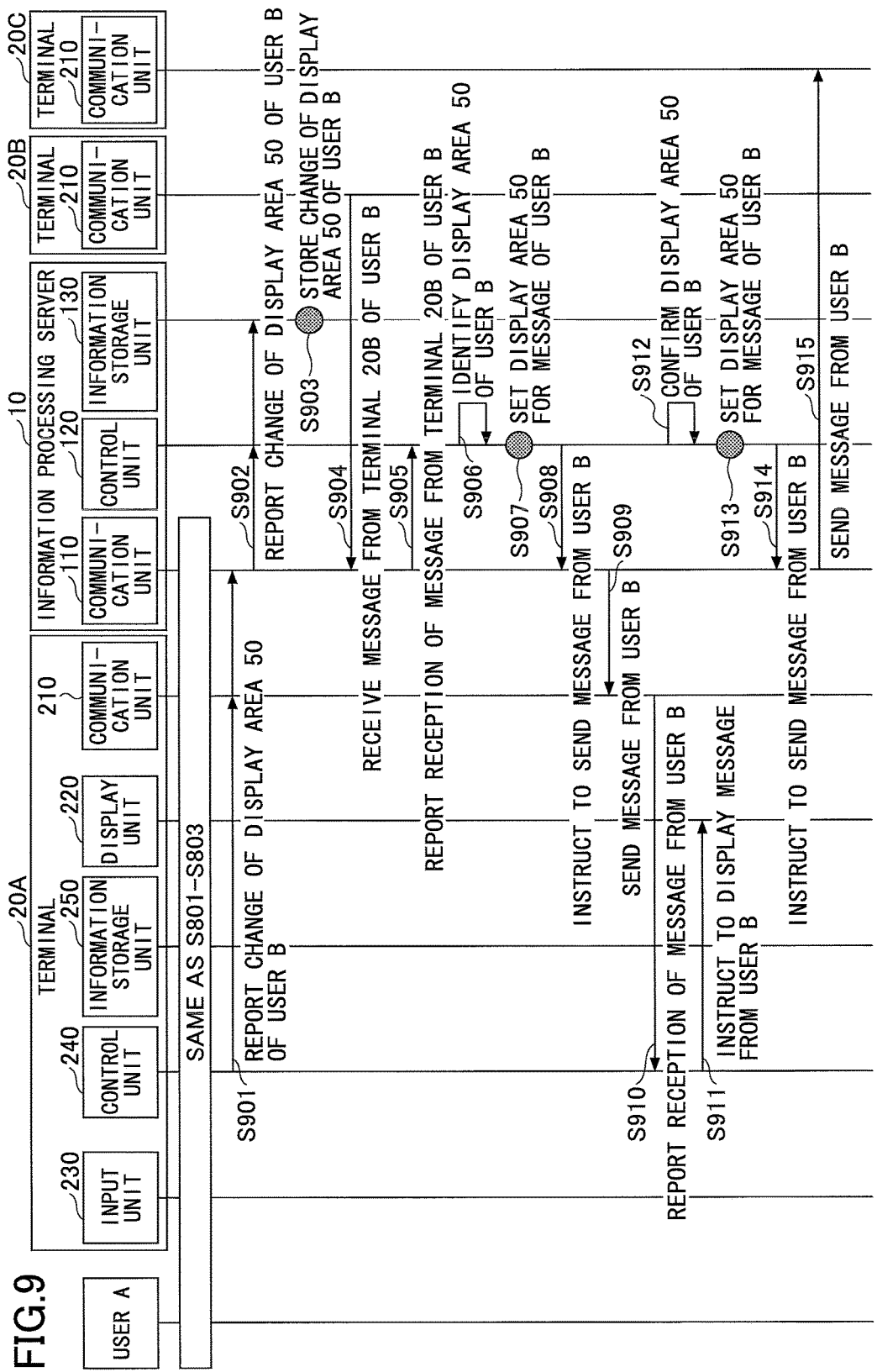
FIG. 9 illustrates an example of an operation sequence according to the first embodiment (part 2)

FIG. 9 illustrates an example of an operation sequence according to the first embodiment (part 2). FIG. 9 illustrates an operation sequence in the case where the terminal 20 and the information processing server 10 cooperate with each other to implement control to change the display position.

In the case of the sequence of FIG. 9, first, processes similar to steps S801 through S803 described above are executed, and the display area 50 of the information of the user B is changed from the display area 50A to the display area 50B.

In step S901, the control unit 240 of the terminal 20A sends a report indicating that the display area 50 of the user B has been changed, via the communication unit 210. This report includes an indication that the display area 50 of the information of the user B has been changed from the display area 50A to the display area 50B.

In step S902, the communication unit 110 of the information processing server 10 sends the report indicating that the display area 50 of the user B has been changed, received from the terminal 20A, to the control unit 120. The control unit 120 instructs the information storage unit 130 to store the change of the display area 50.

In step S903, the information storage unit 130 stores that the display area 50 of the information of the user B has been changed from the display area 50A to the display area 50B.

In step S904, the communication unit 110 receives a message 40 addressed to the user A and the user C, from the terminal 20B of the user B.

In step S905, the communication unit 110 reports to the control unit 120 that the message 40 has been received from the user B.

In step S906, the control unit 120 refers to the information storage unit 130, and identifies that the display area 50 in the terminal 20A of the user A, for displaying the message 40 from the user B, is the display area 50B.

In step S907, the control unit 120 sets the display area 50 with respect to the message 40 from the user B. The control unit 120 sets, in the message 40, an information element indicating to display the message 40 in the display area 50B.

In step S908, the control unit 120 instructs the communication unit 110 to send the message 40 from the user B for which the setting process has been completed, to the terminal 20A of the user A.

In step S909, the communication unit 110 sends the message 40 from the user B, to the terminal 20A.

In step S910, the communication unit 210 of the terminal 20A reports to the control unit 240 that the message 40 from the user B has been received.

In step S911, the control unit 240 confirms the setting relevant to the display area 50 of the message 40 from the user B, and identifies that the display area 50 of the message 40 is the display area 50B. The control unit 240 instructs the display unit 220 to display the message 40 from the user B together with the icon 30 of the user B, in the display area 50B.

In step S912, the control unit 120 refers to the information storage unit 130, and confirms the display area 50 in which the message 40 from the user B is to be displayed in the terminal 20C of the user C. For example, in step S901, when the display area 50 for displaying the information of the user B in the terminal 20C of the user C, has been changed from the display area 50A to the display area 50B, in response to the report received from the terminal 20A of the user A, the display area 50B is stored as the display area 50 for displaying the message 40 of the user B at the terminal 20C.

Here, the description is continued assuming that the display area 50B is stored as the display area 50 for displaying the message 40 from the user B at the terminal 20C of the user C.

In step S913, the control unit 120 sets the display area 50 with respect to the message 40 from the user B.

In step S914, the control unit 120 instructs the communication unit 110 to send the message 40 from the user B, for which the setting process has been completed, to the terminal 20C of the user C.

In step S913, the communication unit 110 sends the message 40 from the user B, to the terminal 20C of the user C. When the message 40 is received, the terminal 20C of the user C displays the message 40 in the display area 50B of the terminal 20C.

(2) Flowchart

FIG. 10 is an example of a flowchart relevant to a process by the terminal 20 according to the first embodiment.

In step S1001, the input unit 230 of the terminal 20 determines whether an operation to move the information of a user displayed on the display unit 220 to a predetermined area, is detected. Here, "user" means the user of the terminal 20, and a user relevant to the user of the terminal 20 in SNS. Furthermore, "information of a user" means the icon 30, the message 40, the post 60 to SNS, etc., of these users.

When the input unit 230 determines that an operation is detected (YES in step S1001), the process proceeds to step S1002. On the other hand, when the input unit 230 cannot determine that an operation is detected (NO in step S1001), the input unit 230 continues to determine whether an operation is detected.

In step S1002, the input unit 230 of the terminal 20 determines whether the detected operation is to change the display area 50. When the detected operation is to change the display area 50 (YES in step S1002), the process proceeds to step S1003. On the other hand, when the detected operation is not to change the display area 50 (NO in step S1002), the process proceeds to step S1004.

When a predetermined operation is received from the user, the input unit 230 may determine that the operation is to change the display area 50. Here, the predetermined operation may be set in advance in the application, etc., of SNS. For example, the operation may be to scroll the selected information of a user by greater than or equal to a predetermined distance toward the changed display area 50, the operation may be flicking the information, the operation may be to select the information a plurality of times at a predetermined speed, etc.; however, the operation is obviously not limited to these operations.

In step S1003, the control unit 240 performs a process of changing the display area 50 of the information of a user, and instructs the display unit 220 to change the display area 50.

In step S1004, the input unit 230 of the terminal 20 determines whether the detected operation is an instruction to start a process with respect to the application of SNS.

For example, when the information of a user is selected and a predetermined operation is performed, the input unit 230 may determine that an instruction to start a process relevant to the selected user has been input. A process relevant to the user is, for example, sending a one-on-one message 40 to the selected user, a process of withdrawing the selected user from the chat group, etc.

When the input unit 230 detects an operation of moving the information of a user outside the display unit 220, the input unit 230 may determine that an instruction to start a process of withdrawing the selected user from the chat group has been received. For example, when the input unit 230 detects that the information of a user has reached the outer edge of the display unit 220, the input unit 230 may determine that an instruction to start a process of withdrawing the selected user from the chat group has been received.

Furthermore, for example, when the input unit 230 detects an operation of moving the information of a user in a predetermined direction in the display unit 220, or an operation of superimposing the information of a user on a predetermined icon 30, the input unit 230 may determine that an instruction to start a process for sending a one-on-one message 40 to the selected user has been received.

When the input unit 230 determines that the operation is an instruction to start a process (YES in step S1004), the process proceeds to step S1005. When the input unit 230 does not determine that the operation is an instruction to start a process (NO in step S1004), the input unit 230 ends the process.

In step S1005, the control unit 240 executes the process received by the input unit 230.

Modified Example of Display (1) Change of Display Area in Timeline Service

FIGS. 11A through 12C illustrate examples of transitions of a display screen when changing the display area 50 in a timeline service according to the first embodiment.

Figure 11A:
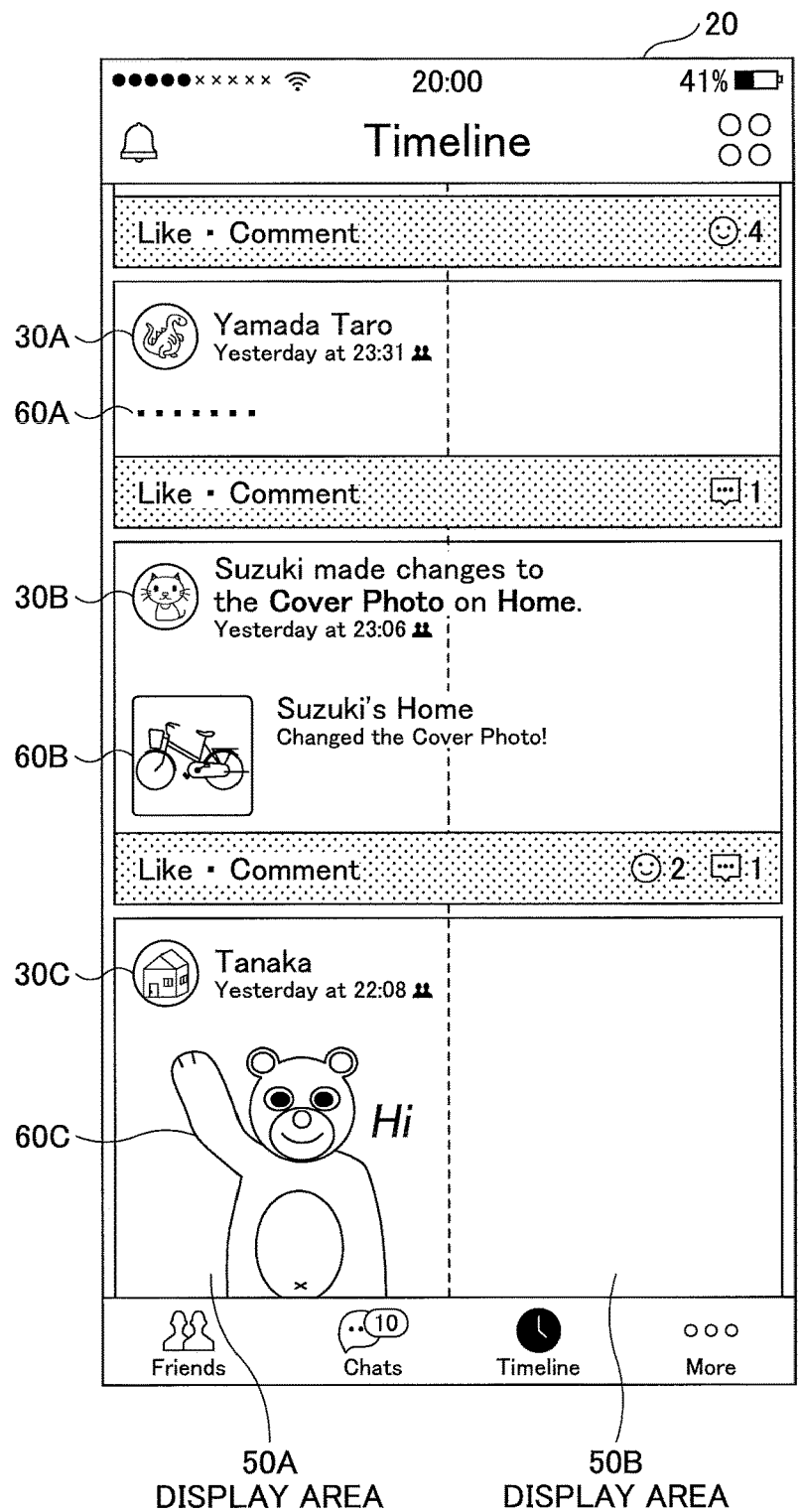
FIGS. 11A through 11C illustrate examples of transitions of a display screen when changing the display area in a timeline service according to the first embodiment (part 1)

Also in a timeline service, it is possible to change the display position of the information of a user, similar to a chat service. A timeline service is a service of receiving posts 60 from the user himself, users relevant to the user, etc., to a message board (wall) provided for each user of the SNS service, and displaying the posts 60 in chronological order. FIG. 11A illustrates an example of a display screen of a timeline of the terminal 20. The posts 60 of the user or the terminal 20 and users relevant to the user, etc., are sequentially displayed in chronological order, starting from the newest post 60.

Figure 11B:
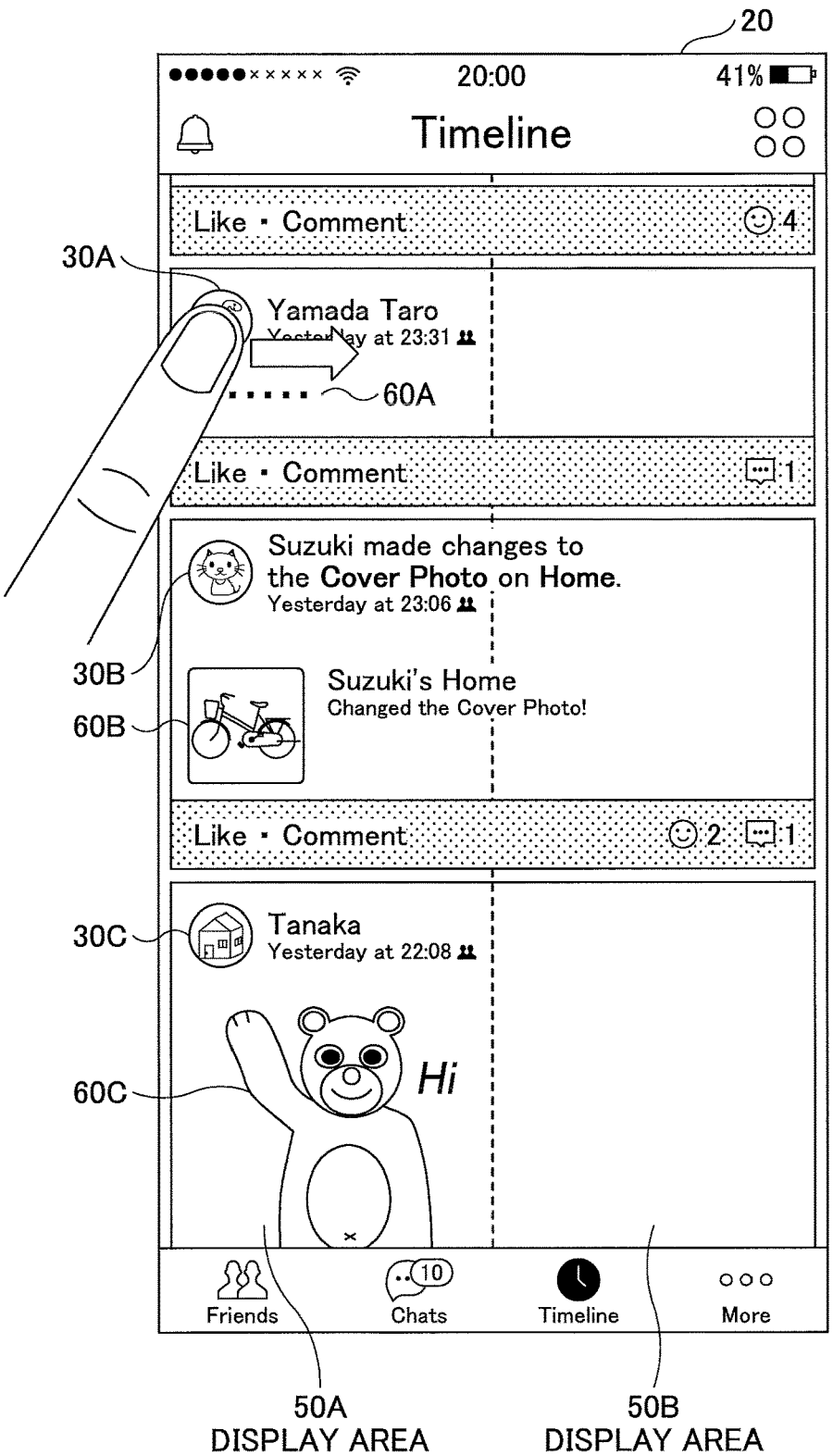

FIG. 11B illustrates the icon 30A being selected and swiped toward the display area 50B.

In this case also, similar to the chat service, the display area 50 for displaying the icon 30A selected according to the user's operation, and the post 60A corresponding to the icon 30A is changed from the display area 50A to the display area 50B.

Figure 11C:
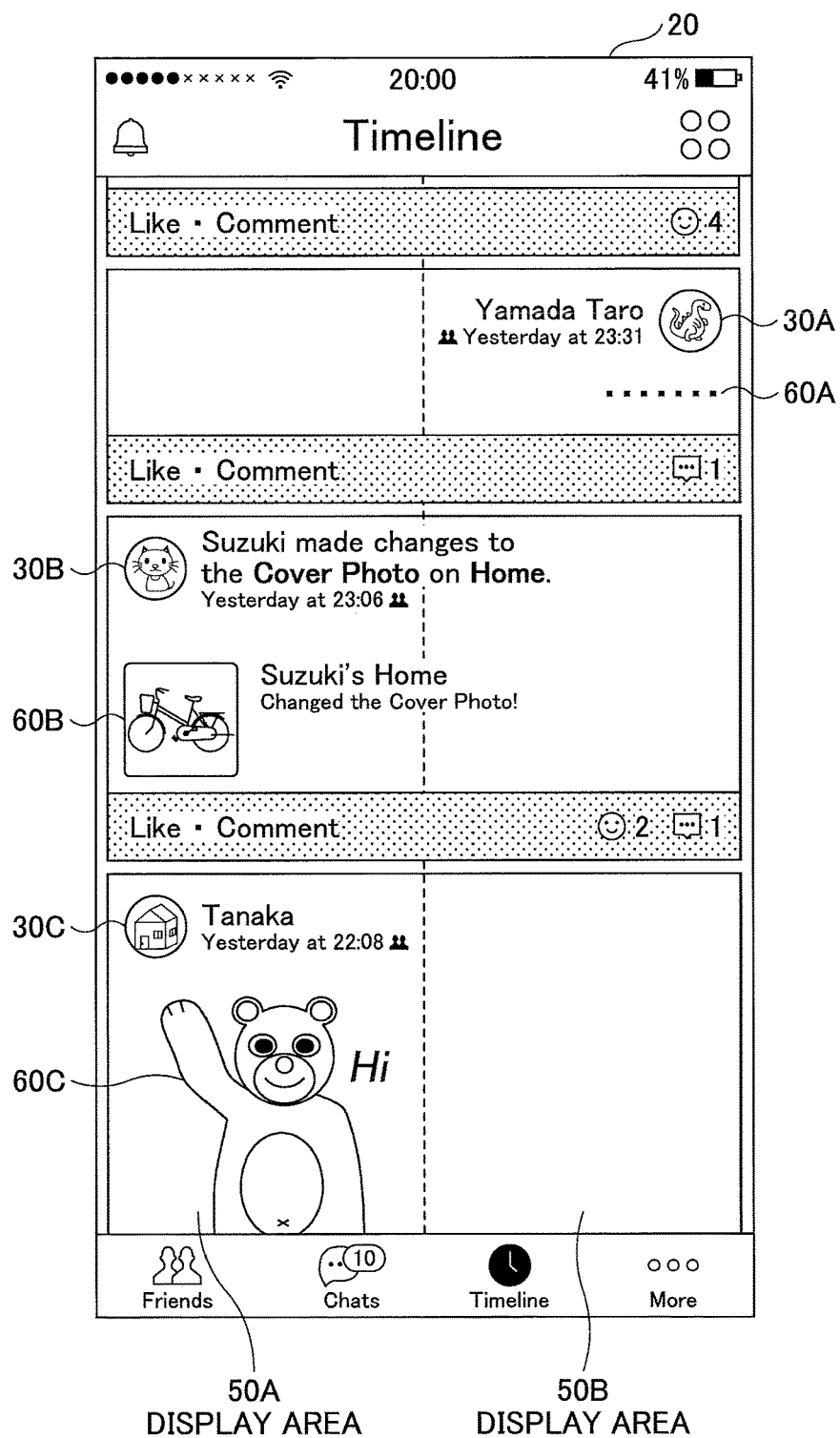

FIG. 11C illustrates an example of a screen display after the change. The icon 30A and the post 60A are displayed in the display area 50B. Note that part of the information of the user may be sticking out from the display area 50A.

Figure 12A:
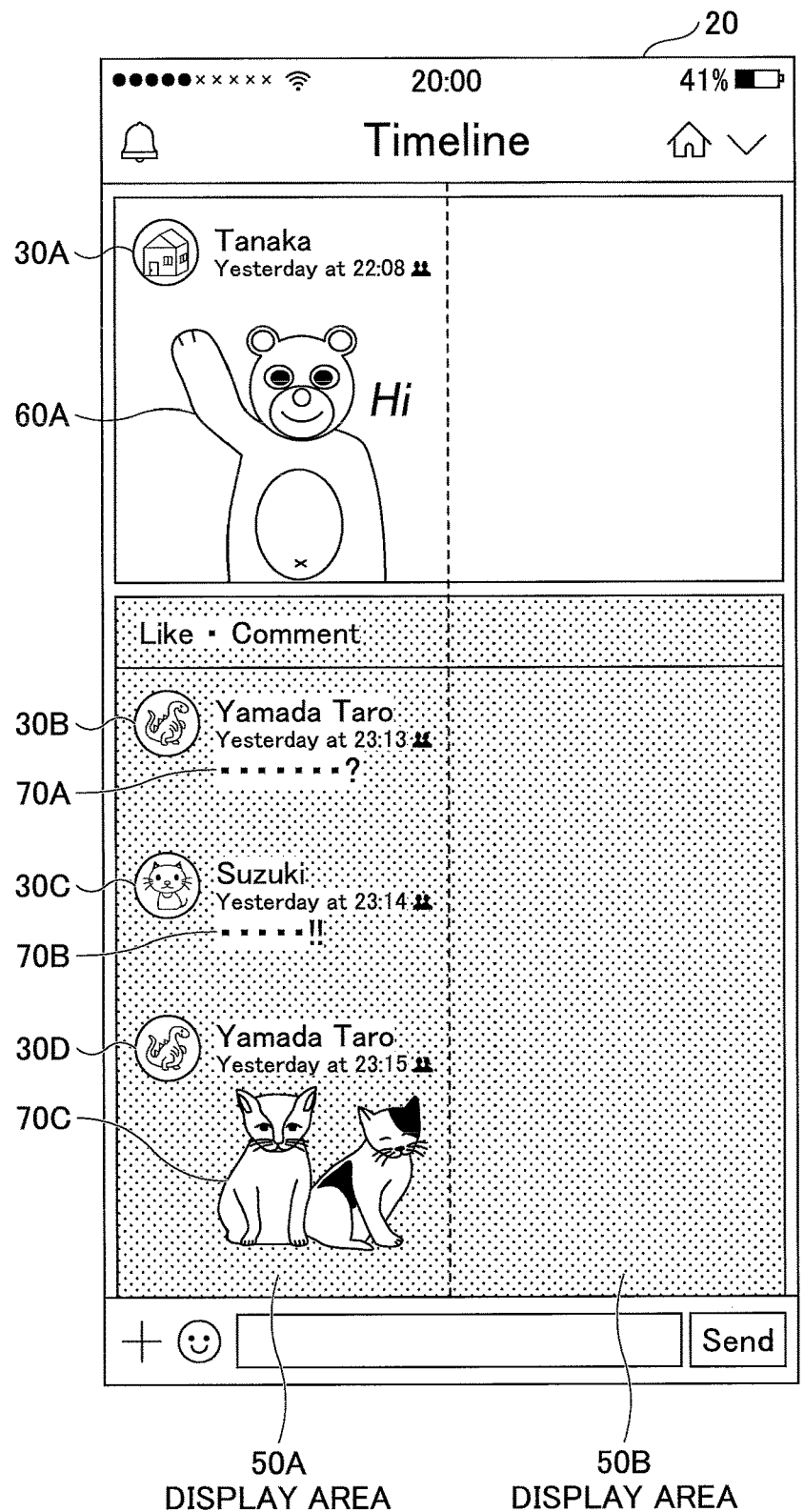
FIGS. 12A through 12C illustrate examples of transitions of a display screen when changing the display area in a timeline service according to the first embodiment (part 2)
Figure 12B:
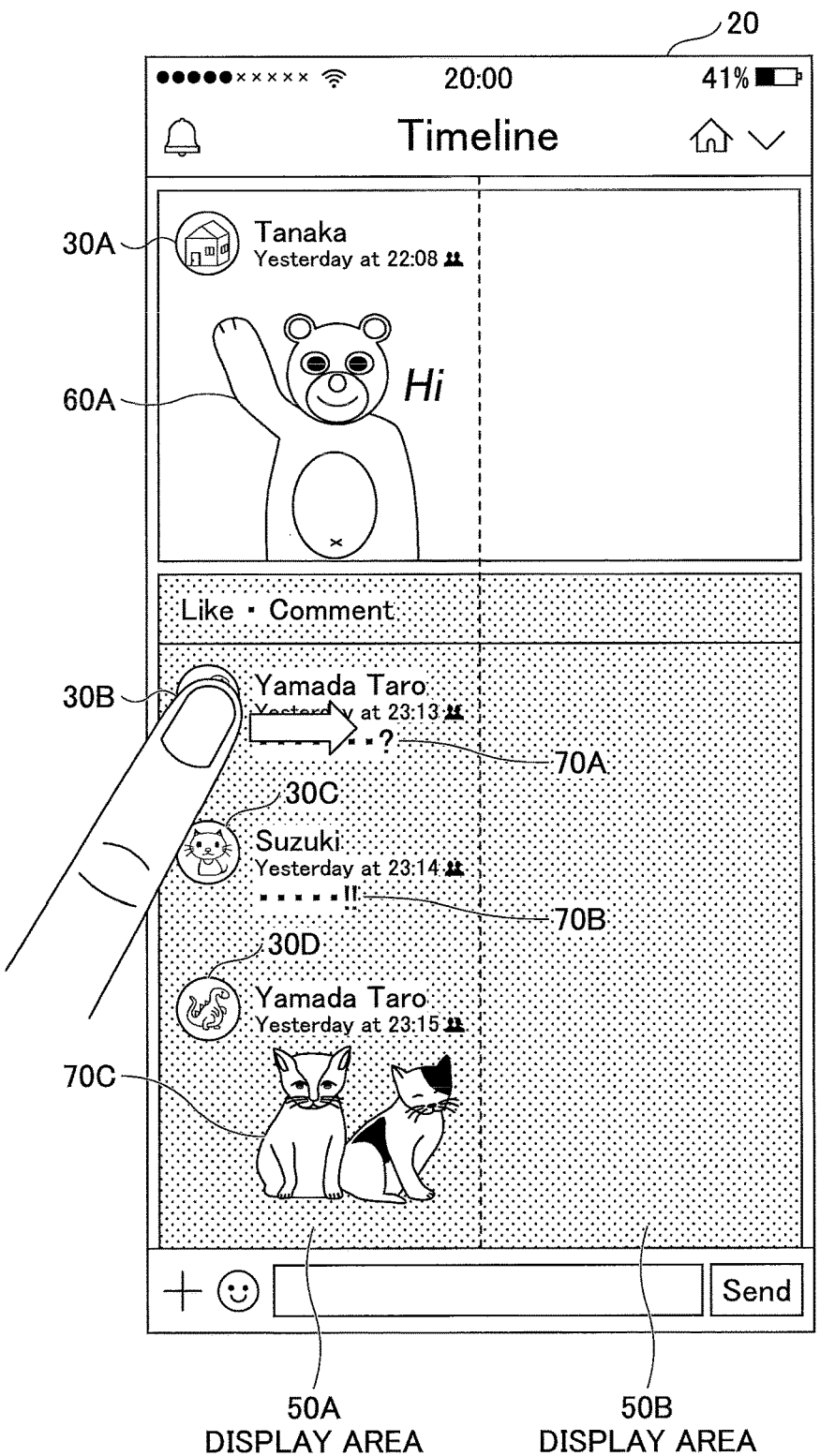
Figure 12C:
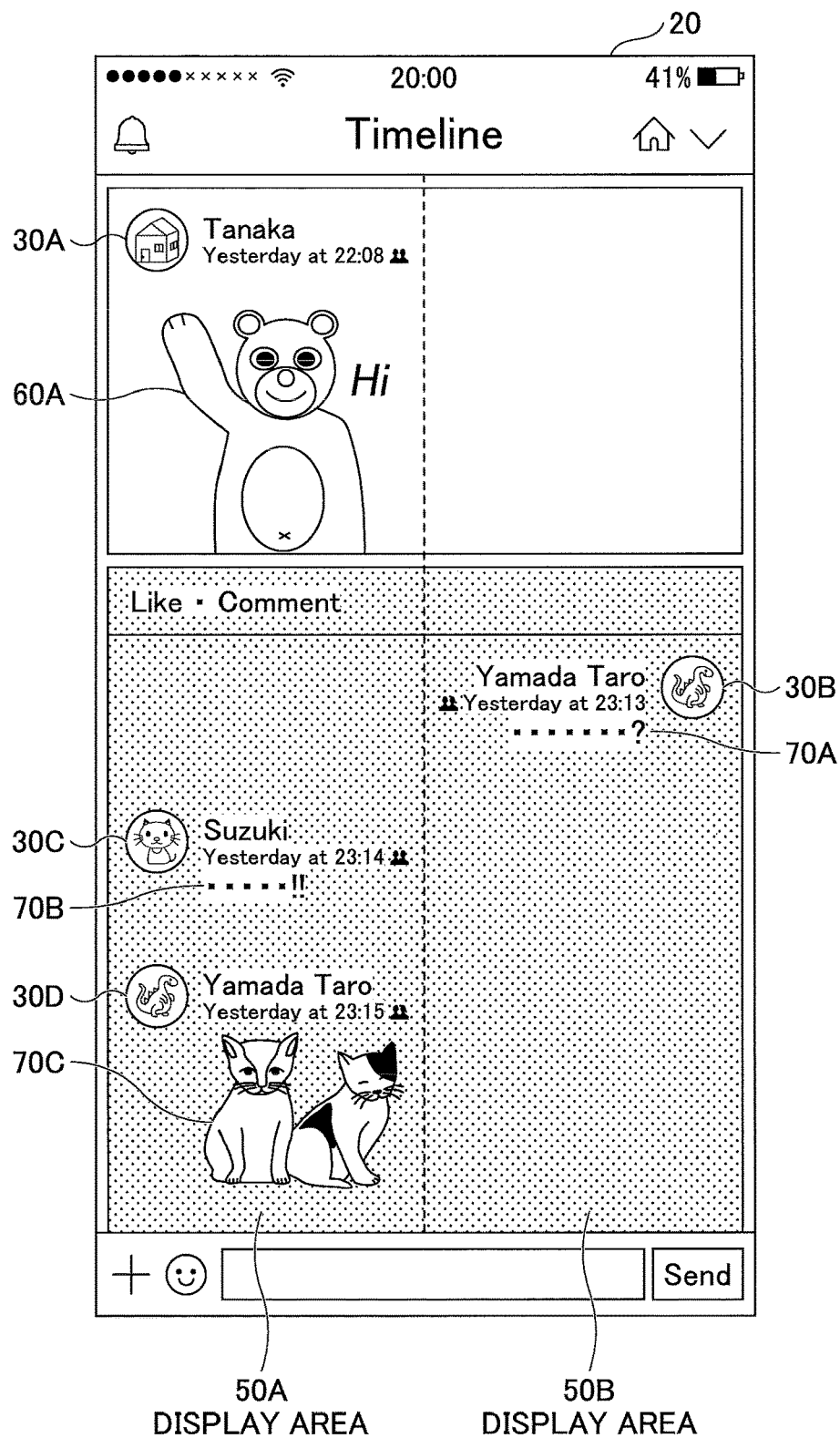

FIGS. 12A through 12C illustrate another example of a display screen of the timeline service. The display area 50 may be changed similarly with respect to a comment 70 accompanying the post 60.

FIG. 12A illustrates the post 60 of the user and users relevant to the user being displayed in chronological order, and the comments 70 accompanying the post 60 being displayed below the post 60.

FIG. 12B illustrates the icon 30B being selected and swiped toward the display area 50B.

In this case also, the display area 50 of the icon 30B selected according to a user's operation and a comment 70A corresponding to the icon 30B is changed from the display area 50A to the display area 50B.

FIG. 12C illustrates an example of the screen display after the change. The display area 50A of the icon 30B and the comment 70A is changed to the display area 50B.

(2) Activation of Process

FIGS. 13A through 14B illustrate examples of display screens when activating the process performed by the terminal 20 while using SNS.

When the input unit 230 of the terminal 20 determines that the information of a user is selected and a predetermined operation is executed with respect to the selected information of a user (step S1001, step S1004 of FIG. 10), the control unit 240 may execute a predetermined process with respect to the selected user.

FIGS. 13A and 13B illustrate an operation of the user to the terminal 20 being received and a process of creating a one-on-one message 40 being activated. FIG. 13A illustrates that an icon 30C indicating a user B is selected and is swiped downward in the display screen.

In response to the downward swiping operation with respect to the icon 30S, the control unit 240 activates a process of creating a one-on-one message 40. Specifically, as illustrated in FIG. 13B, the user B is set at "To" that indicates the address, and a keyboard is displayed in the display screen.

The message that is sent may be sent to a one-on-one talk room with the user B, or may be sent to a chat group such that only the user B is able to view the message.

Figure 14A:
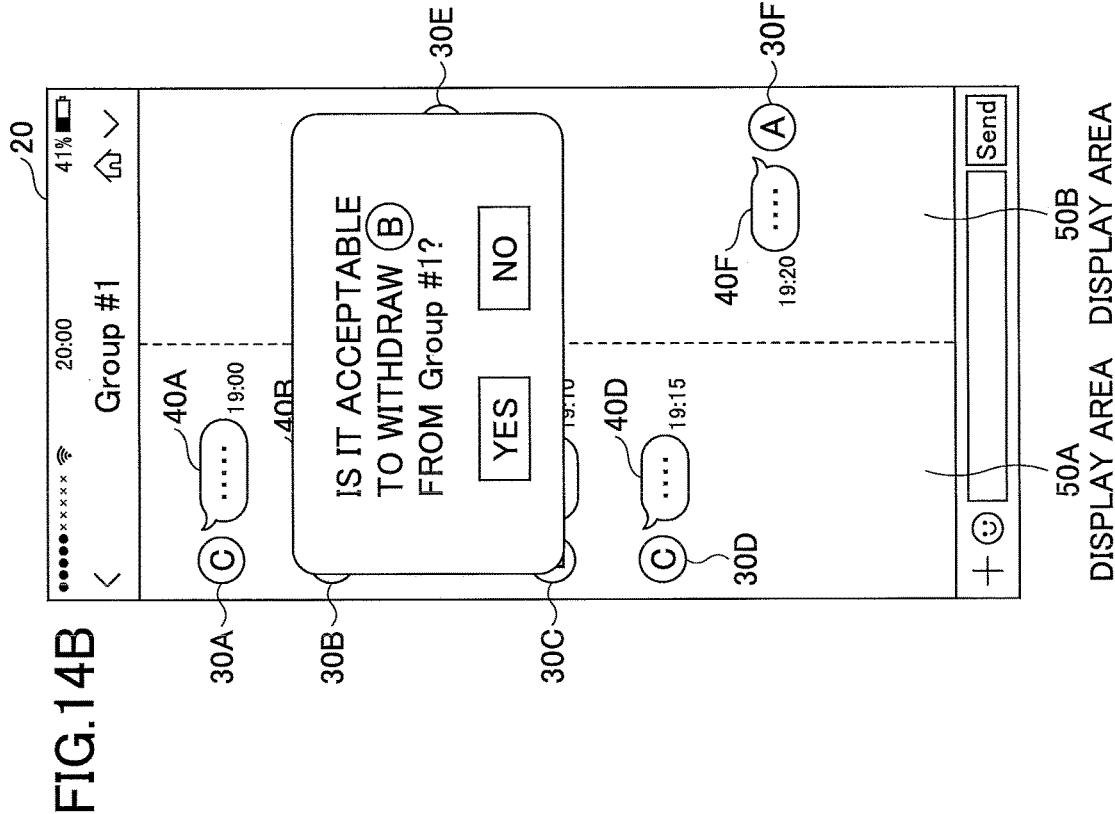
FIGS. 14A and 14B illustrate examples of transitions of a display screen when activating the process performed by the terminal according to the first embodiment (part 2)
Figure 14B:
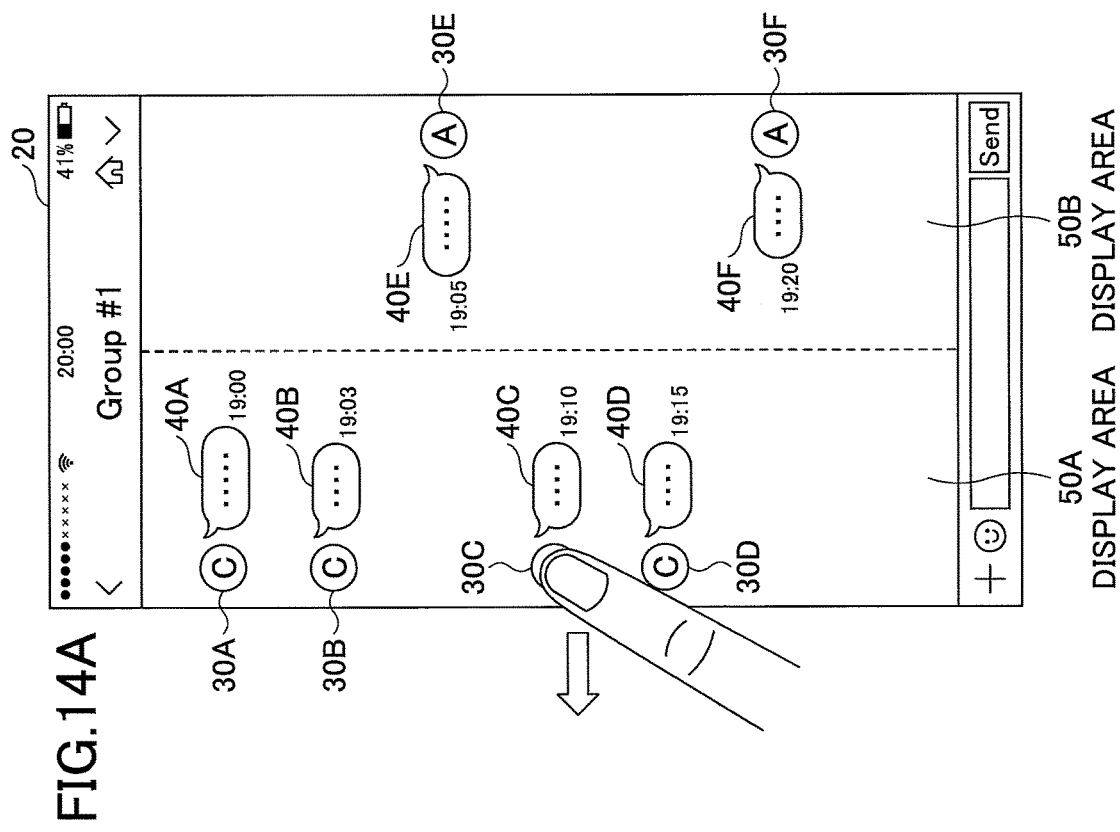

FIGS. 14A and 14B illustrate an operation of the user of the terminal 20 being received and a process of withdrawing the user B from the chat group being activated. In FIG. 14A, the icon 30S of the user B is selected, and swiped toward the outside of the display screen. The input unit 230 detects that the information of the user has reached the outer edge of the display unit 220, by the operation of swiping the information of the user, and determines that an instruction to start a process of withdrawing the selected user from the chat group is received.

In response to the operation of swiping the icon 305 toward the outside, the control unit 240 activates a process of withdrawing the user B from Group 41 that is a coat group. Specifically, as illustrated in FIG. 14B, a message prompting to confirm "Can user B be withdrawn from Group #1?" is displayed on the display screen.

(3) Change to Default Display

FIGS. 15A through 15D illustrate examples of transitions of a display screen to a default display in the terminal 20 according to the first embodiment.

When the information of all users is displayed in a single display area 50 as a result of changing the display area 50 of the information of a user, there is a possibility that the information of the user becomes difficult to confirm. Therefore, when the input unit 230 receives an operation that displays the information of all users in a single display area 50, the control unit 240 may instruct the display unit 220 to return to the default display.

FIG. 15A illustrates the information of a user C being displayed in the display area 50A, and the information of the user A and the user B being displayed in the display area 50B, when the chat service is used among the user A, the user B, and the user C that belong to Group #1.

FIG. 15B illustrates the icon 30B of the user B being selected and swiped toward the display area 50B. This operation is for changing the display area 50 of the user B to the display area 50B.

Figure 15D:
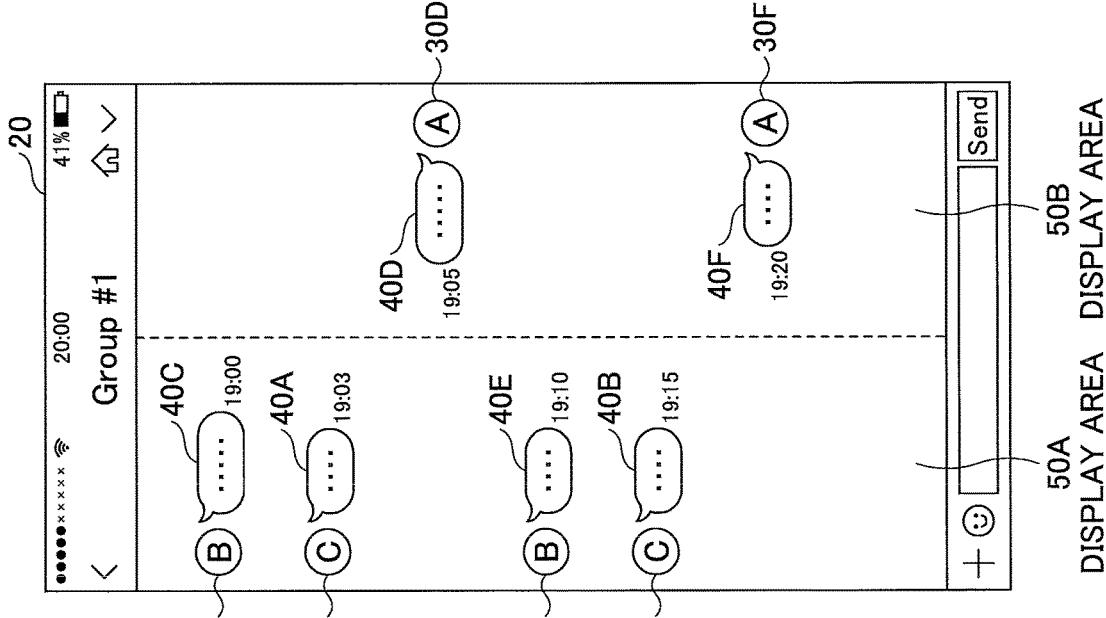
Figure 15C:
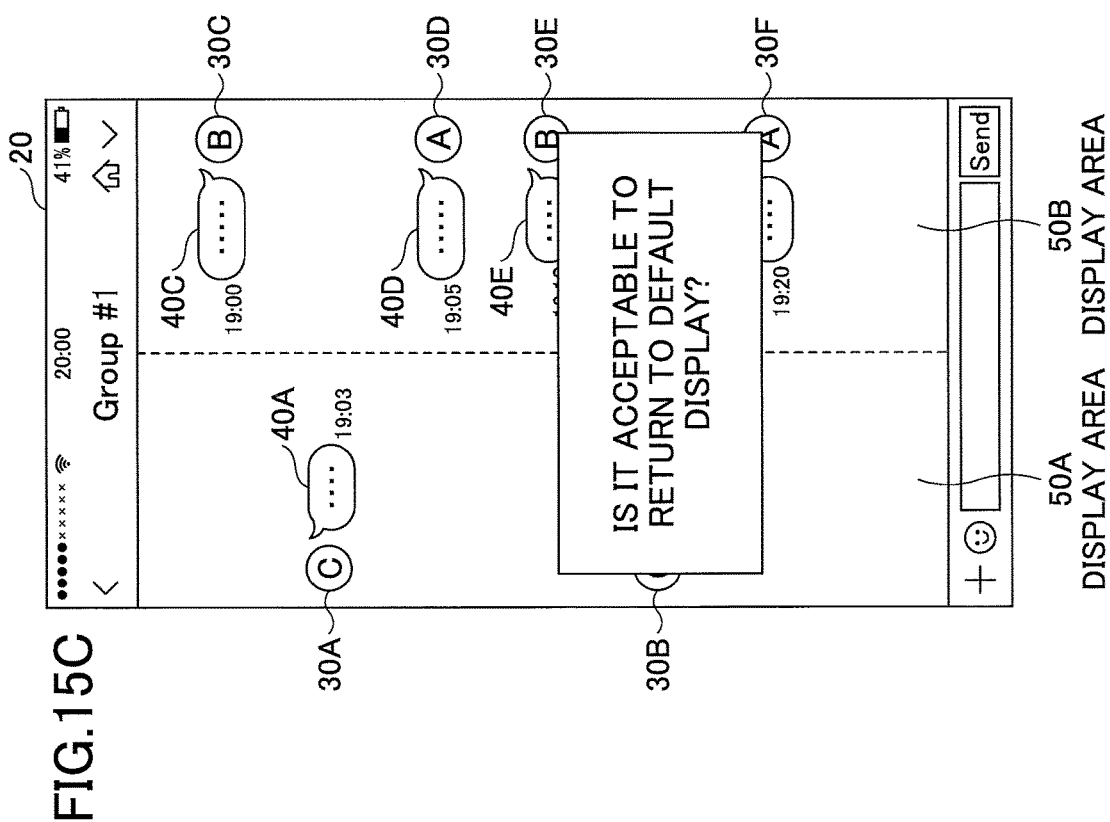

When this operation is received, the information of all users will be displayed in the display area 50B, and therefore the control unit 240 causes the display unit 220 to display a screen for confirming whether it is acceptable to return to the default display (FIG. 15C).

When the input unit 230 receives an instruction that it is acceptable to return to the default display, the control unit 240 instructs the display unit 220 to return to the default display.

FIG. 15D illustrates the default display. The information of the user A of the terminal 20 is displayed on the right side, and information of other users (user B, user C) is displayed on the left side.

(4) Setting Example of Display Area (Other)

In the embodiment described above, examples of displaying the information of users in two display areas 50 are described; however, three or more display areas 50 may be set in the display screen.

Figure 16:
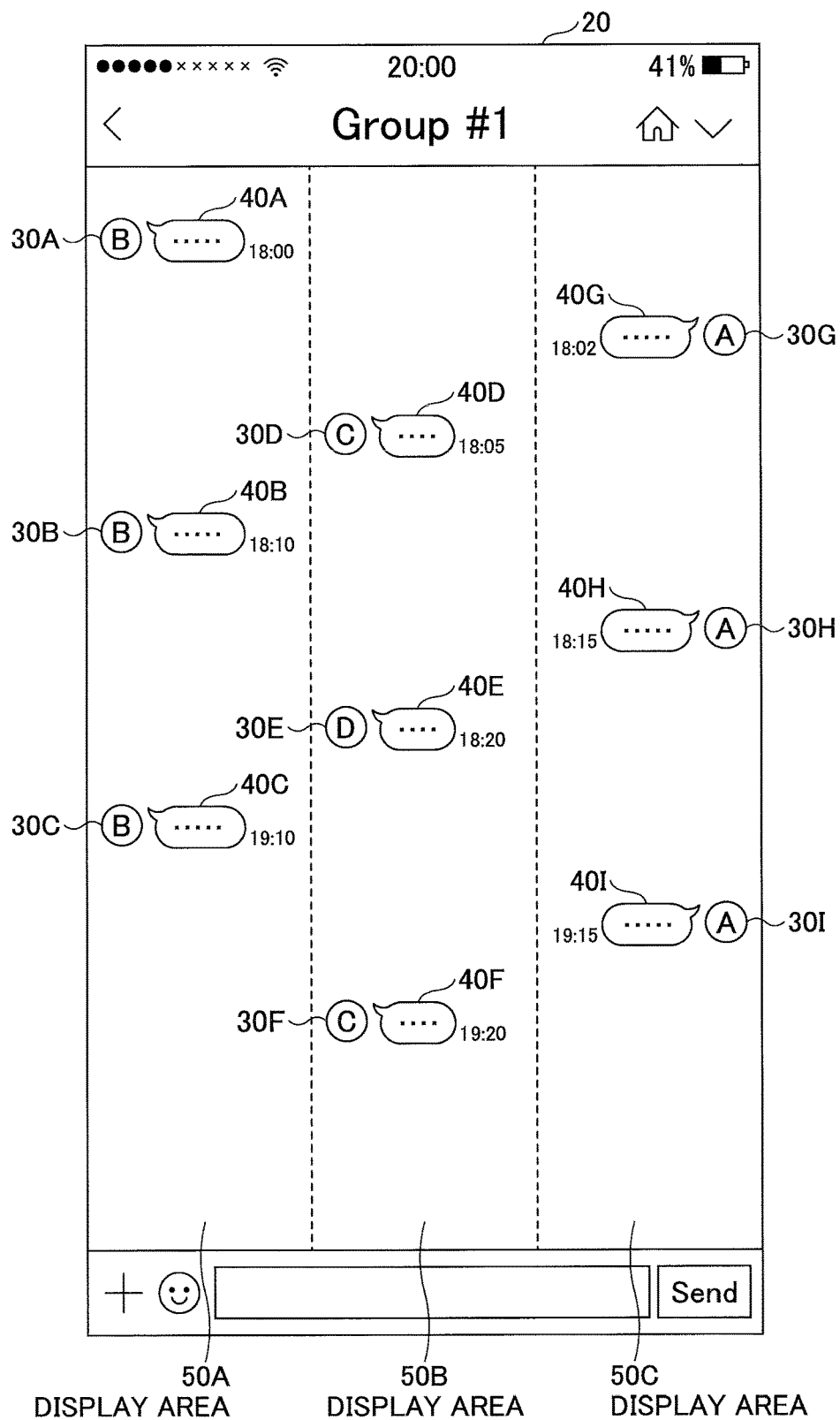
FIG. 16 illustrates an example of a display screen of the terminal according to the first embodiment (part 1)

FIG. 16 illustrates an example of a display screen of the terminal 20 according to the first embodiment (part 1). Three display areas 50 are set the display screen, and in each display area 50, icons 30 and messages 40 of users are displayed. The sizes and widths of the display areas 50 may be set to be equal or may be adjusted according to the amount of information of users displayed in the display areas 50, the numbers of users set in the display areas 50, etc.

Note that the boundary lines between the display areas 50 are assumed to be displayed in a manner that cannot be recognized by the user; however, the display unit 220 may display separator lines of the display areas. Furthermore, the display unit 220 may set the background colors for the respective display areas 50, or may set a gradation in the backgrounds for the respective display areas 50. Accordingly, the user will be able to recognize the respective display areas 50.

Figure 17:
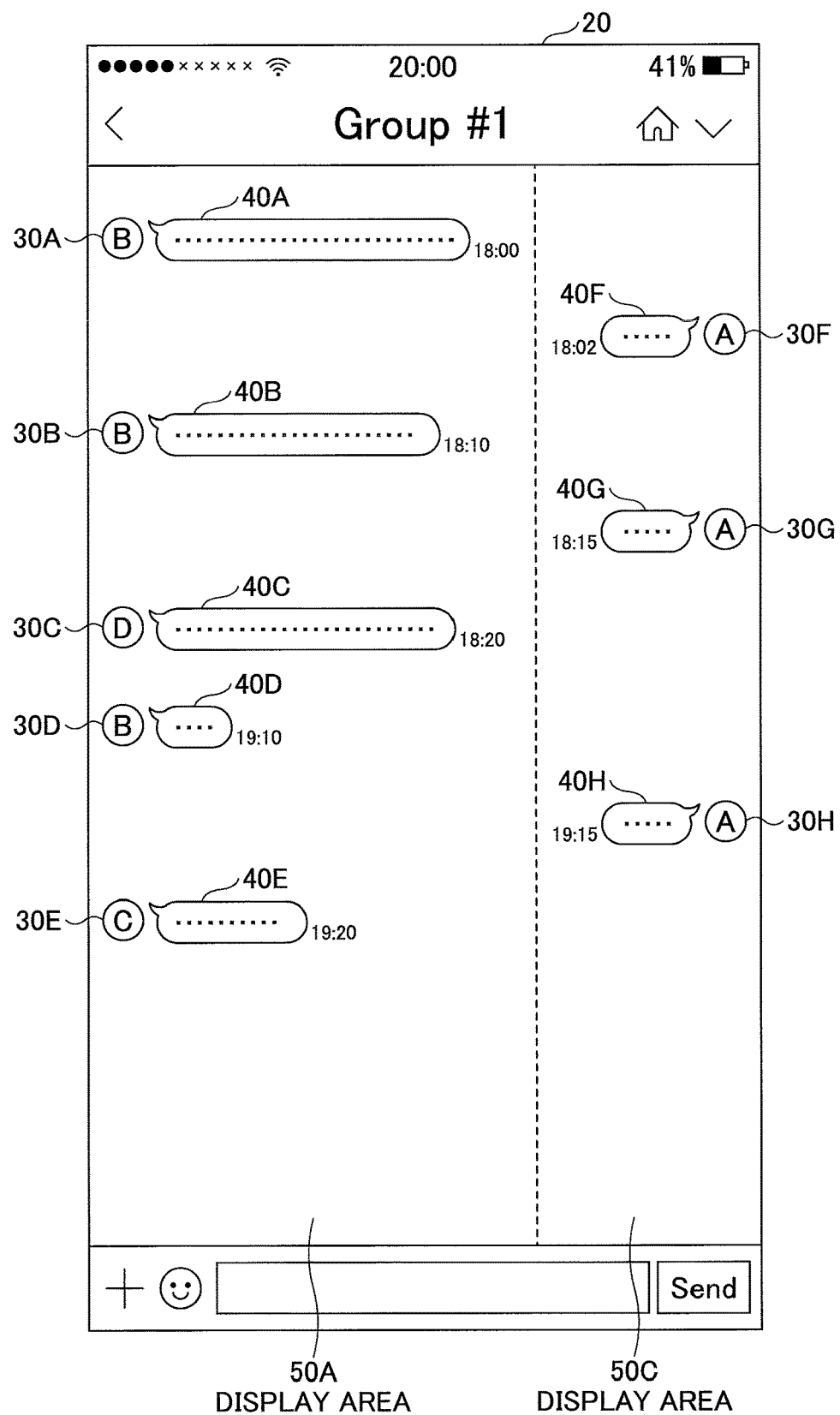
FIG. 17 illustrates an example of a display screen of the terminal according to the first embodiment (part 2)

Furthermore, the ratio of the display area 50 in the display screen may be changed according to need as the terminal 20 receives an instruction from the user. FIG. 17 illustrates an example of a display screen of the terminal 20 according to the first embodiment (part 2). In the example of FIG. 17, the ratio of the display area between the display area 50A and the display area 50B is substantially 7 to 3. Accordingly, it is possible to set the ratio of the display areas 50 in the display screen based on the number of information items of users, the number of messages 40, etc., displayed in each display area 50.

The above examples of the display of the terminal 20 describe changing the display area 50 of a message 40 or a post 60 corresponding to an icon 30 in addition to the icon 30 of the selected user; however, the display area 50 of only the icon 30 of the selected user may be changed, or the display area 50 of only the corresponding message 40 or post 60 may be changed.

The input unit 230 may receive a setting relevant to the users for which the information of users are to be displayed in the same display area 50, and store the setting in the information storage unit 250. For example, the input unit 230 receives a setting of making the display area 50 for displaying the information of users of user A and user B as the display area 50A, and stores the setting in the information storage unit 250. The control unit 240 controls the display unit 220 to display the information of users of user A and user B in the display area 50A. Note that in response to the input unit 230 receiving an instruction to change the display area 50 of either user A or user B, the control unit 240 may release the setting of displaying user A and user B in the same display area 50.

According to the above embodiment, in response to an instruction from the user, it is possible to flexibly change the display area 50 of the information of a user, and the user of the terminal 20 is able to easily confirm the necessary information from among multiple messages 40, posts 60, etc.

Note that the above display control method is applicable to cases of displaying user information in a chronological order in the terminal 20, other than a social network service.

For example, in a case where user names and comments are displayed in a video distribution site or a news site, the above display control method is applicable.

Second Embodiment

Next, a second embodiment is described. In the second embodiment, display control is provided in a case where a plurality of users have a discussion about a particular theme. Descriptions of parts that overlap the first embodiment are omitted, and only the different parts are described.
<Overview>

In a case where users have a discussion about a predetermined theme by using chat messages 40, in the information processing system 1 according to the second embodiment, the display of the terminal 20 is controlled such that the status of the discussion can be appropriately recognized.

Specifically, in the information processing system 1, a "discussion mode" is provided, which is an operation mode for appropriately recognizing the status of the discussion. The discussion mode is realized as a process is executed between the information processing server 10 and an application or a web browser for SNS operating in the terminal 20.

Figure 18C:
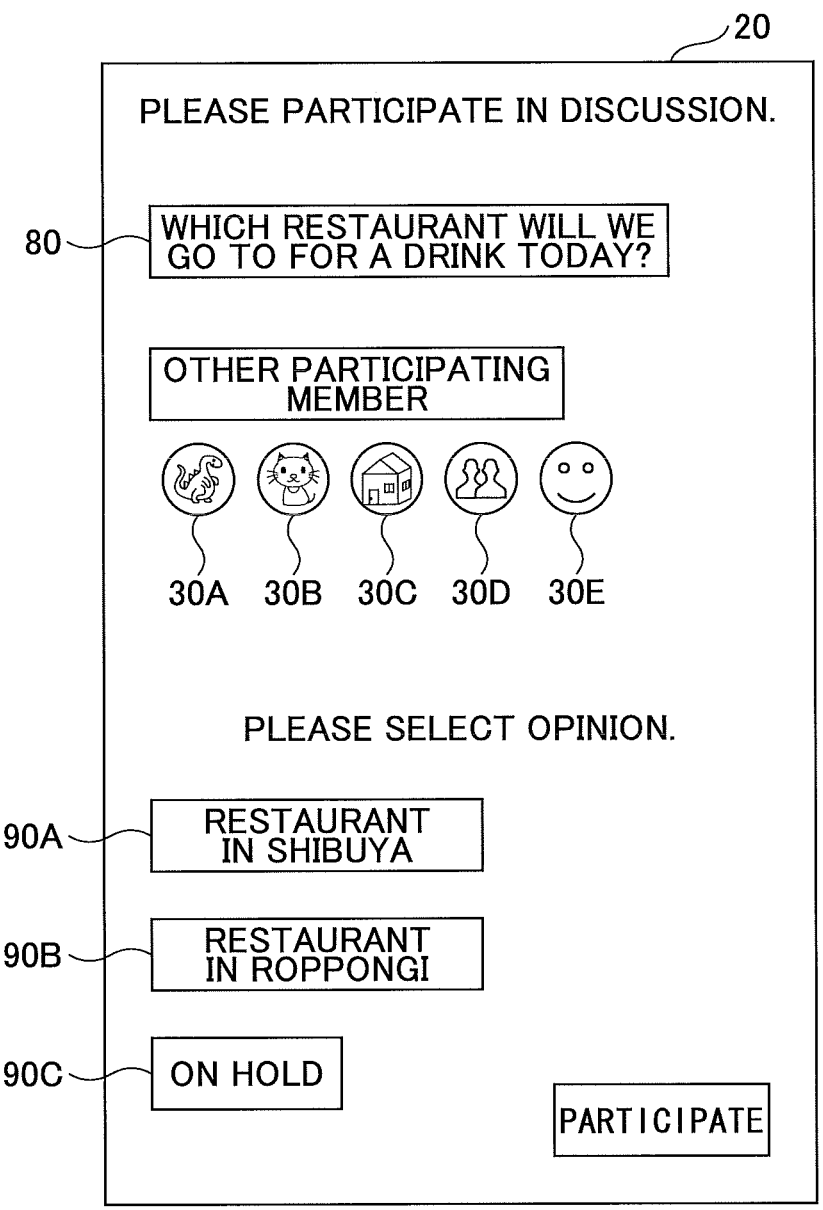
Figure 19:
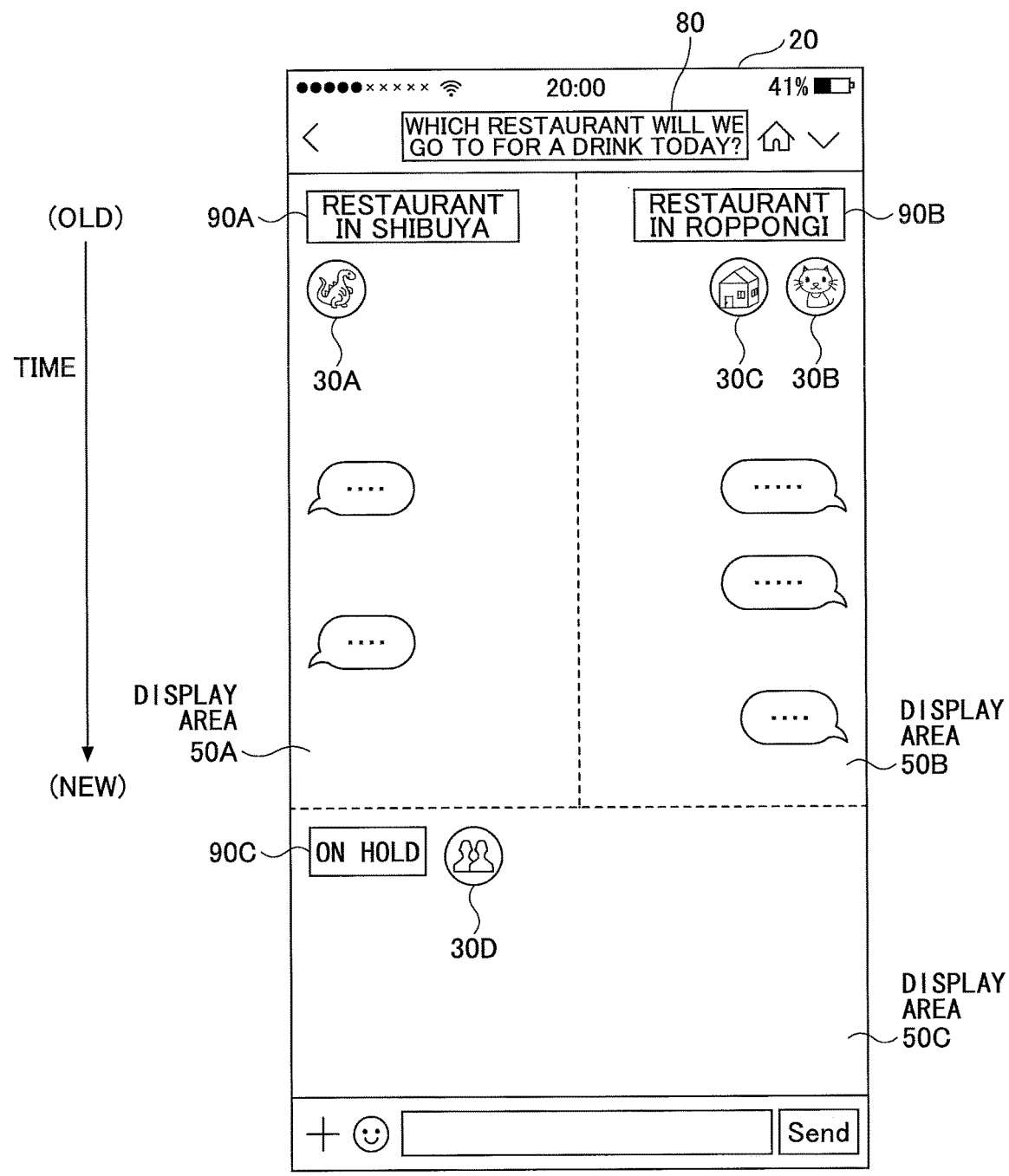
FIG. 19 illustrates an example of a display screen while the discussion mode is being executed at the terminal according to the second embodiment.

With reference to FIGS. 18A through 19, an overview of the discussion mode is described. FIGS. 18A through 18C illustrate examples of setting screens of the discussion mode in the terminal 20 according to the second embodiment.

FIG. 18A illustrates an initial setting screen of the discussion mode, which is displayed in response to the terminal 20 receiving a request to activate the discussion mode from a user. The terminal 20 receives input of necessary information for starting the discussion mode from this screen. Note that the terminal 20 may be referred to as a user terminal.

In the "discussion title input setting field", a discussion title 80 is set, which will be discussed in the discussion mode. In the "participating member selection field", the icons 30 of users who will send and receive chat messages 40 are displayed. For example, the icons 30 of users belonging to a predetermined group set by the user, may be set in the "participating member selection field" when the discussion mode is activated. In the "opinion group setting field (1 through 3)", an opinion group 90 that is an option with respect to the discussion title 80, is set. In the example of FIG. 18A, three opinion group setting fields are displayed; however, the terminal 20 is capable of creating a predetermined number of opinion groups 90 according to a request from the user.

The following describes a case where the discussion title 80 is input in the terminal 20 of the user participating in the discussion mode; however, the discussion title 80 may be set by a user who is not participating in the discussion mode, or a third party (for example, the operator of the SNS, a newspaper company, a TV station, a teacher, etc.). Furthermore, a temporary group may be formed for the discussion mode and members may participate in the discussion mode, or members of a group already set may participate in the discussion mode.

For example, a professor at a university, etc., may send a discussion title 80 about a research theme from his own terminal 20 to the information processing server 10, the information processing server 10 may report the discussion title to the terminals 20 of the students of the laboratory, and the students may have a discussion about the research theme.

FIG. 18B illustrates an example of a setting screen of the discussion mode. In "discussion title 80", "Which restaurant will we go to for a drink today?" is set. Furthermore, users expressed by an icon 30A, an icon 30B, an icon 30C, and an icon 303 are selected as participating members. The icons 30 of the participating members are displayed such that the user of the terminal 20 can recognize which icons 30 have been selected in FIG. 18B, the outer peripheries of the icons 30 of the selected users are highlighted and displayed.

The selection of users is executed as the user of the terminal 20 performs an operation such as tapping the icon 30 of the target user.

As the opinion groups 90, "restaurant in Shibuya", "restaurant in Roppongi", and "on hold" are set.

After receiving these inputs, the terminal 20 sends a request to start the discussion mode to the information processing server 10. The start request includes the input "discussion title 80", the "opinion groups 90", and the identifiers of the selected users.

Here, the user of the terminal 20 who has sent the request to start the discussion mode may be referred to as the organizer of the discussion mode. When the start request is received, the information processing server 10 performs a process relevant to starting the discussion mode, and sends a request to participate in the discussion mode to selected users.

When the participation request is received, at the respective terminals 20 of the selected users, a message prompting to participate in the discussion mode is displayed on the display screen.

FIG. 18C illustrates an example of a display of a message prompting to participate in the discussion mode.

"Discussion title 80", "participating members", and "opinion groups 90" are displayed.

When the terminal 20 receives the message prompting participation, and receives a selection of the opinion group 90 and a selection of a "participate" button from the user of the terminal 20, the terminal 20 sends a report of participating in the discussion mode and the selected opinion group 90, to the information processing server 10. When the information processing server 10 receives reports such as the selected opinion group 90, etc., from the respective terminals 20 of the users, the information processing server 10 reports the opinion groups 90 selected by the respective users, to the terminals 20 of users participating in the discussion. When the report is received, the opinion groups 90, etc., selected by the respective users, are displayed on the display screen at the terminal 20 of each user.

FIG. 19 illustrates an example of a display screen while the discussion mode is being executed at the terminal 20 according to the second embodiment.

A display area 50 is set for each opinion group 90. That is, according to the number of opinion groups 90, the number of display areas 50 is set. In the example of FIG. 19, the display area 50A is assigned to the opinion group 90A "restaurant in Shibuya", the display area 503 is assigned to the opinion group 90B "restaurant in Roppongi", and the display area 50C is assigned to the opinion group 90C "on hold".

Icons 30 of users are displayed in the respective display areas 50. The icons 30 of users are displayed in the display area 50 assigned to the opinion group 90 selected by the corresponding user.

When the terminal 20B of the user B receives a message 40 from the terminal 20A of the user A, the terminal 20B displays, in the display area 50B where the icon 30A of the user A is displayed, the messages 40 of the user A in chronological order from the top.

The terminal 20 may control the display screen such that the display area 50 of the opinion group 90 to which the user of the terminal 20 belongs is displayed on the right side of the display screen. For example, in FIG. 19, at the terminal 20B of the user B, the display area 50 of the opinion group 90 "restaurant in Roppongi" to which the user B belongs, is displayed on the right, side of the screen in the display area 50B. Furthermore, the icon 30B of the user B is displayed in the display area 50B.

When a plurality of users select the same opinion group 90, it may be difficult to identify the messages 40 of the user of the terminal 20. Therefore, the terminal 20 may display the messages 40 of the user of the terminal 20, by highlighting the messages, changing the background color, setting the gradation of the background, etc., such that the messages 40 of the user of the terminal 20 can be easily identified.

The number of messages 40 displayed in the display area 50 is adjusted according to the size of the display area 50. For example, the newest two to three messages 40 may be displayed.

The user who has selected the opinion group 905 "on hold" may be prohibited from posting messages 40 in the discussion mode. Accordingly, the display area 50 for the messages 40 of users who have selected opinion groups 90 other than on hold, can be expanded as much as possible.

Furthermore, the icon 30 of a user who is not participating may be displayed in a predetermined area in the display screen, such that members of the discussion mode may be added.

As described above, by operating the discussion mode, when messages 40 regarding the discussion title 80 that is a predetermined theme are exchanged among a plurality of users to have a discussion, it is possible to display the icons 30, messages 40, etc., of users in the display area 50 that is assigned to each opinion group 90. Accordingly, the present status of the discussion can be easily recognized by the user of the terminal 20.

The above describes an example in which the user who is the organizer sets the opinion group 90; however, the participant may add an opinion group 90. Furthermore, an organization request sent from a terminal of the user who is the organizer, may not include any opinion groups 90. In this case, the user who is the participant inputs an opinion group 90 in the terminal, and reports the opinion group 90 to the information processing server 10.

<Functional Configuration>

(1) Information Processing Server

With reference to FIG. 5, a description is given of a functional configuration of the information processing server 10. The information processing server 10 has the same function units as those of the first embodiment. The function units cooperate as follows. The communication unit 110 reports the discussion title 80 and opinion groups 90 that are options with respect to the discussion title 80, to the terminals 20 of users using SNS, and receives the opinion groups 90 selected by the users from the respective terminals 20 of the users. In response to receiving the selected opinion groups 90, the control unit 120 implements control to display the respective opinion groups 90 and the information of the users who have selected the opinion groups 90 in association with each other, at the respective terminals 20 of the users. Here, the communication unit 110 may report the discussion title 80 to the terminals 20 of the users using SNS, and receive an opinion group 90 that is an option with respect to the discussion title 80 selected by the user, from each of the terminals 10 of the users. This is because, when a discussion title 80 is reported from the terminal 20 of the organizer, but corresponding opinion groups 90 are not reported, an opinion group 90 is received from each of the terminals 20 of participants including the organizer.

Here, the information of a user is an icon 30 indicating the user and a message 40 sent from the terminal 20 of a user. Note that the information of a user may be referred to as user information.

The communication unit 110 receives a request to start the discussion mode from the terminal 20 of a user, and reports to the control unit 120 that the start request has been received. Upon receiving the instruction from the control unit 120, the communication unit 110 sends a request to participate in the discussion mode, to the terminal 20 of the user. The communication unit 110 receives the report of the selected opinion group 90 from the terminal 20 of the user, and reports the selection to the control unit 120. Upon receiving the instruction from the control unit 120, the communication unit 110 reports the status of the discussion mode to the terminal 20 of the user participating in the discussion mode. Furthermore, the communication unit 110 receives a change report of the opinion group 90, from the terminal 20 of the user, and reports the change to the control unit 120.

The control unit 120 starts a process of the discussion mode, in response to receiving the start request for the discussion mode. Specifically, the control unit 120 instructs the information storage unit 130 to generate a discussion mode management table 135 as illustrated in FIG. 20. The discussion mode management table 135 is described below.

The control unit 120 instructs the communication unit 110 to send a request to participate in the discussion mode to the terminals 20 of users included as participating members in the start request. The participation request includes the discussion title 80, the opinion groups 90, etc.

The control unit 120 instructs the information storage unit 130 to store the opinion groups 90 selected by the respective terminals 20 of users, the messages 40 posted in the discussion mode, etc., in the discussion mode management table 135. Furthermore, the control unit 120 reports the above information as the status of the discussion mode, to the terminals 20 of the users via the communication unit 110. Accordingly, the control unit 120 implements control such that the status of the discussion mode is displayed at the respective terminals 20 of the users.

When implementing control of the display, the control unit 120 implements control such that the information of the respective users participating in the discussion mode is displayed in the display area 50 provided for each opinion group 90 on the display unit 220 of the terminal 20.

Note that the opinion groups 90 may include an opinion group 90 of "on hold", indicating that a specific option is not yet selected. Furthermore, the display area 50 of "on hold" may be referred to as a selection awaiting area.

The control unit 120 may control the display of the terminal 20, to display a message prompting a specific option to be selected, with respect to the terminal 20 of the user of the opinion group 90 "on hold". This is for clarifying the specific opinions of the users in the discussion mode such that the discussion smoothly proceeds.

When the control unit 120 receives a request to change the opinion group 90 from the terminal 20 of the user via the communication unit 110, the control unit 120 instructs the information storage unit 130 to update the discussion mode management table 135. Furthermore, the control unit 120 reports the opinion group 90 of the user after the change, to the terminals 20 of users participating in the discussion mode, via the communication unit 110. According to this report, the control unit 120 instructs the terminals 20 of the users to change the display area 50. Note that the instruction with respect to changing the display area 50 is the same in the case where a user of the "on hold" opinion group 90 selects a predetermined opinion group 90.

The discussion mode may be provided for a display screen for exchanging chat messages in a group. In this case, the terminal 20 receives an instruction to set, in a message 40, a tag indicating that the message 40 is for the discussion title 80. Note that a tag may be set in the message 40 by attaching metadata to the message 40.

The control unit 120 acquires information relevant to the setting of the tag of the message 40, via the communication unit 110, and instructs the information storage unit 130 to store the acquired information. By setting a tag to the message 40, it is possible to extract a message 40 relevant to the discussion title 80.

When messages 40 are frequently sent and received between terminals 20 of users belonging to a predetermined group, the control unit 120 sends a signal prompting to activate the discussion mode, to the terminals 20 of users belonging to the predetermined group, via the communication unit 110. For example, when messages 40 are sent and received by a frequency exceeding a predetermined threshold, the control unit 120 may send a signal prompting to activate the discussion mode. When the communication unit 210 of the terminal 20 of the user receives the signal prompting to activate the discussion mode, the control unit 240 causes the display unit 220 to display a message prompting to activate the discussion mode.

The predetermined threshold is a value that can be set by the administrator of the information processing server 10. For example, the predetermined threshold is set based on "50% or more of the users belonging to the group have posted messages 40 within five minutes", "three or more users belonging to the group have posted messages 40 two times or more within five minutes", "messages 40 have been posted 50 times or more within a predetermined time among users belonging to a group", etc.

By activating the discussion mode when a predetermined condition is satisfied, it is possible to efficiently exchange opinions among users of a group that frequently exchange chat messages 40.

When all users have selected the same opinion group 90, or when greater than or equal to a predetermined ratio of users have selected the same opinion group 90, the control unit 120 may determine the selected opinion group 90 as the conclusion of the discussion title 80 and report the conclusion to the terminals 20 of users participating in the discussion mode, via the communication unit 110. Furthermore, the control unit 120 may send a message prompting to determine the opinion group 90 as the conclusion, to the terminal 20 of the organizer, via the communication unit 110.

When the communication unit 110 receives the conclusion of the discussion mode from the terminal 20 of the organizer, the control unit 120 instructs the communication unit 110 to report the conclusion to the terminals 20 of users participating in the discussion mode.

The control unit 120 may send a signal prompting to add an opinion group 90, to the terminal 20 of the user via the communication unit 110. For example, when there are no users selecting a predetermined opinion group 90, the control unit 120 may prompt the terminal 20 of the organizer to add a new opinion group 90.

When there are no users selecting a predetermined opinion group 90, the control unit 120 may instruct the terminal 20 of the user to delete this opinion group 90, via the communication unit 110. Furthermore, the control unit 120 may instruct the terminal 20 of the user to reduce the area of the display area 50 of this opinion group 90, via the communication unit 110. For example, the display area of this opinion group 90 may be reduced to a size that the presence of the opinion group 90 can just be recognized.

The information storage unit 130 generates the discussion mode management table 135 upon receiving an instruction from the control unit 120, and stores selections and changes of the opinion group 90 by users, posts of messages 40, etc.

FIG. 20 illustrates an example of the discussion mode management table 135. The discussion mode management table 135 is generated for each identifier of the discussion title 80 (Discussion Group ID (DG ID)), and an identifier of an opinion group 90 (Opinion Group ID (OG ID)) 90, a user, and a message 40 posted by the user, are stored in association with each other. Furthermore, in the field of the user who is the organizer, an organizer flag is set.

For example, when the user A changes the opinion group 90 to an opinion group 90 of OG ID2, the information storage unit 130 stores information relevant to the user A, as information belonging to OG ID2.

(2) Terminal

The terminal 20 has the same function units as those of the first embodiment. The function units cooperate as follows. The communication unit 210 reports the discussion title 80 and the opinion group 90 with respect to the discussion title 80, via the information processing server 10. Furthermore, the communication unit 210 receives an opinion group 90 selected by another user. The display unit 220 displays the received opinion groups 90 and the information of other users in association with each other.

The function units of the terminal 20 have the following functions.

The communication unit 210 sends various signals relevant to the discussion mode, posts of users of the terminals 20 in the discussion mode, etc., to the information processing server 10, upon receiving an instruction from the control unit 240. Furthermore, the communication unit 210 receives various signals relevant to the discussion mode from the information processing server 10, and reports the signals to the control unit 240.

The display unit 220 displays various kinds of information on the terminal 20, based on an instruction from the control unit 240. The display unit 220 includes display areas 50 assigned to the respective opinion groups 90. The display unit 220 displays various kinds of information of users participating in the discussion mode in the display areas 50 provided for the respective opinion groups 90, based on an instruction from the control unit 240.

The display unit 220 may display the discussion mode in a display screen for exchanging chat messages in a regular group, based on an instruction from the control unit 240. In this case, the display unit 220 displays a message prompting to select whether to set a tag indicating that the message 40 is for the discussion title 80, in response to a user's operation of selecting the message 40.

The input unit 230 receives the discussion title 80, input of opinion groups 90 with respect to the discussion title 80, and selections of users to participate in the discussion, as settings for starting the discussion mode, from the organizer of the discussion mode.

Furthermore, the input unit 230 receives operations such as selecting and changing the opinion group 90, determining a conclusion, etc., and inputs of messages 40 to be posted from the user while the discussion mode is activated, and reports these operations and inputs to the control unit 240.

The control unit 240 instructs the communication unit 210 to send, to the information processing server 10, a setting to start the discussion mode, selections and changes of the opinion group 90, a determination of a conclusion, and messages 40 to be posted, received by the input unit 230.

Furthermore, the control unit 240 instructs the display unit 220 to display information including various messages received via the communication unit 210, such as an opinion group 90 selected by another user, a message 40 posted by another user, a conclusion of the discussion reported from the information processing server 10, etc.

The control unit 240 stores received information relevant to the discussion mode, in the information storage unit 250.

When the user performs a predetermined operation with respect to a selected message 40, the control unit 240 sets a tag indicating that the message 40 is relevant to the discussion title 80, and instructs the information storage unit 250 to store the message 40 together with the tag.

When changing the opinion group 90 of a user, the control unit 240 instructs the display unit 220 to display information of the user in the display area 50 corresponding to the opinion group 90 after the change. Note that changing the opinion group 90 of the user includes a case of the input unit 230 receiving the change from the user of the terminal 20, and a case of receiving a report from the information processing server 10 that the opinion group 90 of another user is changed.

When the input unit 230 receives an instruction to activate the discussion mode, a determination of the conclusion of the discussion mode, an instruction to add an opinion group 90, etc., from the user, the control unit 240 reports the received contents to the information processing server 10 via the communication unit 210.

The information storage unit 250 stores information relevant to the discussion mode, based on an instruction from the control unit 240.

Operation Procedures (1) Selection of Opinion Group

Figure 21:
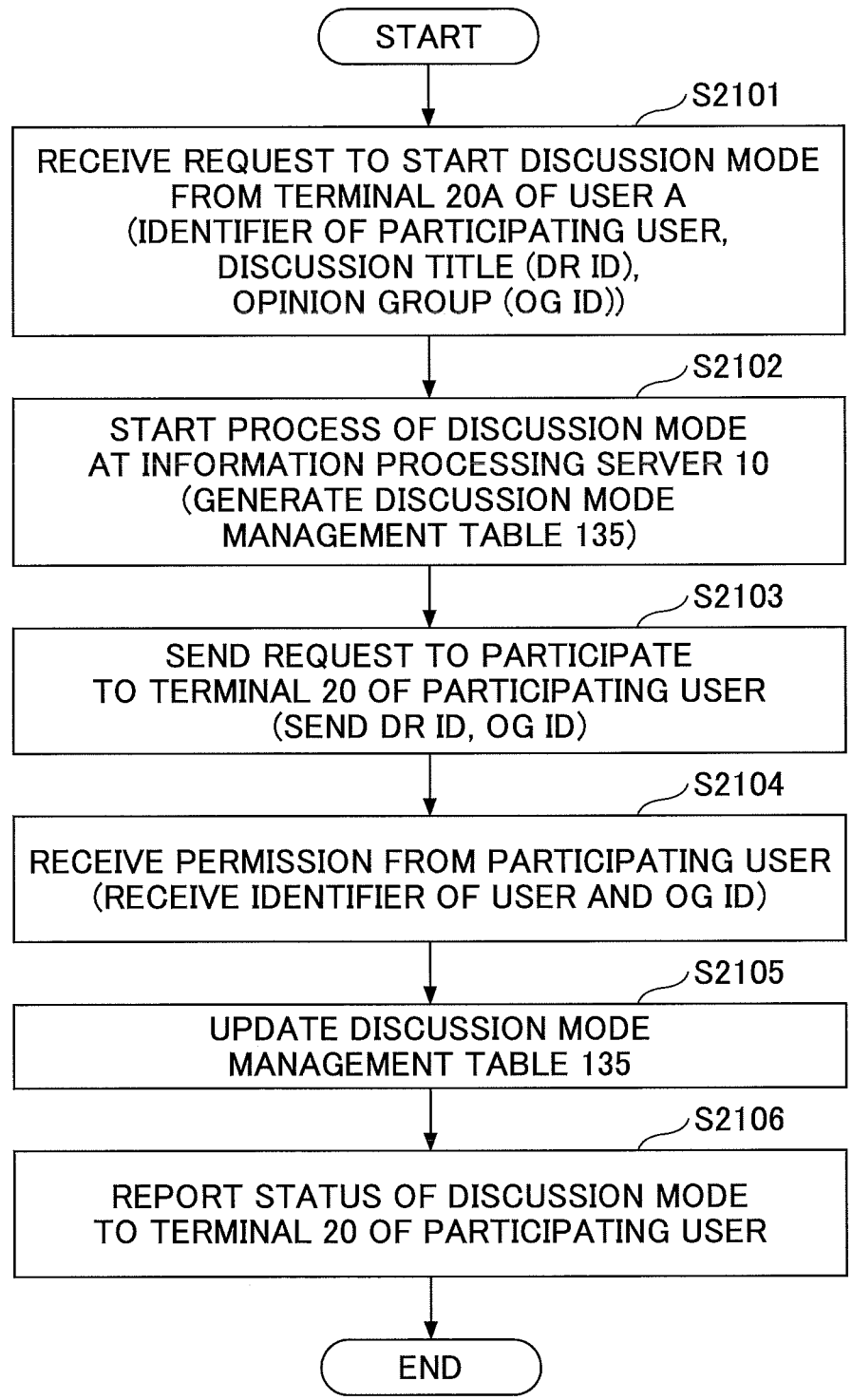
FIG. 21 is an example of a flowchart of operation procedures according to the second embodiment (part 1)
Figure 22:
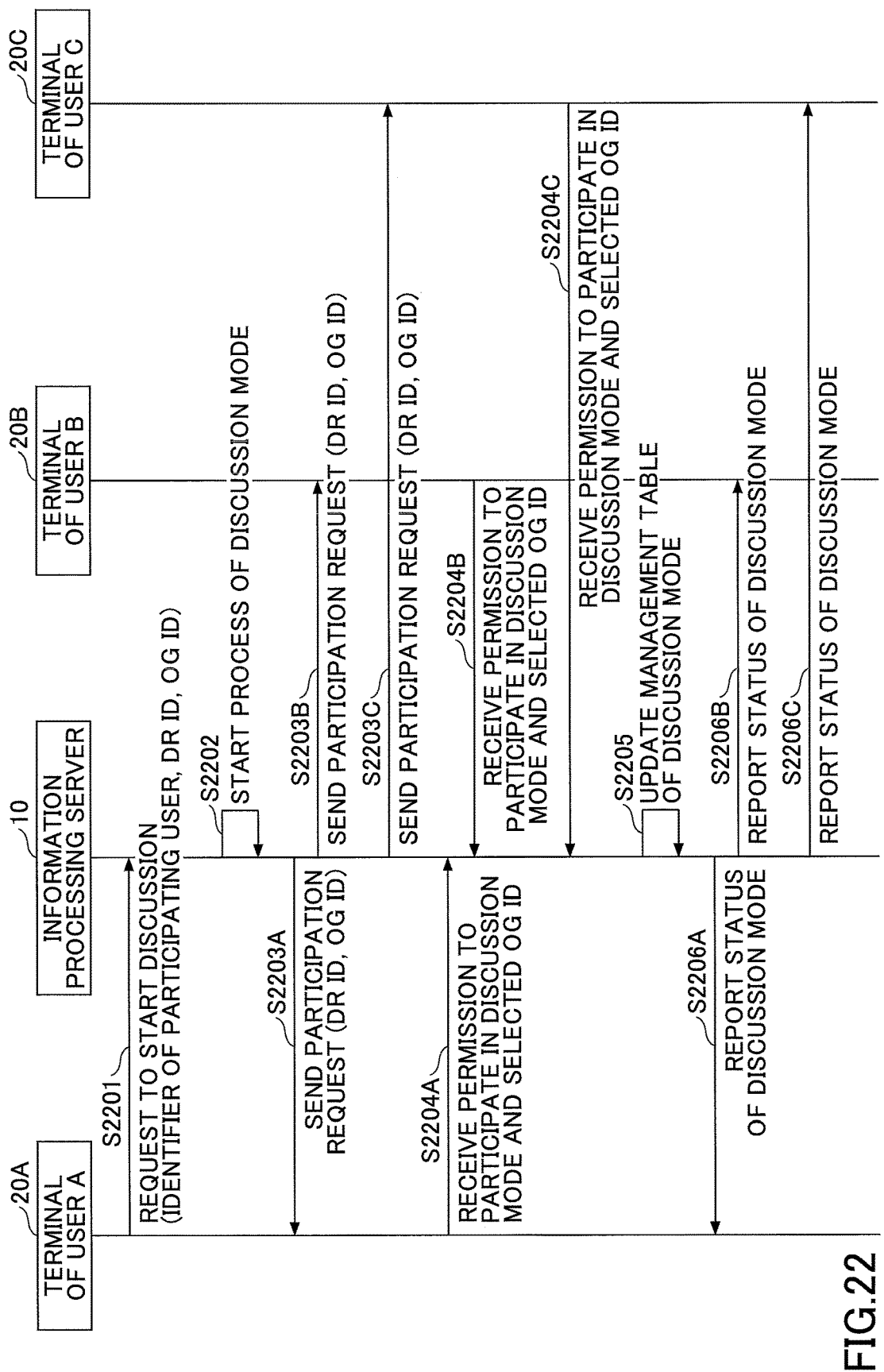
FIG. 22 illustrates an example of a sequence of operation procedures according to the second embodiment (part 1)

With reference to FIGS. 21 and 22, a description is given of operation procedures of selecting the opinion group 90 in discussion mode.

FIG. 21 is an example of a flowchart of operation procedures according to the second embodiment (part 1).

In step S2101, the control unit 120 of the information processing server 10 receives a request to start a discussion mode from the terminal 20A of the user A, via the communication unit 110. The start request for the discussion mode includes the identifiers of users to participate in the discussion mode, the discussion title 80 (DR ID), and the opinion groups 90 (OG ID). Here, the identifiers of users to participate in the discussion mode, the discussion title 80 (DR ID), and the opinion groups 90 (OG ID) included in the start request are set based on contents input to the input unit 230 of the terminal 20A by the user A.

In step S2102, the control unit 120 starts the process of the discussion mode. Specifically, the control unit 120 instructs the information storage unit 130 to generate the discussion mode management table 135.

In step S2103, the control unit 120 sends a request to participate in the discussion mode, to the terminals 20 of users to participate in the discussion mode, via the communication unit 110. The participation request includes the discussion title 80 (DR ID) and the opinion groups 90 (OG ID).

In step S2104, the control unit 120 receives permission to participate in the discussion mode from the terminals 20 of the users, via the communication unit 110. The permission for participation includes the identifier of the user and the opinion group 90 selected by the user of the terminal 20.

In step S2105, the control unit 120 instructs the information storage unit 130 to update the discussion mode management table 135, based on contents received from the terminal 20 of the user. Upon receiving the instruction, the information storage unit 130 updates the discussion mode management table 135.

In step S2106, the control unit 120 reports the status of the discussion mode to the terminals 20 of the users participating in the discussion mode. The status of the discussion mode includes information identifying the opinion groups 90 selected by the respective users. Furthermore, the status of the discussion mode may include messages 40 posted to the discussion mode by users. In response to receiving the status of the discussion mode, the control unit 240 of the terminal 20 displays the information of users in association with the opinion groups 90 selected by the users, in the display areas 50 assigned to the respective opinion groups 90.

FIG. 22 illustrates an example of a sequence of operation procedures according to the second embodiment (part 1).

In step S2201, the control unit 120 of the information processing server 10 receives a request to start the discussion mode from the terminal 20A of the user A, via the communication unit 110. The start request for the discussion mode includes the identifiers of users to participate in the discussion mode, the discussion title 80 (DR ID), and the opinion groups 90 (OG ID).

In step S2202, the control unit 120 starts the process of the discussion mode. The control unit 120 instructs the information storage unit 130 to generate the discussion mode management table 135.

In step S2203, the control unit 120 sends a request to participate in the discussion mode, to the terminal A of the user A, the terminal B of the user B, and the terminal C of the user C who are to participate in the discussion mode, via the communication unit 110. Here, in FIG. 22, step S2203A expresses a signal to the terminal 20A, step S2203B expresses a signal to the terminal 20B, and step S2203C expresses a signal to the terminal 20C. The participation request includes the discussion title 80 (DR ID) and the opinion groups 90 (DC ID). Note that a participation request may not be sent to the terminal 20A of the user A, who is the organizer of the discussion mode.

In step S2204, the control unit 120 receives permission to participate in the discussion mode and the selected opinion group 90, from the terminal A of the user A, the terminal B of the user B, and the terminal C of the user C, via the communication unit 110. Here, in FIG. 22, step S2204A expresses a signal from the terminal 20A, step S2204B expresses a signal from the terminal 20B, and step S2204C expresses a signal from the terminal 20C.

In step S2205, the control unit 120 instructs the information storage unit 130 to update the discussion mode management table 135. Upon receiving the instruction, the information storage unit 130 updates the discussion mode management table 135.

In step S2206, the control unit 120 reports the status of the discussion mode to the terminals 20 of the users participating in the discussion mode. The status of the discussion mode includes information identifying the opinion groups 90 selected by the respective users.

Here, the report of the status of the discussion mode may be sent every time the information is updated in the discussion mode, or may be sent at predetermined timings.

The information in the discussion mode is information such as a selection or a change of an opinion group 90 by a user, a message 40 posted to the opinion group 90 by a user, a report of a conclusion of the discussion mode, etc.

(2) Selection of Opinion Group

Figure 23:
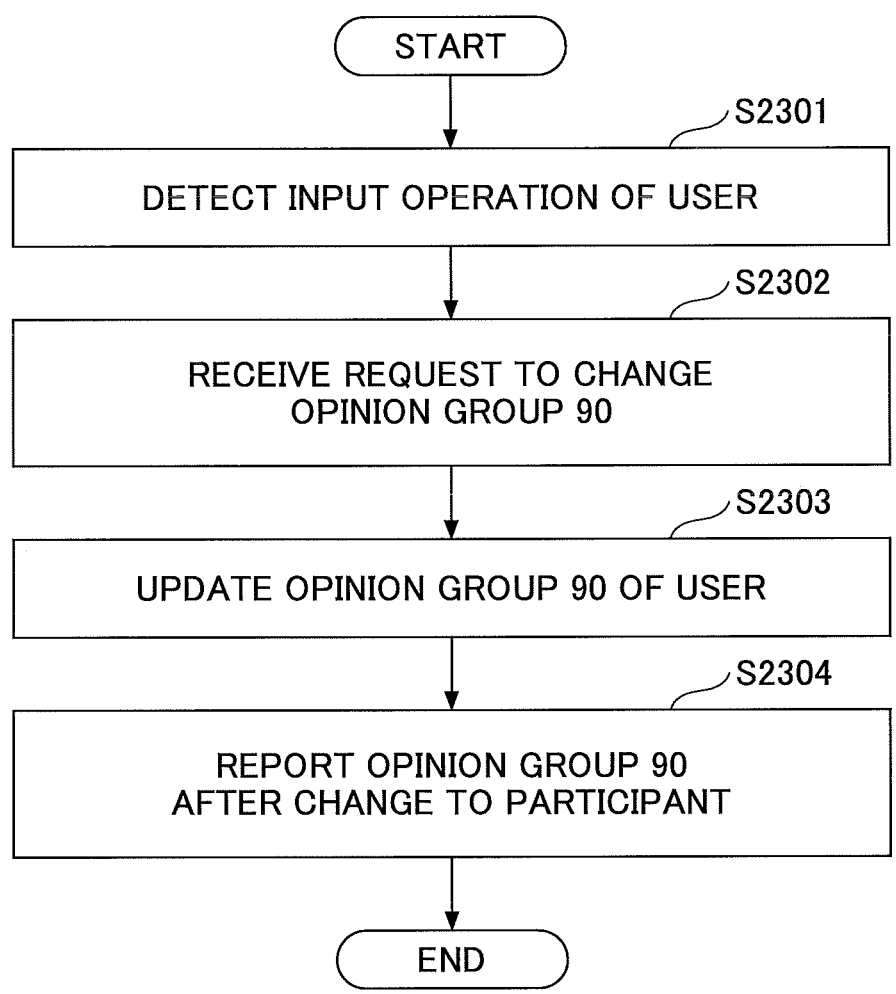
FIG. 23 is a flowchart of operation procedures according to the second embodiment (part 2)
Figure 24:
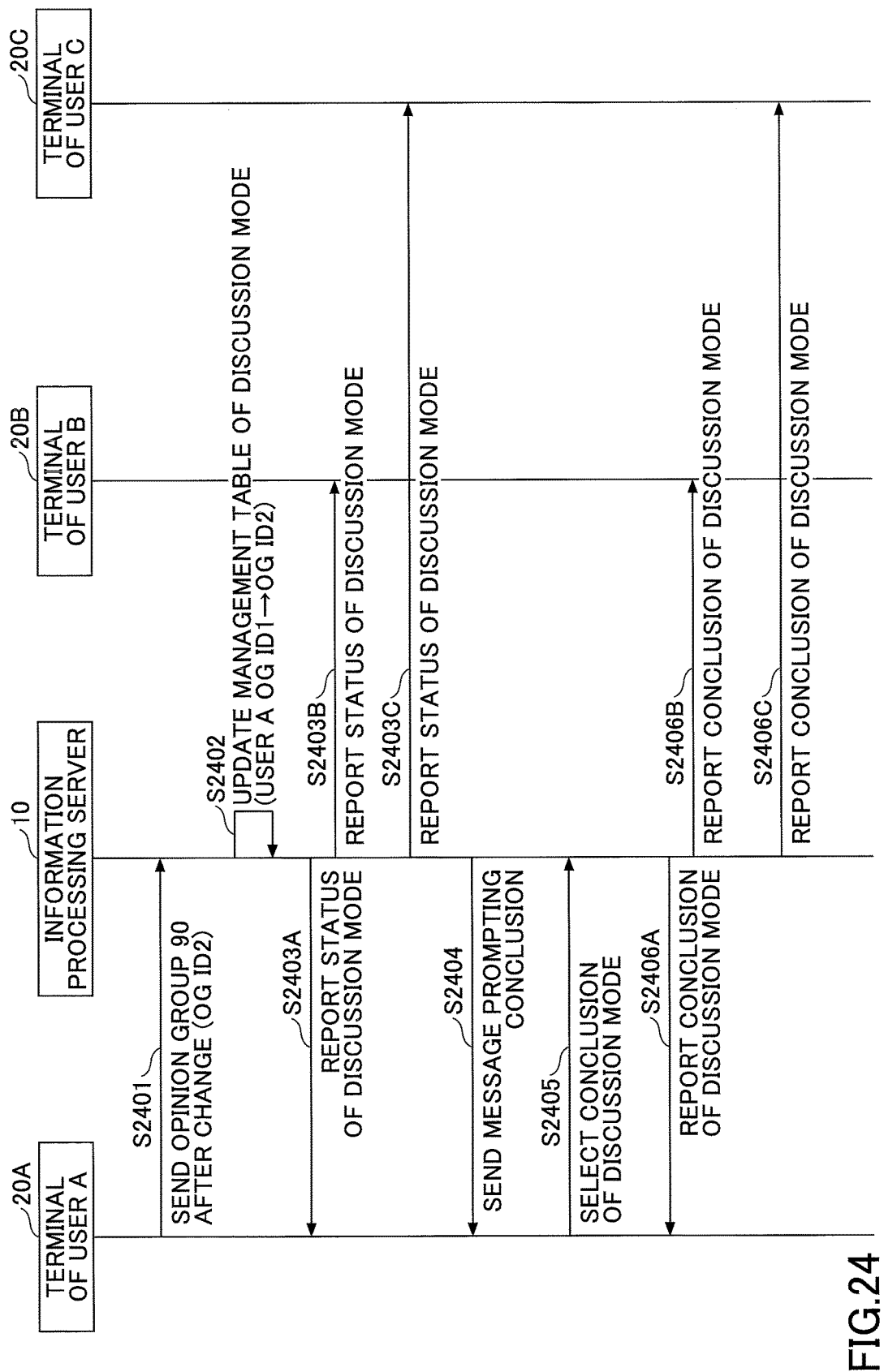
FIG. 24 illustrates an example of a sequence of operation procedures according to the second embodiment (part 2)

With reference to FIGS. 23 and 24, a description is given of operation procedures of selecting an opinion group 90 in the discussion mode.

FIG. 23 is a flowchart of operation procedures according to the second embodiment (part 2).

In step S2301, the input unit 230 of the terminal 20A of the user A detects an input operation of the user A.

In step S2302, the input unit 230 determines that the input operation is an operation for changing the opinion group 90, and reports to the control unit 240 that an operation for changing the opinion group 90 has been input. Here, an operation for changing the opinion group 90 may be associated with a predetermined operation. For example, an operation of selecting an icon 30 of the user A and scrolling the icon 30 toward the display area 50 assigned to the opinion group 90 after the change, may be an operation of changing the opinion group 90. Alternatively, an operation of selecting an icon 30 of the user A and flicking the icon 30 toward the display area 50 assigned to the opinion group 90 after the change, may be an operation of changing the opinion group 90.

In step S2303, the control unit 240 instructs the display unit 220 to update the display area. Specifically, the control unit 240 instructs the display unit 220 to display the information of the user A in the display area 50 assigned to the opinion group 90 after the change.

Furthermore, the control unit 240 reports the opinion group 90 of the user A after the change, to the information processing server 10 via the communication unit 210. In response to the report, the control unit 120 of the information processing server 10 instructs the information storage unit 130 to update the discussion mode management table 135. Specifically, the control unit 120 instructs the information storage unit 130 to update the discussion mode management table 135 such that the information of the user A belongs to the opinion group 90 after the change.

In step S2304, the control unit 120 of the information processing server 10 reports the opinion group 90 of the user A after the change, to the terminals 20 of users participating in the discussion mode, via the communication unit 110. Upon receiving the report, the respective terminals 20 of users display the information of the user A in the display area 50 assigned to the opinion group 90 after the change.

FIG. 24 illustrates an example of a sequence of operation procedures according to the second embodiment (part 2). In FIG. 24, it is assumed that user A is the organizer of the discussion.

In step S2401, the communication unit 210 of the terminal 20A of the user A reports the opinion group 90 (OG ID2) after the change, to the information processing server 10.

In step S2402, the control unit 120 of the information processing server 10 instructs the information storage unit 130 to update the discussion mode management table 135. Specifically, the information storage unit 130 updates the stored discussion mode management table 135 to change the opinion group 90 to which the information of the user A belongs, from the opinion group 90 (OG ID1) to the opinion group 90 (OG ID2) after the change.

In step S2403, the control unit 120 reports the opinion group 90 of the user A after the change to the terminals 20 of users participating in the discussion mode, via the communication unit 110. Step S2403A expresses a signal to the terminal 20A of the user A, step S2403B expresses a signal to the terminal 20B of the user B, and step S2403C expresses a signal to the terminal 20C of the user C. Here, the transmission of a signal to the terminal 20A may be omitted.

In the discussion mode, after receiving a selection of an opinion, posts, etc., from the respective users in the group, the information processing server 10 may prompt the terminal 20A of the user A who is the organizer to select a conclusion of the discussion, and the terminal 20A may report the conclusion selected by the user A to the information processing server 10.

In step S2404, the control unit 120 sends a message prompting to select a conclusion, to the terminal 20A of the user A who is the organizer of the discussion mode, via the communication unit 110.

Note that before receiving the message in step S2404, the user A of the terminal 20A may input a conclusion of the discussion in the input unit 230, and the communication unit 210 may report the conclusion to the information processing server 10. In this case, the message of step S2404 is not sent from the information processing server 10.

In step S2405, when the input unit 230 of the terminal 20A of the user A receives a selection of a conclusion, the control unit 240 reports the selected conclusion to the information processing server 10 via the communication unit 210.

In step S2406, when the communication unit 110 of the information processing server 10 receives the conclusion selected by the organizer, the control unit 120 reports the conclusion to the terminal 20 of the user participating in the discussion mode, to the information processing server 10. Here, step S2406A expresses a signal to the terminal 20A of the user A, step S2406B expresses a signal to the terminal 20B of the user B, and step S24063 expresses a signal to the terminal 20C of the user C. Here, the transmission of an signal of step S2406A may be omitted.

(3) Activation of Discussion Mode

As described above, when messages 40 are frequently exchanged among users in a group, the information processing server 10 prompts the usage of a discussion mode.

Figure 25:
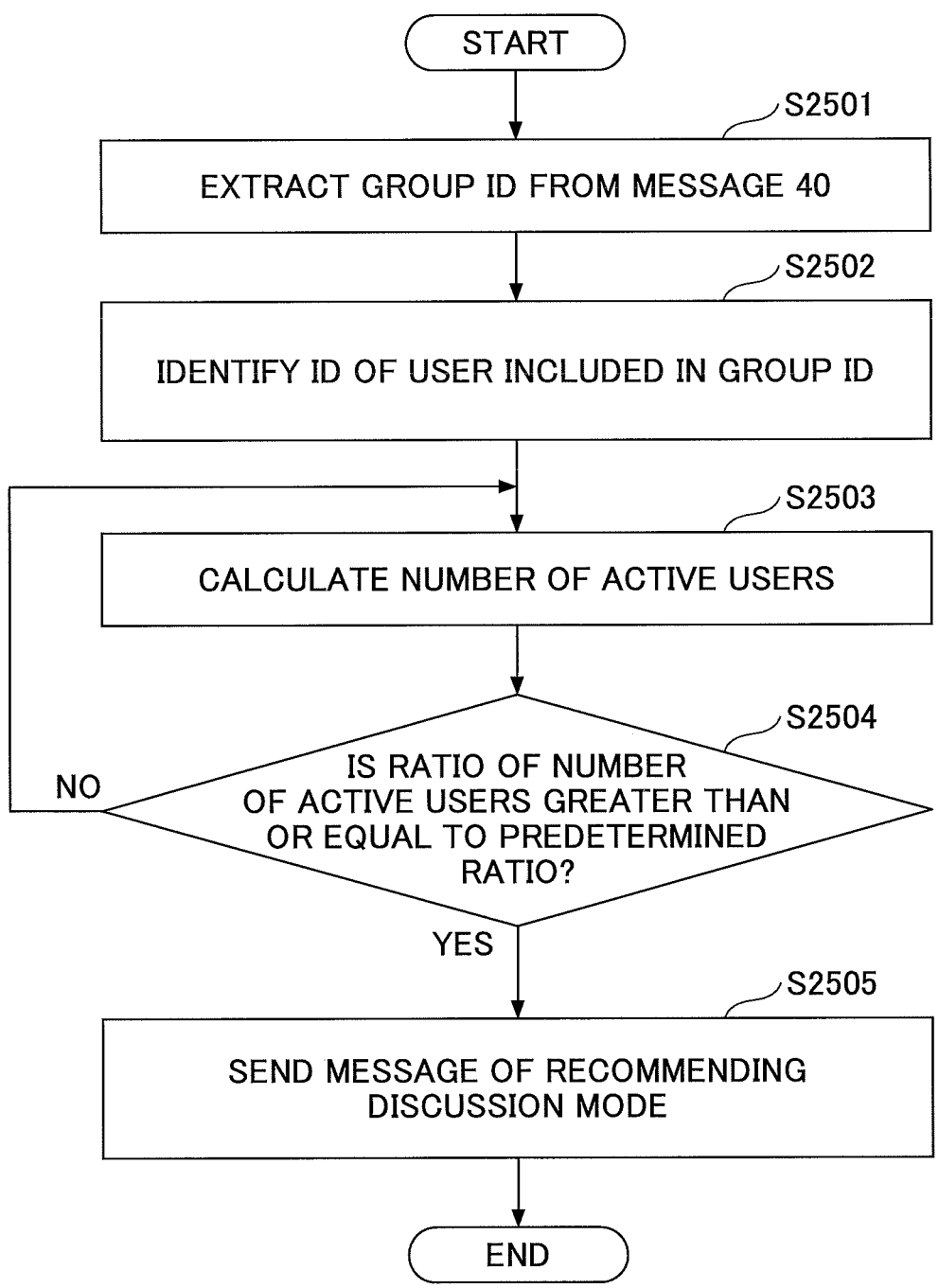
FIG. 25 is a flowchart of operation procedures according to the second embodiment (part 3)

With reference to FIG. 25, a description is given of operation procedures relevant to activating the discussion mode. FIG. 25 is a flowchart of operation procedures according to the second embodiment (part 3).

In step S2501, the control unit 120 of the information processing server 10 extracts an identifier (group ID) of a group included in a chat message 40.

In step S2502, the control unit 120 identifies an identifier (user ID) of a user belonging to the extracted group ID.

In step S2503, the control unit 120 calculates the number of active users. Here, the number of active users is the number of users who have posted a message 40 in the group, within five minutes from a predetermined time.

In step S2504, the control unit 120 determines whether the number of active users in the group exceeds a predetermined ratio. When the number exceeds a predetermined ratio (YES in step S2504), the process proceeds to S2505. On the other hand, when the number is less than or equal to a predetermined ratio (NO in step S2504), the process returns to step S2503. The determination process of step S2504 may be executed periodically. For example, the determination process may be executed every 10 to 15 minutes.

In step S2505, the control unit 120 sends a message recommending the discussion mode, to the terminals 20 of users belonging to the group, via the communication unit 110.

(4) Setting of Tag of Discussion Mode in Message

As described above, it is possible to display the discussion mode in a display screen for exchanging chat messages 40 in a regular group. In this case, the user sets, in a message 40, a tag indicating that the message 40 is relevant to a predetermined discussion title 80 of the discussion mode, and by extracting a message 40 by using the tag, it is possible to identify a message 40 relevant to a predetermined discussion title 80.

Figure 26B:
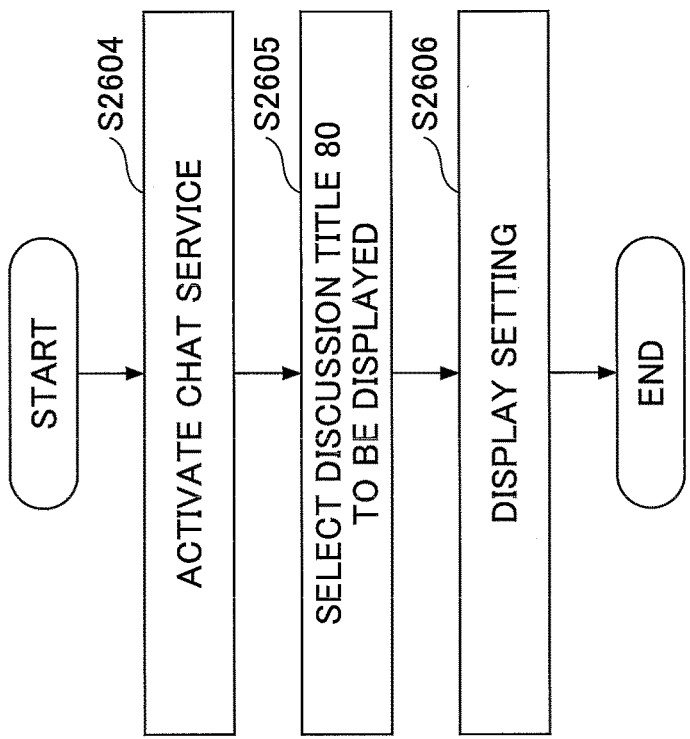
FIGS. 26A and 26B are flowcharts of operation procedures according to the second embodiment (part 4)
Figure 26A:
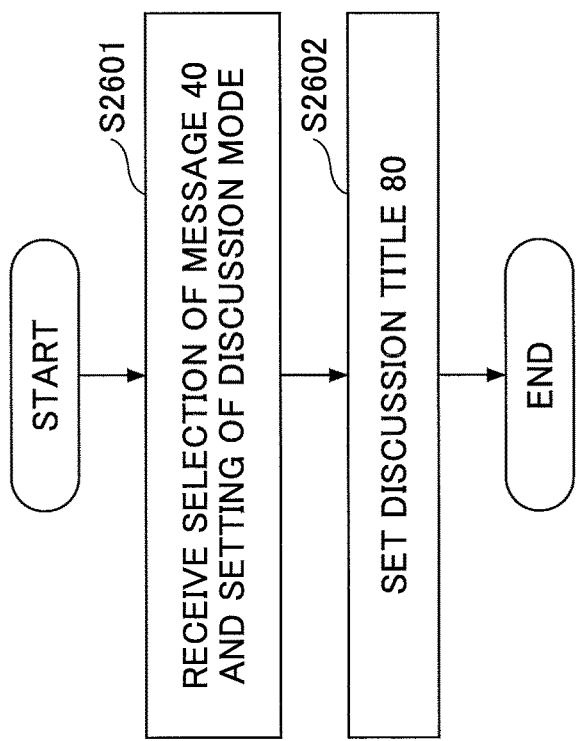

With reference to FIGS. 26A and 26B, a description is given of a method of setting a tag of the discussion mode in a message 40. FIGS. 26A and 26B are flowcharts of operation procedures according to the second embodiment (part 4).

FIG. 26A illustrates procedures of setting a tag of the discussion mode in a message 40.

In step S2601, the input unit 230 of the terminal 20 receives a selection with respect to a message 40 displayed on the display unit 220, from a user of the terminal 20. When the input unit 230 detects the selection and a predetermined operation with respect to a message 40, the input unit 230 determines that the predetermined operation is a request to set a tag of the discussion mode. A predetermined operation is, for example, selecting the message 40 for more than a predetermined length of time.

In step S2602, the control unit 240 of the terminal 20 instructs the display unit 220 to display the setting screen of the discussion mode. Here, in the setting screen of the discussion mode, the discussion title 80 that has been set may be displayed, or a screen for inputting a new discussion title 80 may be displayed.

The input unit 230 receives input from the user of the terminal 20. Specifically, the user of the terminal 20 performs input of selecting the discussion title 80 to be set as a tag in the message 40, from a list of discussion titles 80 that have been set. Alternatively, the user of the terminal 20 inputs a new discussion title 80 to be set as a tag in the message 40. The control unit 240 instructs the information storage unit 250 to store the discussion title 80 set via the input unit 230, and the information storage unit 250 stores the input discussion title 80.

FIG. 26B illustrates procedures of displaying the message 40 in which the tag of the discussion mode has been set.

In step S2604, when the input unit 230 of the terminal 20 receives an instruction to activate a chat service from the user of the terminal 20, the terminal 20 activates the chat service.

In step S2605, the input unit 230 receives an instruction to display a message 40 of a predetermined discussion title 80, from the user. In response to this instruction, the display unit 220 displays a list of discussion titles 80. The input unit 230 receives a selection of a discussion title 80 from the user of the terminal 20.

In step S2606, in response to the selection of the discussion title 80, the display unit 220 displays a screen of a display setting. The input unit 280 receives an instruction of a display setting from the user. An instruction of a display setting is, for example, an instruction to display only the messages 40 of the selected discussion title 80, on the display unit 220. Furthermore, for example, the instruction is to display the messages 40 of the selected discussion title 80 in a highlighted manner. The display unit 220 displays the messages 40 in which a tag of the discussion title 80 is set, according to the user's instruction.

Accordingly, even when regular chat messages are used, it is possible to easily extract messages 40 relevant to the discussion title 80.

<Display of Terminal>

(1) Display Screen of Discussion Mode

With reference to FIGS. 27A through 33B, a description is given of a setting screen of the discussion mode on the terminal 20.

(1. 1) Activation of Discussion Mode

Figure 27B:
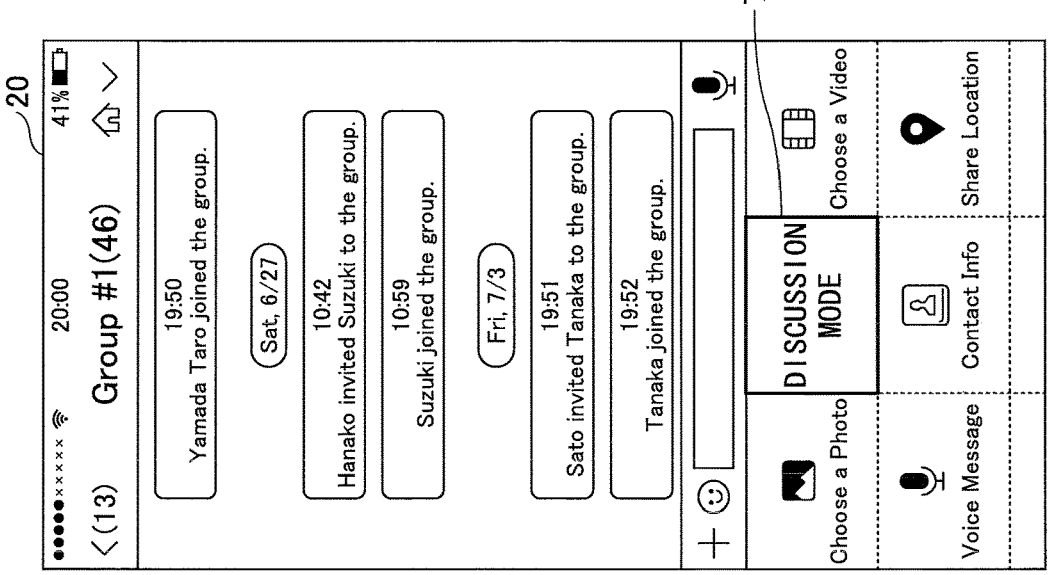
FIGS. 27A and 27B illustrate examples of display screens on the terminal when the discussion mode is activated, according to the second embodiment.
Figure 27A:
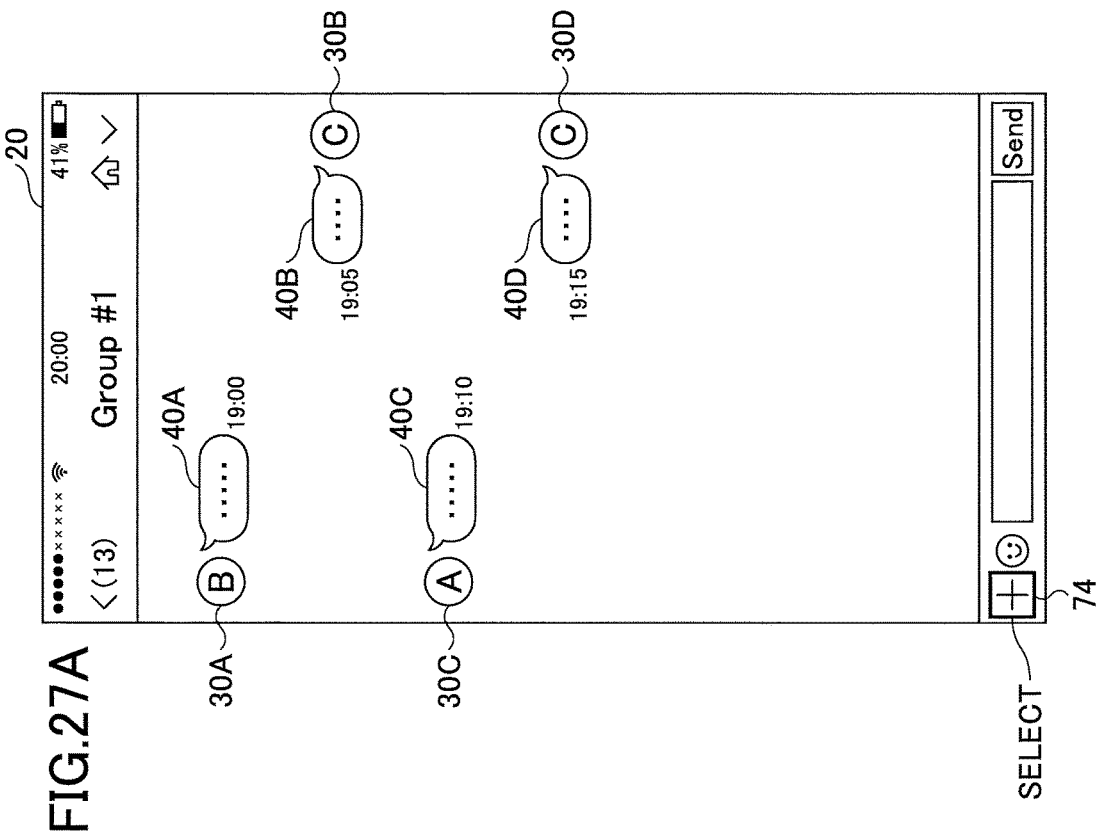

FIGS. 27A and 27B illustrate examples of display screens on the terminal 20 when the discussion mode is activated, according to the second embodiment. FIG. 27A illustrates a screen of a chat service operating in the terminal 20. In this screen of the service, messages 40 of users belonging to a group of users for exchanging chat messages 40, are displayed in chronological order. When the input unit 230 detects that a menu selection button 74 has been selected, the control unit 240 instructs the display unit 220 to display a menu selection screen.

FIG. 27B illustrates a menu selection screen of a chat service operating in the terminal 20. When the input unit 230 detects that a discussion mode selection button 75 has been selected, the control unit 240 instructs the display unit 220 to display an initial setting screen of the discussion mode. The initial setting screen of the discussion mode is as illustrated in FIGS. 18A through 18C.

(1. 2) Display of a Plurality of Opinion Groups

Figure 28:
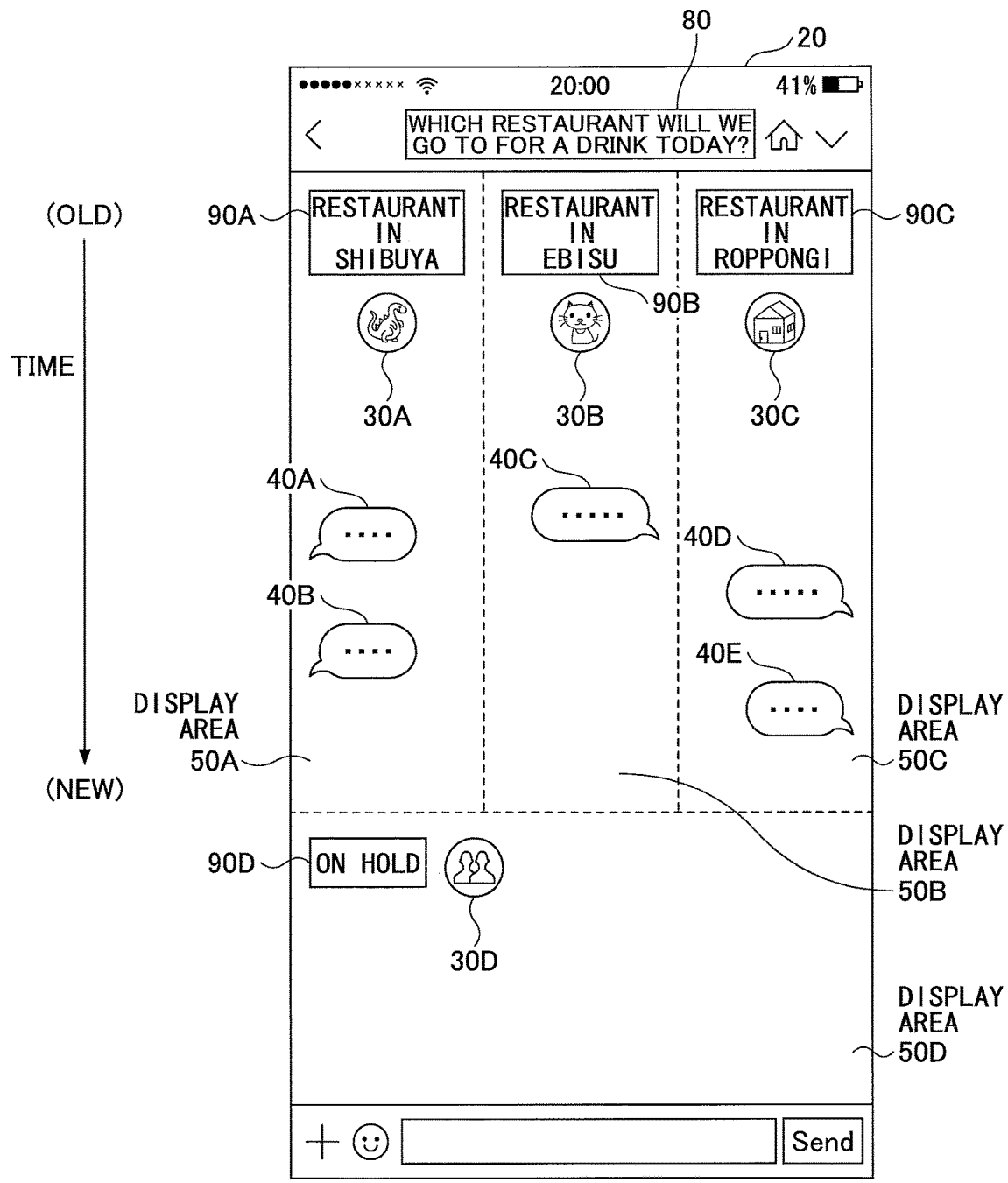
FIG. 28 illustrates an example of a display screen (four opinion groups) when the discussion mode is executed in the terminal according to the second embodiment.

FIG. 28 illustrates an example of a display screen (four opinion groups 90) when the discussion mode is executed in the terminal 20 according to the second embodiment.

In the display screen when the discussion mode is being executed described above, the opinion groups 90 are assigned to the three display areas 50 on the left side, the right side, and the bottom side. The display areas 50 may be set in various shapes, according to the number of opinion groups 90. For example, as illustrated in FIG. 28, the display area 50A corresponding to the opinion group 90A (restaurant in Shibuya) may be set at the top left side in the display screen, the display area 50B corresponding to the opinion group 90B (restaurant in Ebisu) may be set at the to center in the display screen, and the display area 50C corresponding to the opinion group 90C (restaurant in Roppongi) may be set at the top right side in the display screen. In this case, the messages 40 posted in the respective opinion groups 90 are displayed in chronological order from the top. Furthermore, in the example of FIG. 28, a display area 50D corresponding to an opinion group 90D (on hold) in which messages 40 cannot be posted, is set at the bottom of the display screen.

(1. 3) Change of Opinion Group

Figure 29A:
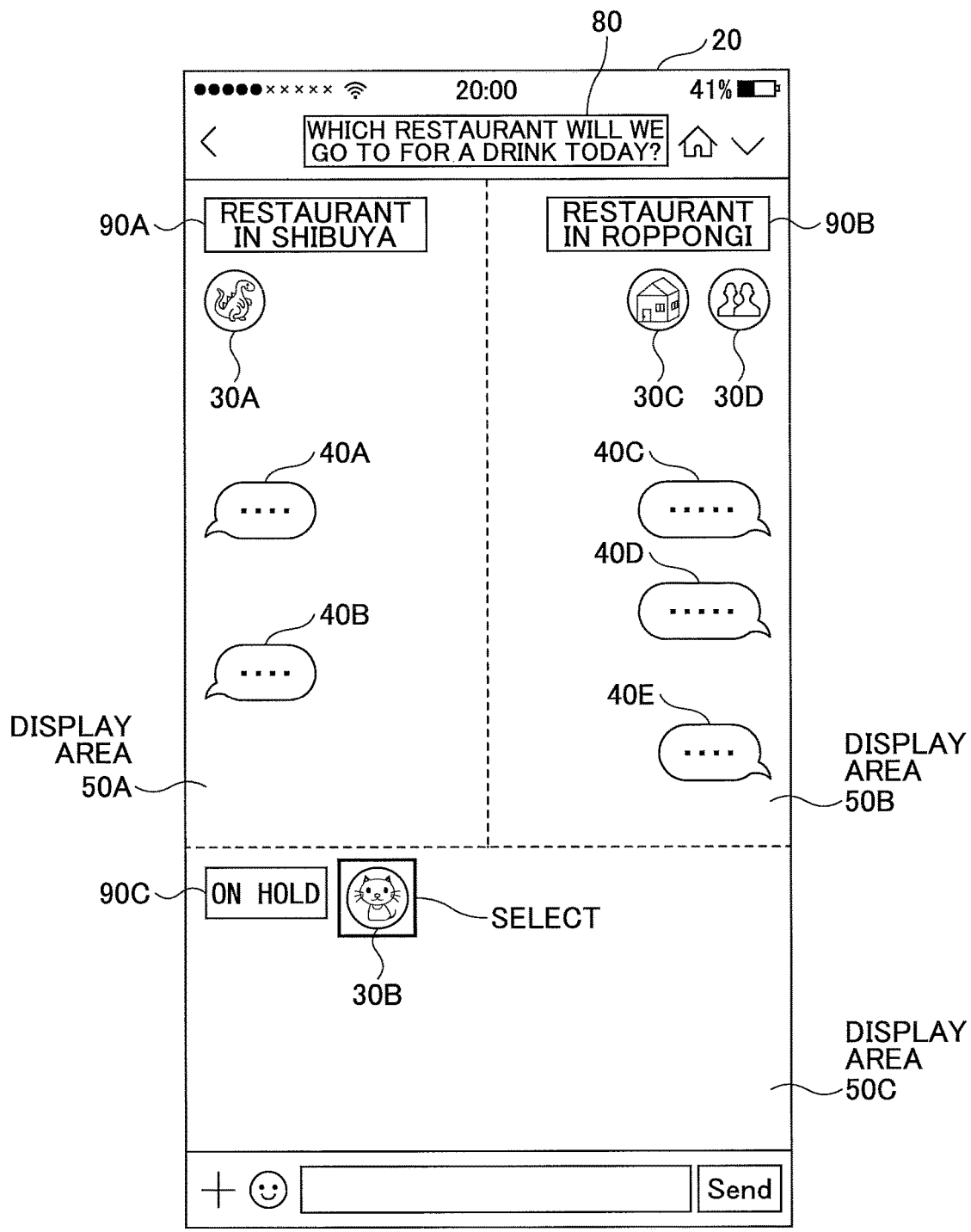
FIGS. 29A and 29B illustrate examples of display screens (changing opinion group) when the discussion mode is executed in the terminal according to the second embodiment.
Figure 29B:
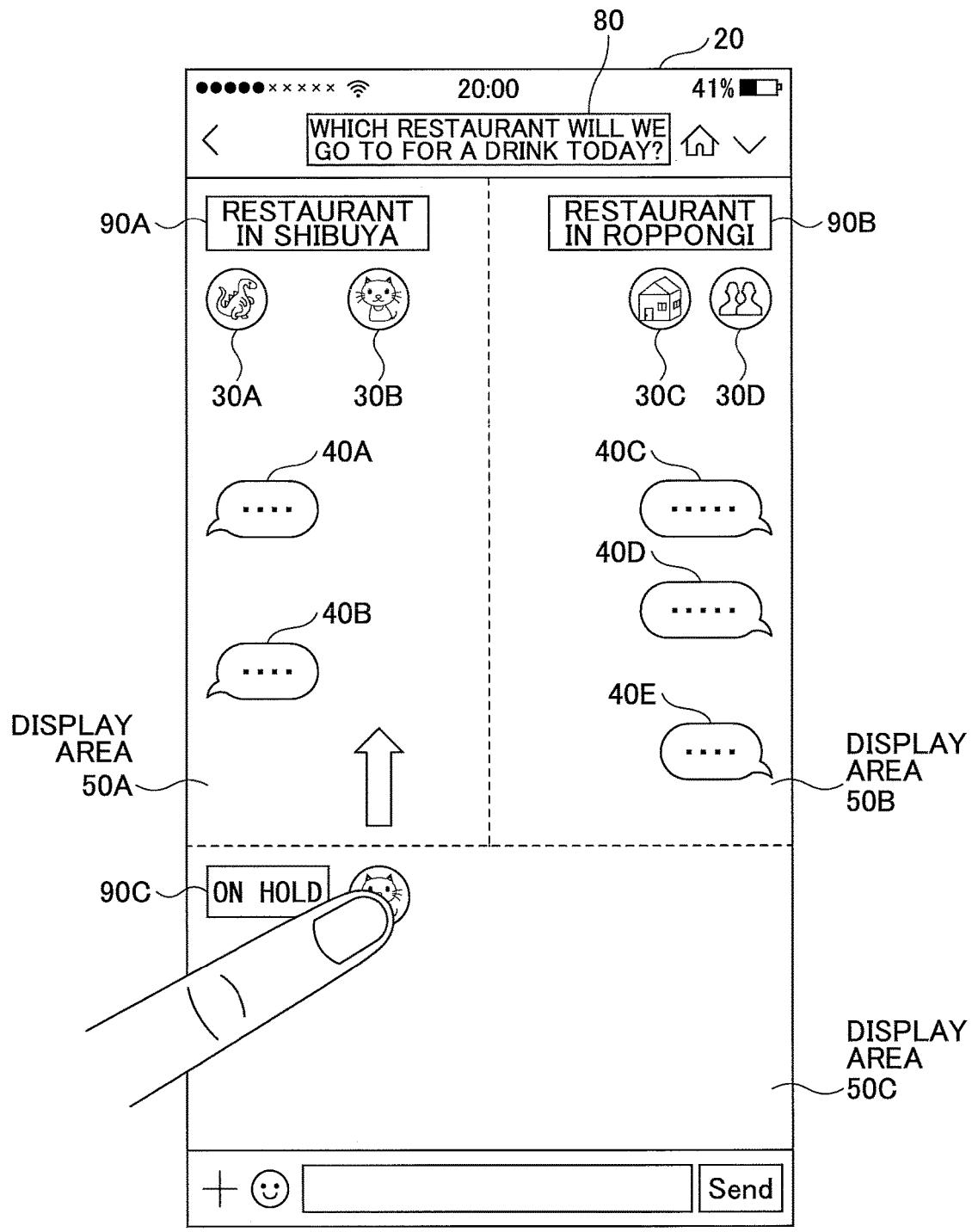

FIGS. 29A and 29B illustrate examples of display screens (changing opinion group 90) when the discussion mode is executed in the terminal 20 according to the second embodiment.

FIGS. 29A and 29B illustrate the screen transitions when changing the opinion group 90 of the icon 30B of the user B indicated in the display screen of the terminal 20B of the user B.

FIG. 29A illustrates the input unit 230 receiving a selection of an icon 30B of the user B belonging to the opinion group 90C from the user B. By performing a predetermined operation with respect to the icon 30B selected by the user B, the opinion group 90 to which the user B belongs is changed.

FIG. 29B illustrates a predetermined operation being performed with respect to the icon 30B, such that the opinion group 90 of the user B is changed from the opinion group 90C to the opinion group 90A. The display area 50 of the icon 30B is changed to the display area 50A assigned to the opinion group 90A.

The predetermined operation for changing the opinion group 90 is, for example, an operation of swiping, flicking, etc., the icon 30 of the user that is the target of the change, toward the display area 50 of the opinion group 90 after the change.

(1. 4) Completion of Discussion

The information processing server 10 may control the terminal 20 to display a report prompting to complete the discussion, when the discussion mode being executed satisfies a predetermined condition.

For example, when all users belong to the same opinion group 90, or when users of more than a predetermined ratio belong to the same opinion group 90, it may determined that a predetermined condition is satisfied.

Figure 30:
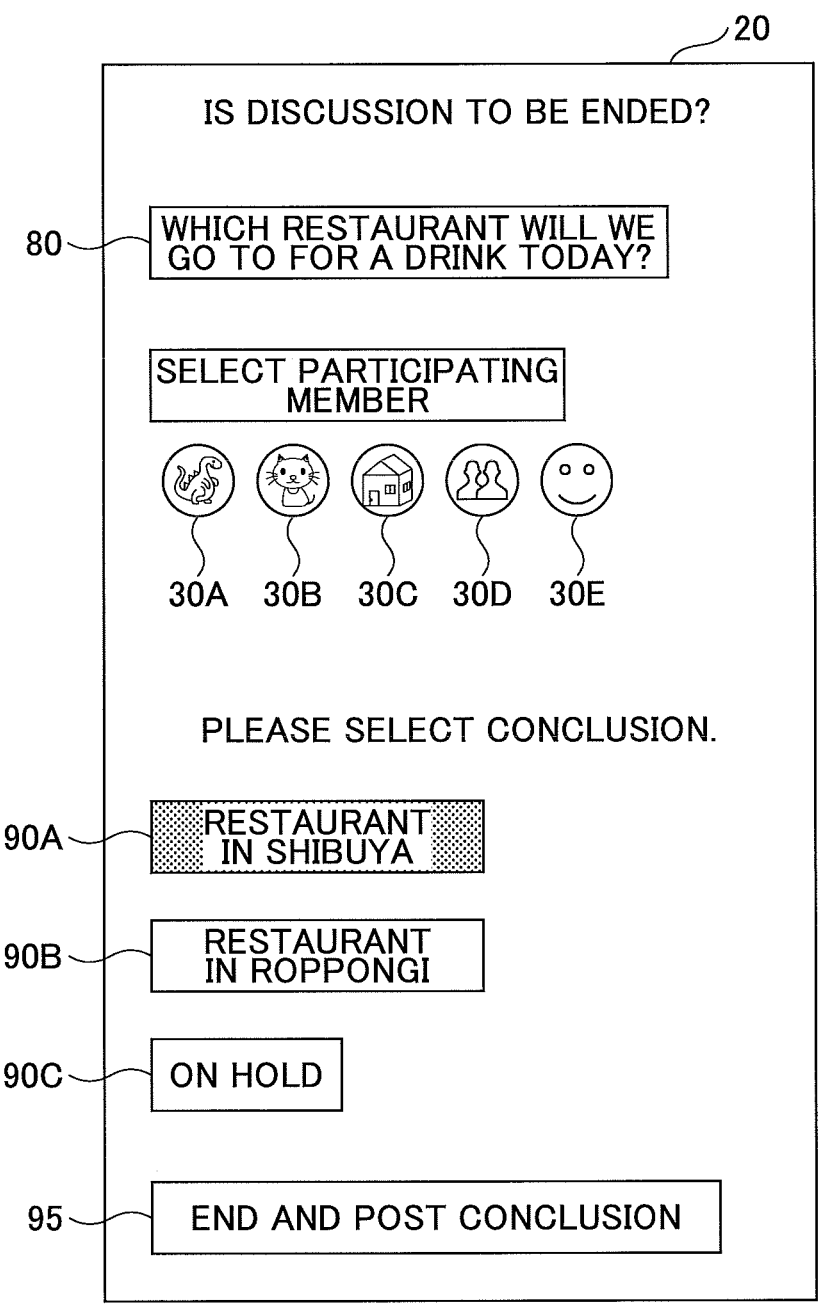
FIG. 30 illustrates an example of a display screen (confirmation of completion of discussion) when the discussion mode is executed in the terminal according to the second embodiment.

FIG. 30 illustrates an example of a display screen (confirmation of completion of discussion) when the discussion mode is executed in the terminal 20 according to the second embodiment.

When a predetermined condition is satisfied, the information processing server 10 may display the message of FIG. 30 at the terminal 20 of the user. This message may be displayed only at the terminal 20 of the organizer of the discussion mode.

When the input unit 230 receives a selection of an opinion group 90 to be the conclusion, or an operation of selecting a post button 95 of a conclusion from the user who is the organizer, the control unit 240 reports the discussion result to the information processing server 10 via the communication unit 210.

When the discussion result is received, the information processing server 10 reports the discussion result to the terminals 20 of users participating in the discussion mode.

Figure 31:
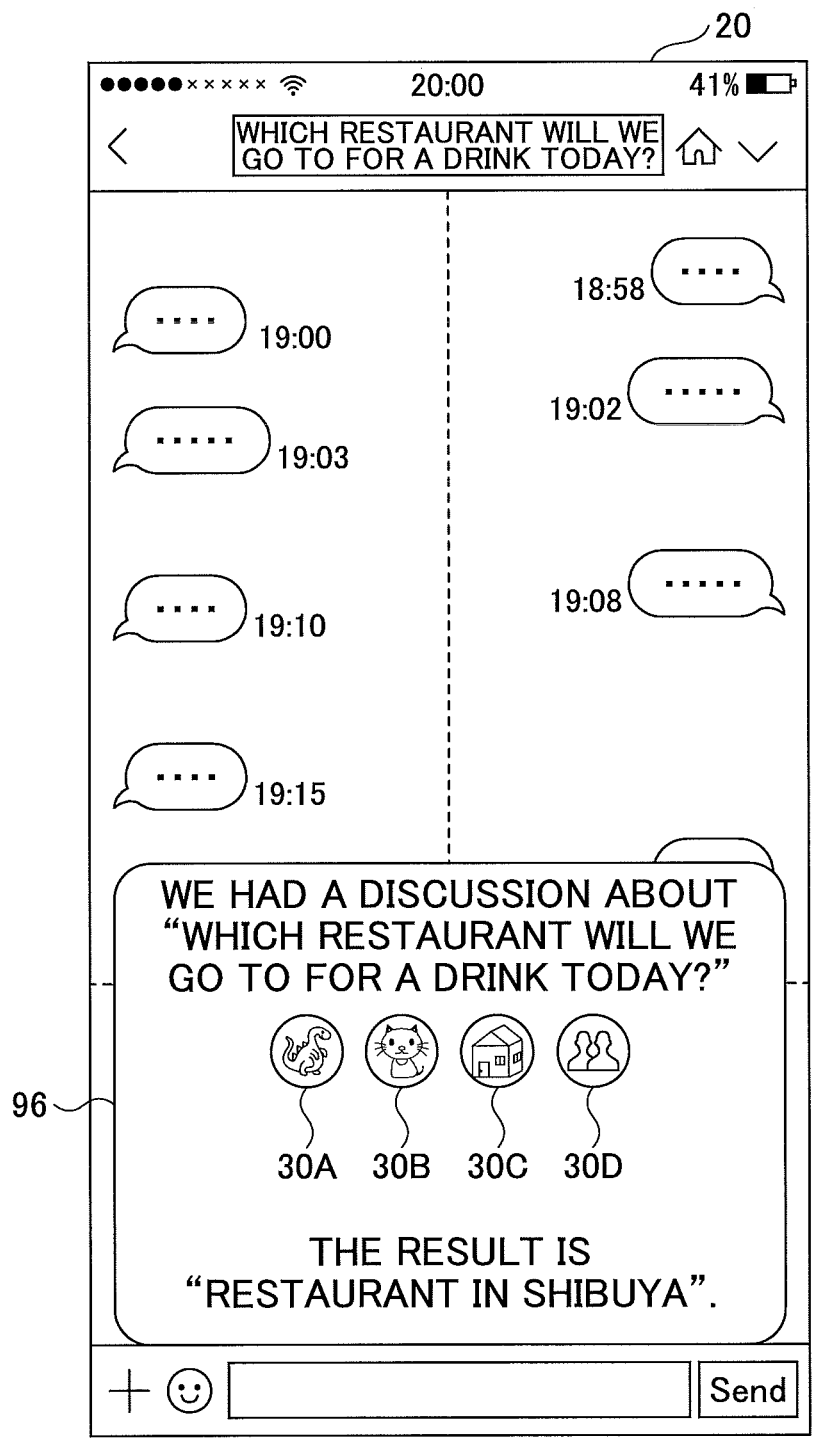
FIG. 31 illustrates an example of a display screen (report of conclusion) when the discussion mode is executed in the terminal according to the second embodiment.

FIG. 31 illustrates an example of a display screen (report of conclusion) when the discussion mode is executed in the terminal 20 according to the second embodiment.

When the information processing server 10 receives a selection of a conclusion from the terminal 20 of the user who is the organizer, the control unit 240 of the terminals 20 of users participating in the discussion mode displays a report 96 of a conclusion in a predetermined area of the display screen on the display unit 220. Note that when the terminal 20 of the user is locked or when the application of SNS is not activated, the control unit 240 may display the conclusion in the display screen by a pop-up.

(1. 5) Change of Discussion Title, etc.

In response to the input unit 230 detecting a predetermined operation of the user of the terminal 20, the control unit 240 may execute a process of changing, adding, deleting, etc., the discussion title 80 and the opinion group 90. For example, when a tap to the discussion title 80 is detected, a process of changing, adding, deleting, etc., the discussion title 80 may be activated. Furthermore, for example, when a tap to the opinion group 90 is detected, a process of changing, adding, deleting, etc., the opinion group 90 may be activated. Note that it is assumed that the discussion title 80 is changed in response to an operation of the user who is the organizer, and the opinion group 90 is changed in response to an operation by a participating member including the organizer.

When the input unit 230 receives a process of changing, adding, deleting, etc., information, the control unit 240 instructs the display unit 220 to display the information according to the received contents.

Figure 32A:
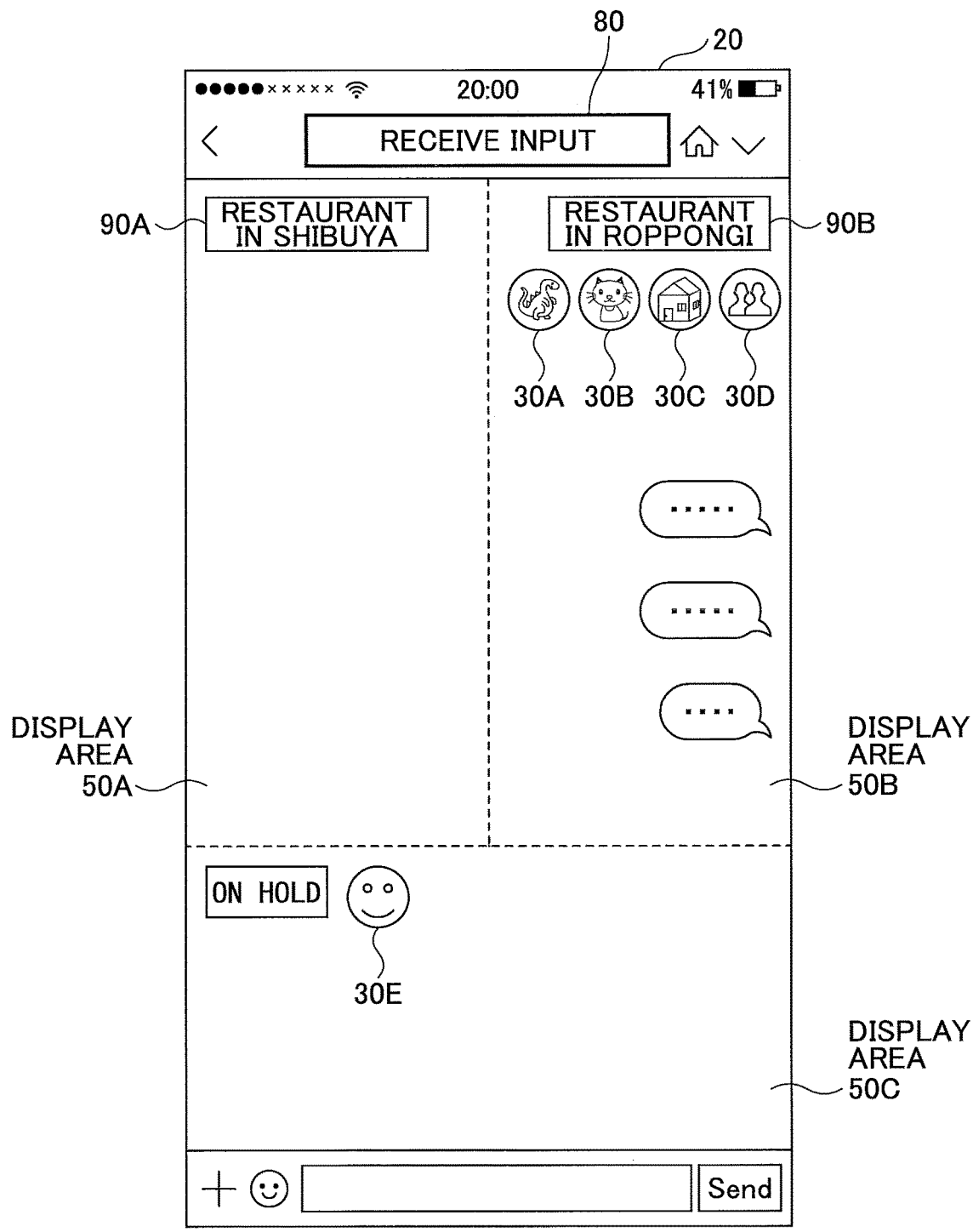
FIGS. 32A and 32B illustrate examples of display screens (change of discussion title) when the discussion mode is executed in the terminal according to the second embodiment.
Figure 32B:
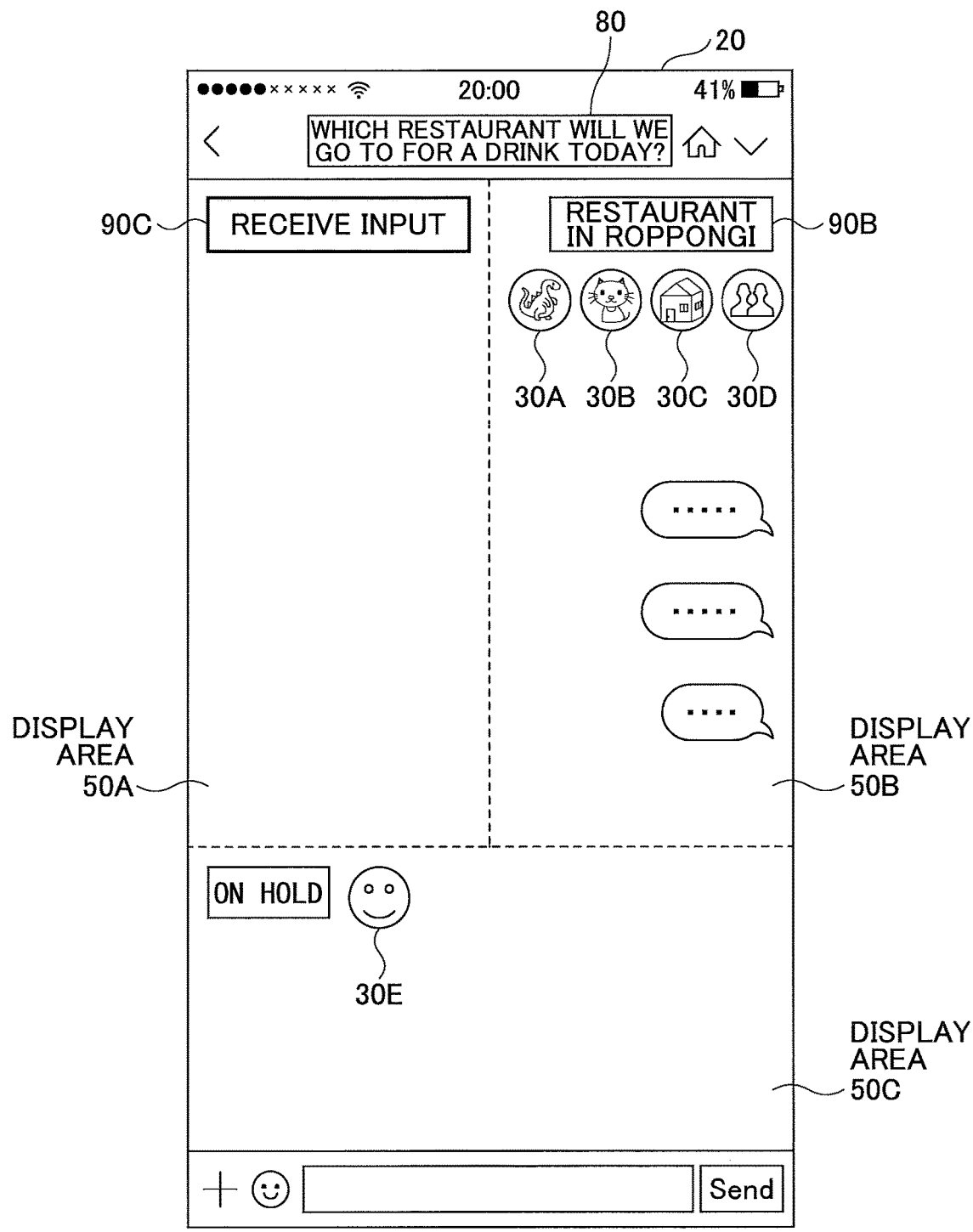

FIGS. 32A and 32B illustrate examples of display screens (change of discussion title 80) when the discussion mode is executed in the terminal 20 according to the second embodiment.

FIG. 32A illustrates the input unit 230 receiving an operation to change the discussion title 80. In response to input from the user, the discussion title 80 after the change is displayed on the display unit 220.

FIG. 32B illustrates the input unit 230 receiving an operation to change the opinion group 90. In response to input from the user, the opinion group 90 after the change is displayed on the display unit 220.

Note that the changed contents input to the terminal 20 are reported to the information processing server 10, and is reported from the information processing server 10 to the terminals 20 of the other users belonging to the group.

(1. 6) Report Status of Discussion Mode

As described above, the information processing server 10 reports the status of the discussion to the terminals 20 of users belonging to the group.

Figure 33A:
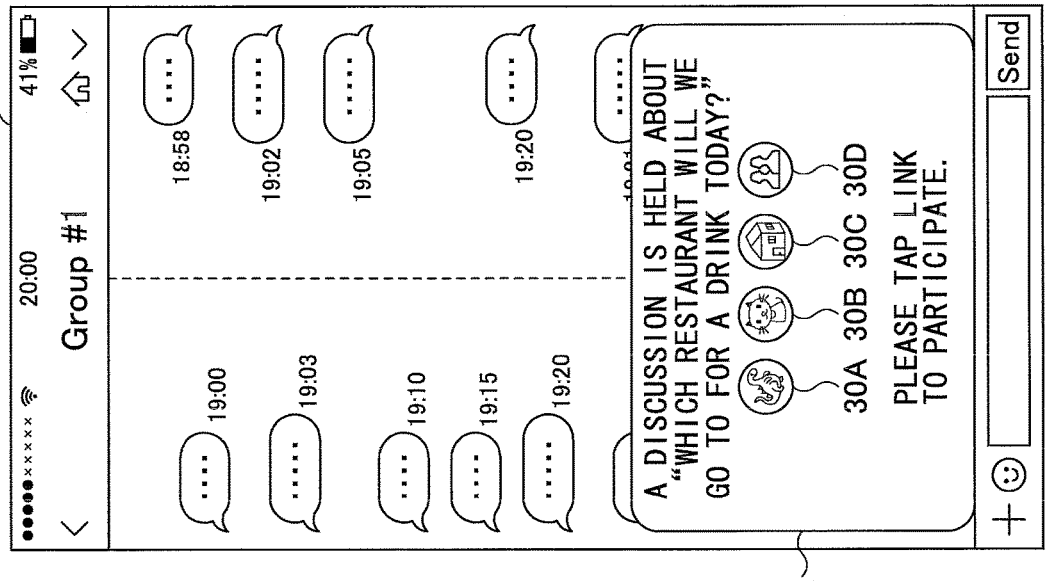
FIGS. 33A and 33B illustrate examples of display screens (report of status of discussion) when the discussion mode is executed in the terminal according to the second embodiment.
Figure 33B:
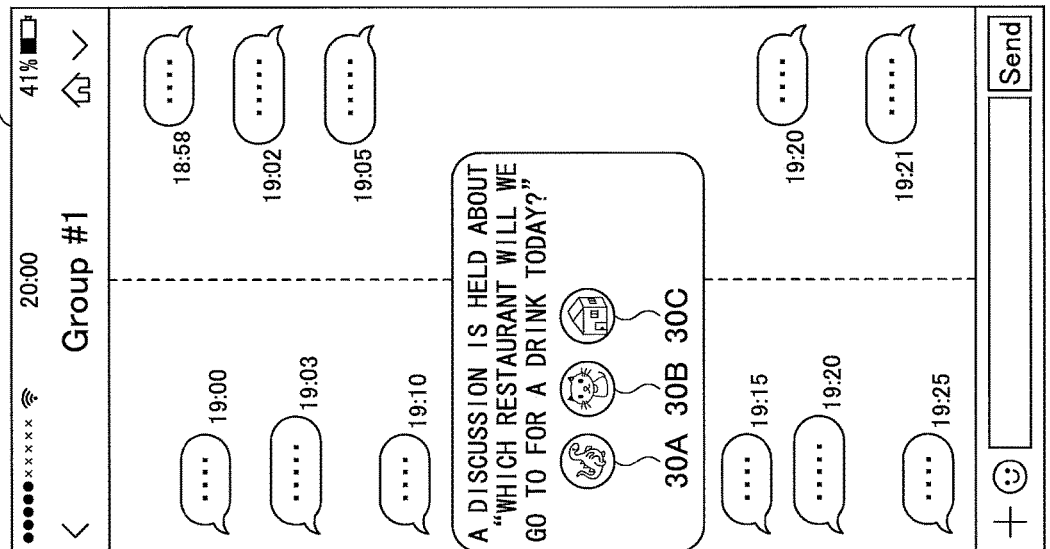

FIGS. 33A and 33B illustrate examples of display screens (report of status of discussion) when the discussion mode is executed in the terminal 20 according to the second embodiment.

Upon receiving a report from the information processing server 10, the display unit 220 of the terminal 20 displays the contents of the report. The information processing server 10 may send a report of the status of the discussion 97 only to a terminal 20 of a user who is not participating in the discussion. Note that a user who is not participating in the discussion is a user who belongs to the opinion group 90 "on hold", a user who has not posted a message 40, etc.

The report of the status of the discussion 97 may be displayed by a pop-up in the display screen of the chat as illustrated in FIG. 33A, or may be displayed at the bottom of the display screen as illustrated in FIG. 33B.

Modified Example 1

FIGS. 34A through 34C illustrate examples of display screens (display example) when the discussion mode is executed in the terminal 20 according to modified example 1.

In the second embodiment described above, icons 30 of users are displayed in display areas 50 assigned to the respective opinion groups 90; however, as illustrated in FIGS. 34A through 34C, the icons 30 of users in the discussion mode and the messages 40 posted by the users may be displayed in predetermined areas in the display screen (FIGS. 34A, 34B).

When the number of users in a group is a predetermined number, such as less than or equal to four users, it may be easier to understand the status of the discussion by displaying icons 30 and the messages 40 of the respective users. When the information is displayed as illustrated in FIGS. 34A through 34C, the display area 50 for messages 40 is limited, and therefore the control unit 240 of the terminal 20 implements control to limit the number of messages 40 of each user to be displayed to approximately two messages, or to limit the number of characters to be displayed.

Furthermore, as illustrated in FIG. 34C, upon receiving an operation from the user, the display unit 220 of the terminal 20 may provide a display area 50A for performing the discussion mode and a display area 50B for performing transmission and reception of regular chat messages 40, in the display screen.

Modified Example 2

As described above, the discussion mode may be displayed in a display screen for exchanging chat messages 40 in a regular group.

FIGS. 35A through 36C illustrate examples of display screens (tag setting) when the discussion mode is executed in the terminal 20 according to modified example 2.

FIG. 35A illustrates setting a tag of a discussion mode to a message 40A, when chat messages 40 are exchanged in a regular group. When the input unit 230 receives a predetermined operation from the user of the terminal 20 with respect to the message 40A, the display unit 220 displays a discussion mode setting menu 400 of the display screen. A predetermined operation from the user is, for example, selecting the message 40A for more than a predetermined time (long-pressing).

FIG. 35B illustrates a display screen displayed by the terminal 20, in response to the input unit 230 receiving an operation of selecting the discussion none setting menu 400, from a user. In response to the operation of selecting the discussion mode by the user of the terminal 20, a tag name input receiving menu 410 is displayed, for setting a tag name to the message 40A.

FIG. 35C illustrates a display screen displayed by the terminal 20, in response to the input unit 230 receiving an operation of selecting the tag name input receiving menu 410, from a user. In response to the input unit 230 receiving an operation of selecting the tag name input receiving menu 410 by the user of the terminal 20, the display unit 220 displays a display screen prompting to select a tag expressing any one of the discussion titles 80. In FIG. 35C, a display screen prompting the user to select any one of a discussion title 1, a discussion title 2, or a discussion title 3 (80A, 80B, 80C) is displayed.

Here, the input unit 230 may receive a new discussion title 80, from the user of the terminal 20.

FIG. 36A illustrates a display screen where the input unit 230 has received an operation of selecting the discussion title 80. FIG. 36A illustrates the discussion title 1 (80A) being selected. The selected discussion title 80 is displayed so as to be recognized as being selected, by being highlighted, colored, etc.

Furthermore, in a state where the discussion title 80 is selected, the terminal 20 can post a new message 40 with respect to the selected discussion title 80. In this case, the input unit 230 detects an operation of selecting an input field 430 by the user, and receives input of a message 40.

FIG. 36B illustrates a display screen where a tag of the discussion title 80 is set to the message 40. FIG. 36B illustrates a mark 440 set to the message 40A for which a tag is set, to indicate that a tag is set. It is also possible to indicate that the message 40 has a tag set, by highlighting, coloring, etc., the message 40

FIG. 36C illustrates a display screen of making a setting with respect to the message 40 for which a tag is set. In FIG. 36C, an operation menu 450 for making a setting such as "complete", "delete", "correct", "share", etc., with respect to the message 40A for which a tag is set.

When the input unit 230 receives a setting for a message 40 for which a tag is set from the user, the message 40 is displayed in accordance with the operation. For example, when an operation of "deleting" the tag is performed for the message 40, the message 40 will be displayed in the same manner as a regular message 40.

Note that the information storage unit 250 may store a setting of a tag set for at least one of a first message 40 and a last message 40 of the discussion title 80. Accordingly, the user is able to identify at least of the start and the end of messages 40 corresponding to the discussion title 80.

Modified Example 3

Figure 37:
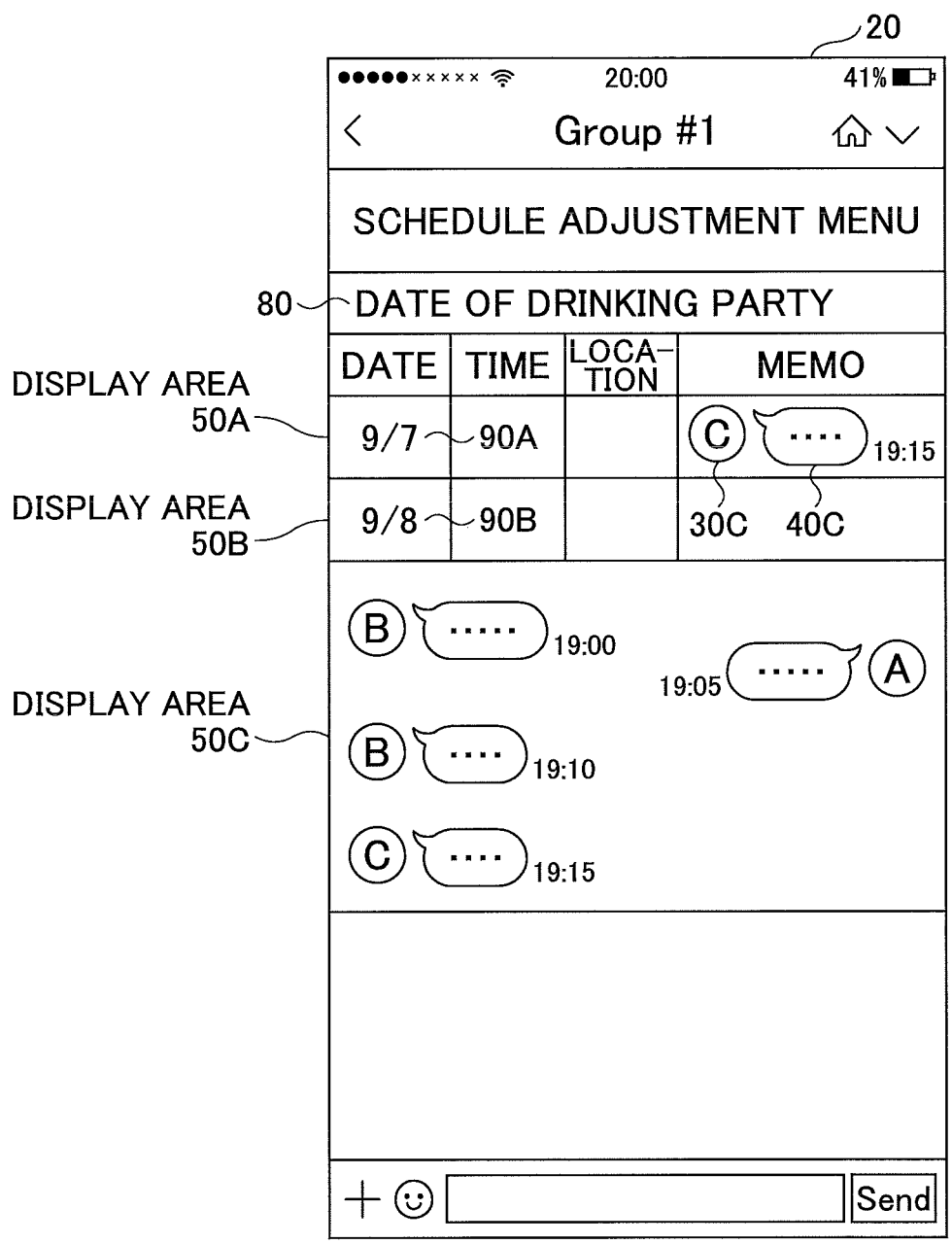
FIG. 37 illustrates an example of a display screen (schedule adjustment) when the discussion mode is executed in the terminal according to modified example 3.

FIG. 37 illustrates an example of a display screen (schedule adjustment) when the discussion mode is executed in the terminal 20 according to modified example 3 of the second embodiment.

In a menu of schedule adjustment of users a group, the discussion mode may be applied. In this case, the opinion groups 90 are candidate dates. Operations of the information processing server 10 and the terminal 20 are the same as those of the discussion mode described above.

FIG. 37 illustrates the adjustment of a date for the discussion title 80 "date of drinking party" by using the discussion mode among users of a group.

The display area 50A is assigned to the opinion group 90A "9/7", and the display area 50B is assigned to the opinion group 90B "9/8". In the display area 50S, regular chat messages 40 are displayed.

A user C has selected the opinion group 90A, and therefore the icon 30C of the user C and the message 40C posted by the user C are displayed in the display area 50A of the opinion group 90A.

Modified Example 4

In the discussion mode described in the second embodiment, it is also possible to change the display area 50 according to input from the user.

Figure 38A:
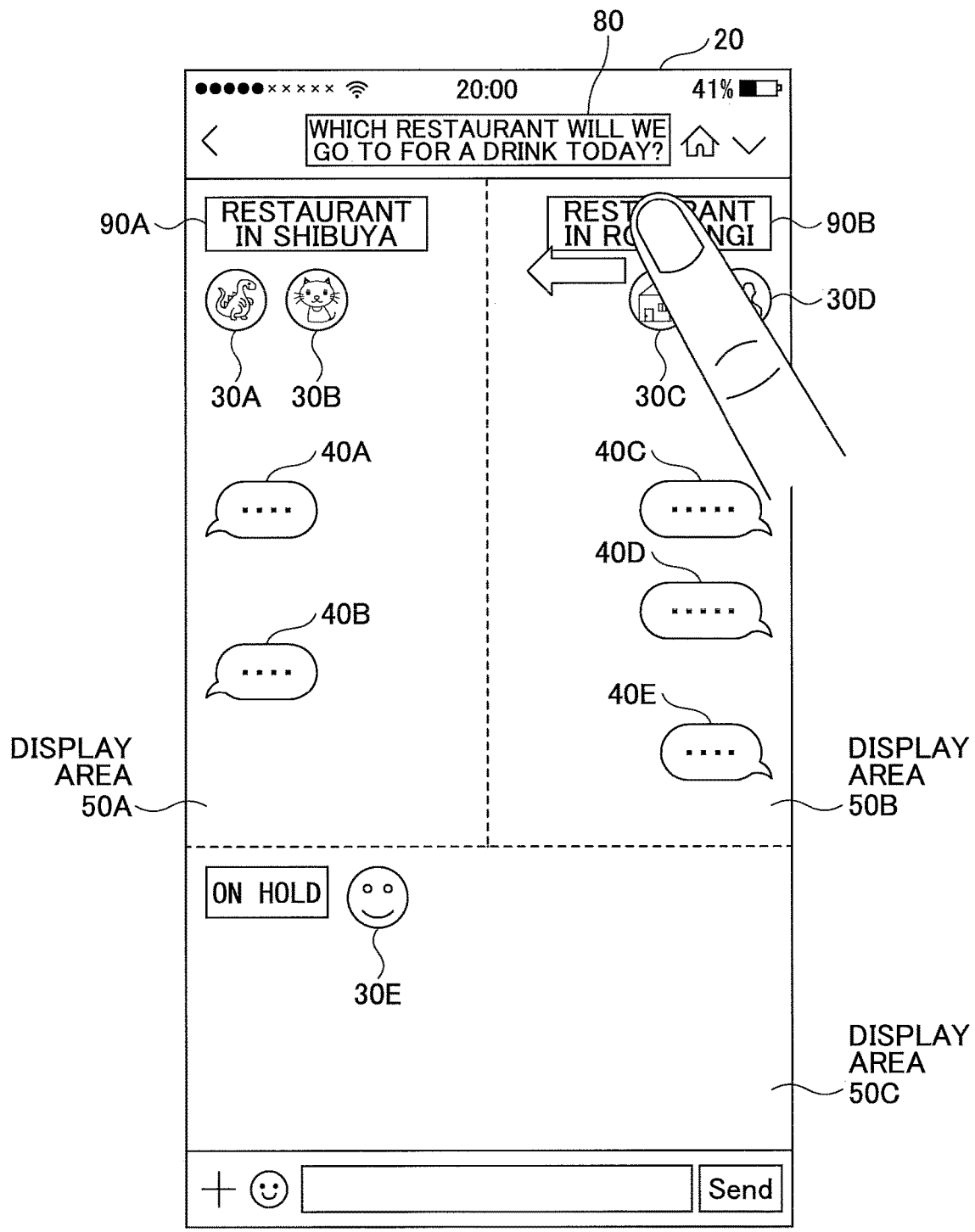
FIGS. 38A and 38B illustrate examples of display screens of the terminal according to modified example 4.
Figure 38B:
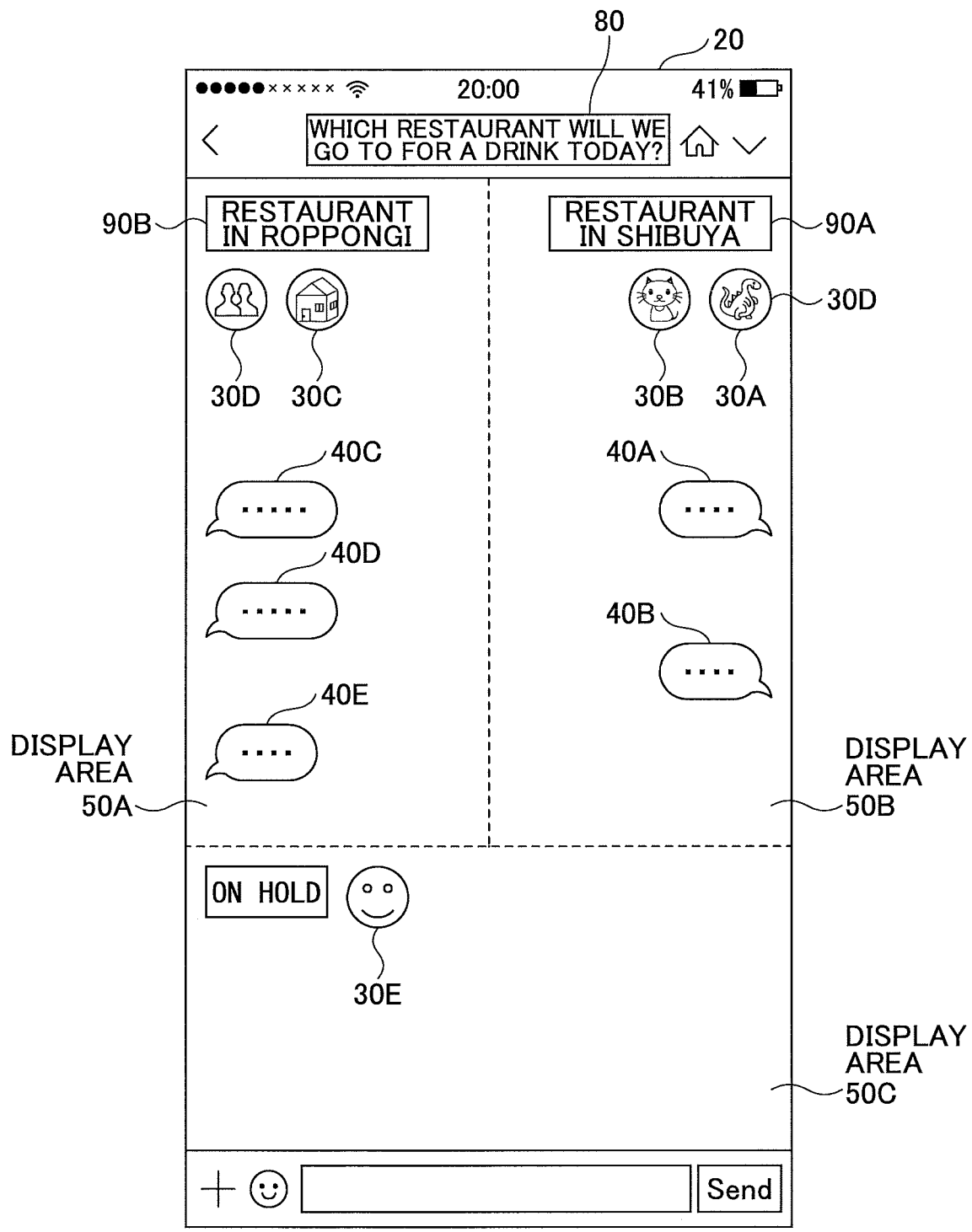

FIGS. 38A and 38B illustrate examples of display screens of the terminal 20 according to modified example 4.

In the default setting of the discussion mode, the opinion group 90B to which the user of the terminal 20 belongs, is displayed on the right side or at the top right area as in the case of the display area 50B of FIGS. 38A and 38B.

The terminal 20 may change the display area 50 of the opinion group 90B to which the user of the terminal 20 belongs, based on an instruction from the user.

FIG. 38A illustrates the opinion group 90B to which the user of the terminal 20 belongs being selected and swiped toward the display area 50A.

In response to the input unit 230 receiving an operation of swiping the opinion group 90B, the control unit 240 determines to change the display area 50 of the opinion group 90B, from the display area 50A to the display area 50B. The control unit 240 instructs the display unit 220 to display the information of users belonging to the opinion group 90B in the display area 50A, and to display the information of users belonging to the opinion group 90A in the display area 50B. Upon receiving this instruction, the display unit 220 changes the display of the display screen. FIG. 38B illustrates an example of a display of a display screen after the change.

As described above, even while the discussion mode is being executed, the terminal 20 can change the display area 50 of the information of a user, based on an instruction from a user.

In the display screen in which the discussion mode is executed according to the second embodiment, it is possible to implement all of the operations of changing the display area 50 according to the first embodiment.

Note that the display area 50 may be changed by executing a predetermined operation other than swiping the icon 30.

Modified Example 5

Figure 39:
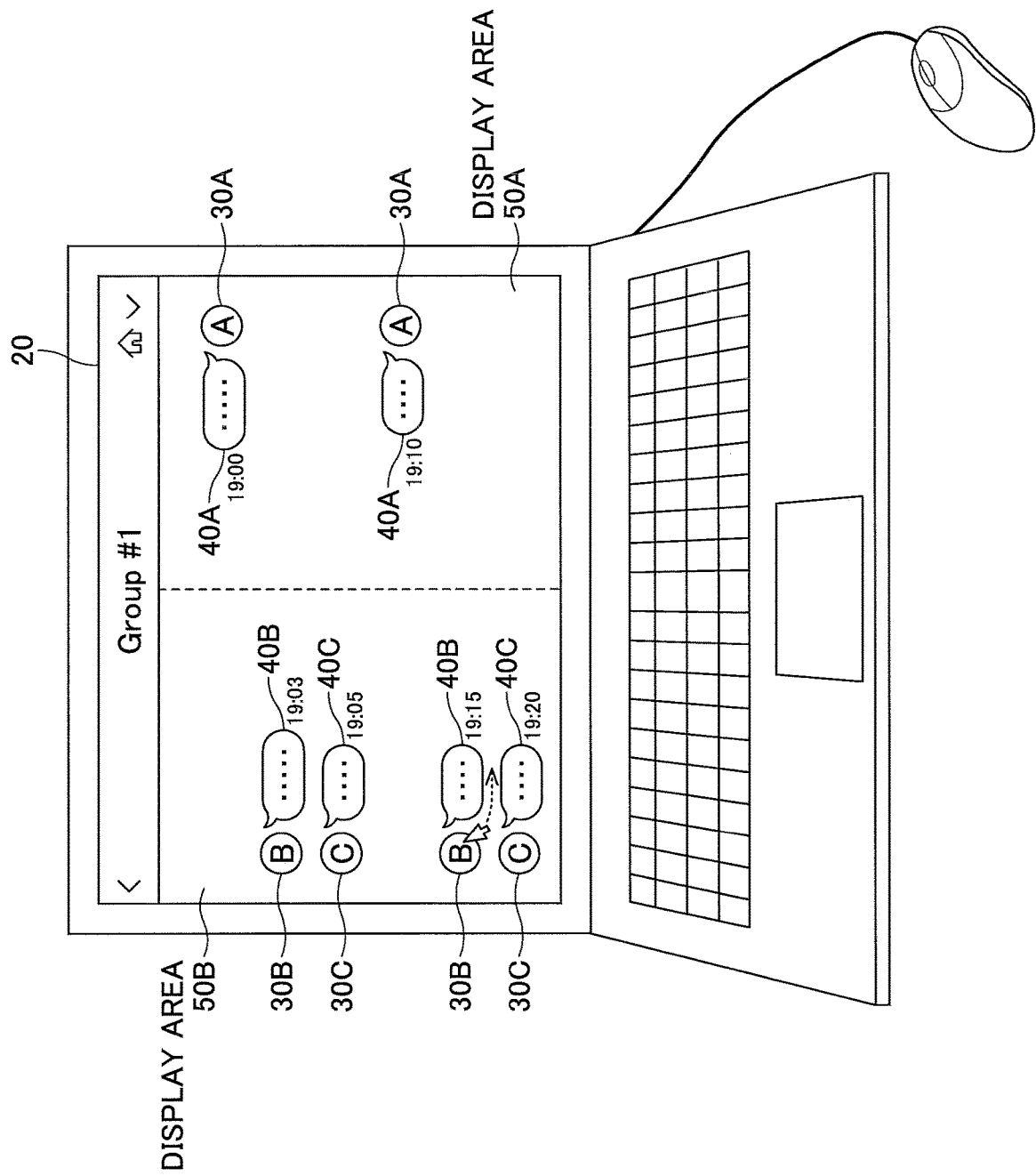
FIG. 39 illustrates an example of changing the display area according to modified example 5.

FIG. 39 illustrates an example of changing the display area 50 according to modified example 5.

In the above embodiments, descriptions are mainly given of cases where the terminal 20 is a smartphone, etc., having a touch panel; however, the present embodiment is also applicable to cases where the terminal 20 does not have a touch panel.

FIG. 39 illustrates using a mouse to select an icon 30B of a user B, and changing the display area 50 of the user B from the display area 50A to the display area 50B, in a case where the terminal 20 is a PC.

In response to the icon 30B being selected by being clicked, and being moved by an operation of drag-and-drop, the display position of the information of the user B is changed from the display area 50B to the display area 50A.

Note that when the terminal 20 is a PC, the display area 50 may be changed by a predetermined operation other than drag-and-drop.

Modified Example 4

With reference to FIGS. 40A through 41B, modified example 6 is described.

The input unit 230 of the terminal 20 receives, from the user of the terminal 20, a display setting with respect to another user. When the input unit 230 receives a display setting with respect to another user, the control unit 240 stores the display setting in the information storage unit 250. Furthermore, the control unit 240 reports the display setting of another user to the information processing server 10 via the communication unit 210. Here, the display setting may be expressed as registration of a favorite user.

In response to the communication unit 110 of the information processing server 10 receiving a report of the display setting, the control unit 120 stores the display setting in the information storage unit 130.

When the communication unit 210 receives information of another user from the information processing server 10, the control unit 240 refers to the information storage unit 250 to confirm whether there is a display setting for the other user. When there is a display setting for another user, the control unit 240 instructs the display unit 220 to display the information of the other user, in a mode such that the user of the terminal 20 can recognize that there is a display setting. The display unit 220 displays the information of the other user according to the instruction.

Note that when the communication unit 110 of the information processing server 10 sends the information of another user to the terminal 20, an indication that there is a display setting of another user may be included the information. In this case, the terminal 20 determines the display format of the information of another user, based on contents received from the information processing server 10.

Figure 40B:
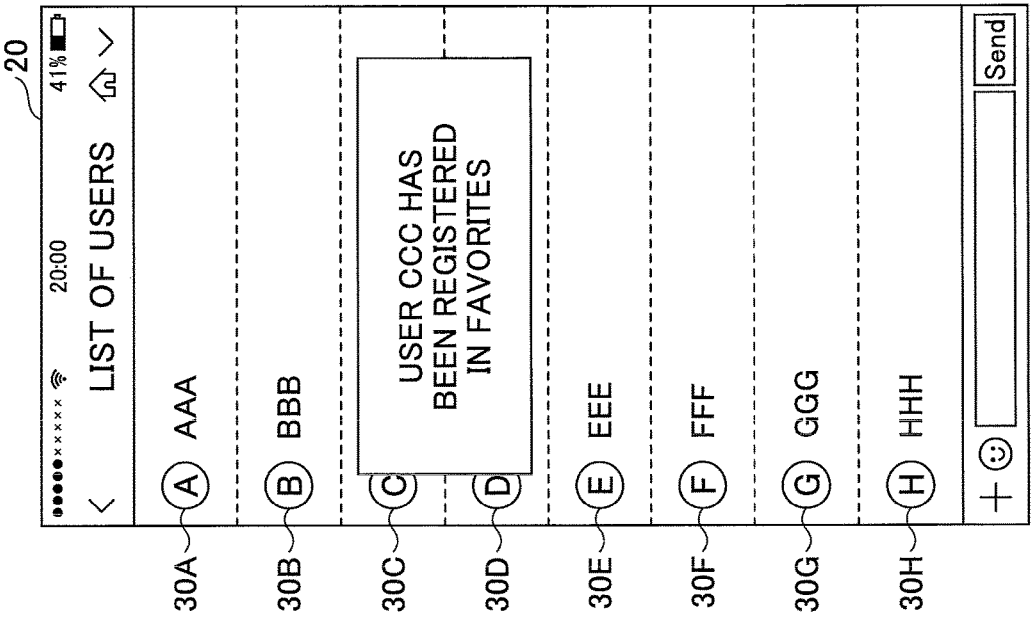
FIGS. 40A and 40B illustrate an example of receiving a display setting according to modified example 6.
Figure 40A:
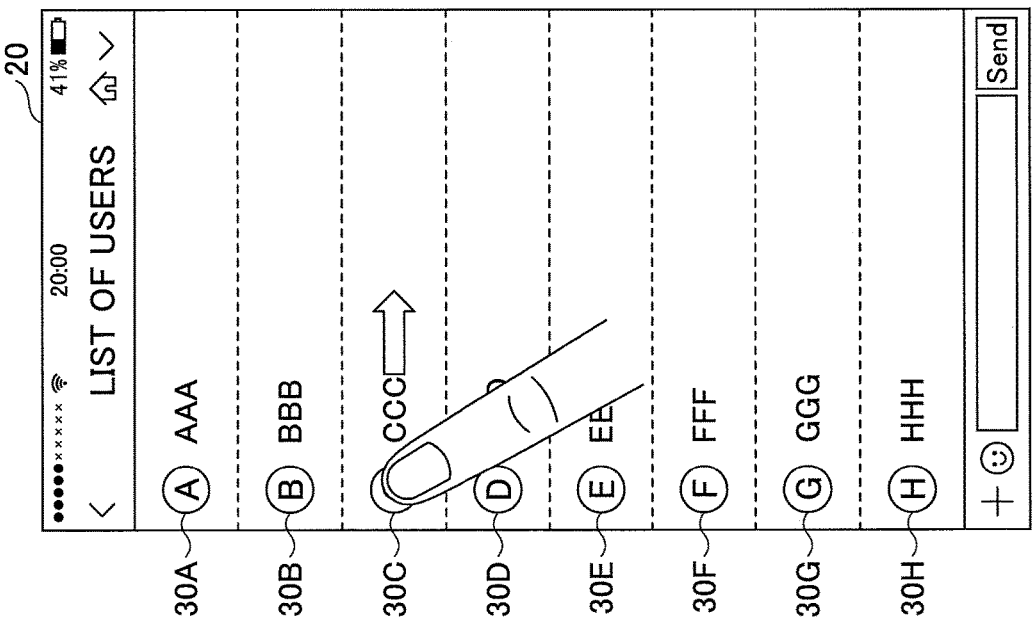

FIGS. 40A and 40B illustrate an example of receiving a display setting according to modification 6.

FIGS. 40A and 40B illustrate the icon 30C of a user "CCC" being selected and being "registered in favorites". For example, as illustrated in FIG. 40A, the input unit 230 receives an operation of swiping the icon 30C in the right direction. In response to receiving the swiping operation, as illustrated in FIG. 40B, the display unit 220 displays a message that reads "user CCC has been registered in favorites". Then, the control unit 240 instructs the information storage unit 250 to store that user "CCC" has been registered in favorites.

Figure 41B:
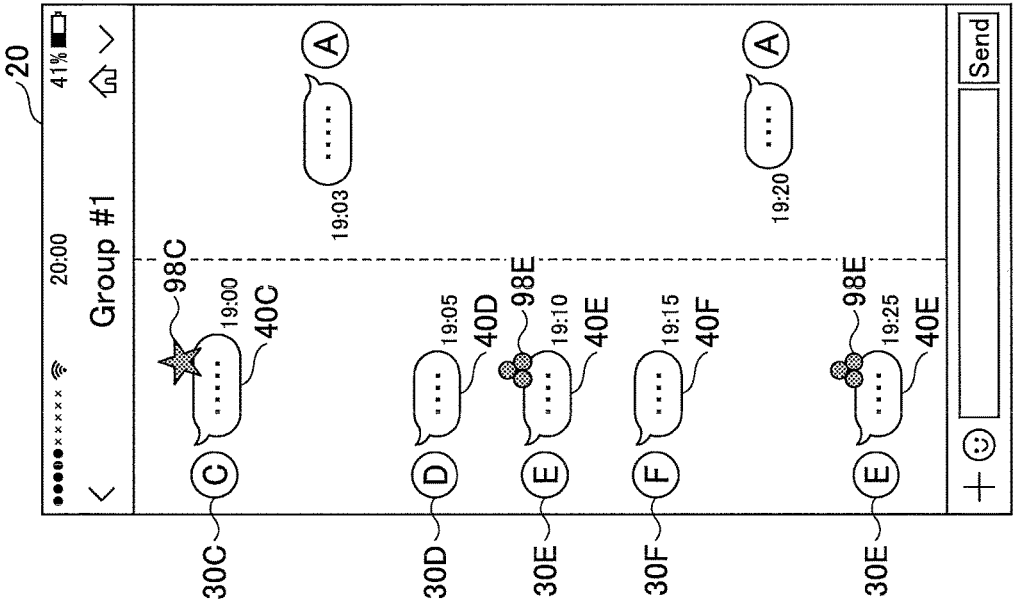
FIGS. 41A and 41B illustrate examples of display modes of information of users according to modified example 6.
Figure 41A:
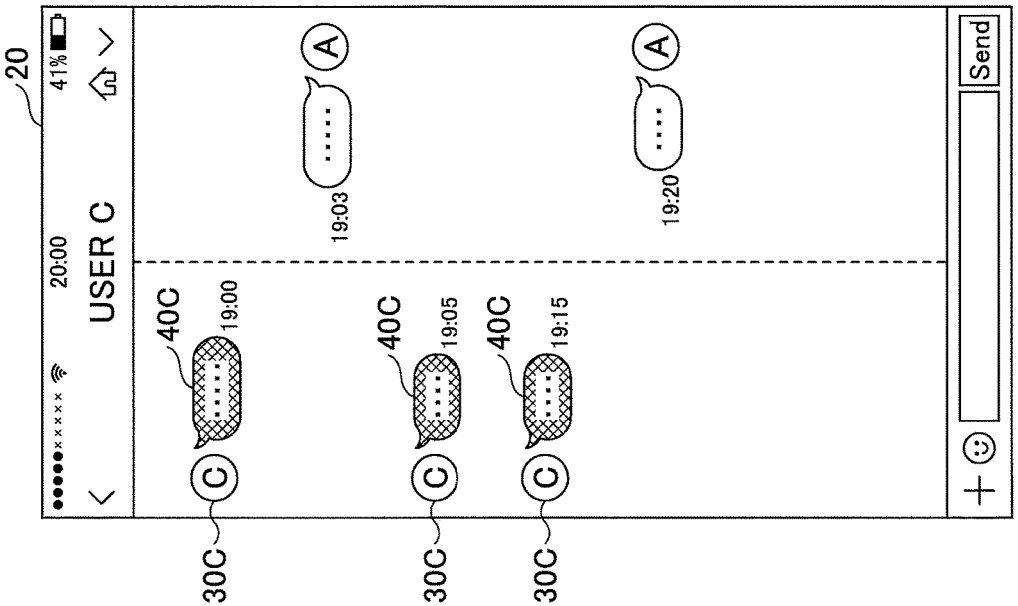

FIGS. 41A and 41B illustrate an example of a display mode of information of a user according to modified example 6. The information (message 40 in FIGS. 41A and 41B) of a user who is registered in favorites is displayed in a display mode so as to be recognized by the user A of the terminal 20. For example, the information of the user who is registered in favorites may be displayed in a different color than usual, or may be displayed to have different background gradation than usual, or may be displayed together with a mark indicating that the user is registered in favorites. FIG. 41B illustrates an example of a screen display when one-on-one chat messages are executed between the user A of the terminal 20A and the user C. Here, it is assumed that the user C is registered in favorites. In the example of FIG. 41A, the user C is registered in favorites, and therefore the message 40C of the user C is displayed in a display mode such that the user A can recognize that the user C is registered in favorites. FIG. 41A illustrates an example where the messages 40C of the user C are displayed in a different color than usual.

FIG. 41B illustrates an example of a screen display when chat messages are executed between the user A of the terminal 20 and a plurality of users. Here, it is assumed that the user C and the user E are registered in favorites. FIG. 4B illustrates an example where the user C and the user F are registered in favorites, and therefore the message 40C of the user C and the message 403 of the user E are displayed together with a mark 98.

<Other>

The information processing server 10 is an example of an information processing apparatus. The functions of the information processing server 10 may be implemented in other hardware elements. In this case, the functions implemented in other hardware elements cooperate with each other to realize the functions of the information processing server 10. For example, the information processing server 10 may acquire information from the information storage unit 130 implemented in another device, and realize the above operations.

The control unit 120 is an example of a display control unit. Furthermore, the communication unit 210 is an example of a receiving unit and a reporting unit.

A storage medium storing program codes of software for realizing the functions of the above-described embodiments may be supplied to the information processing server 10 and the terminal 20. Then, the above embodiments may be achieved by having the information processing server 10 and the terminal 20 read the program codes stored in the storage medium and executing the program codes. In this case, the storage medium stores a program for causing the information processing server 10 and the terminal 20 execute a control method of displaying information of users in a social network service in a chronological order.

Specifically, the storage medium stores a program to be executed by the terminal 20, the program causing the terminal 20 to execute a step of receiving a theme from the information processing server 10; a step of receiving, from the information processing server 10, an option selected at another terminal 20 with respect to the theme; and a step of displaying, in display areas provided for the respective options, the options and user information regarding the users who selected the options.

Furthermore, the storage medium stores a program to be executed by the information processing server 10, the program causing the information processing server 10 to execute a step of reporting a theme to two or more terminals 20, and receiving, from the terminal 20, an option selected at the terminal 20 with respect to the theme; and a step of controlling the terminal 20 to display, in display areas provided for the respective options, the options and user information with respect to the users who selected the options.

Then, the program codes read from the storage medium realize the functions according to the above-described embodiments.

Furthermore, a computer device executes the program codes that have been read, and therefore not only the functions according to the above-described embodiments realized. According to instructions of the program codes, an operating system (OS), etc., operating in the computer device may execute part of or all of the actual processes. Furthermore, the functions according to the above-described embodiments may be realized by these processes.

According to one embodiment, a display control technique is provided, by which the present status of the discussion can be appropriately recognized when messages are exchanged regarding a predetermined theme among a plurality of users.

The present invention is not limited to the specific embodiments described herein, and variations and modifications may be made without departing from the spirit and scope of the present invention.

The present application is based on and claims the benefit of priority of Japanese Priority Patent Application No. 2015-206660, filed on Oct. 20, 2015, the entire contents of which are hereby incorporated herein by reference.

What is claimed is:

1. A display controlling method for performing a process executed by one or more processors included in a first terminal, the method comprising:
   sending, by using the one or more processors, to two or more second user terminals, (i) a theme for a group, (ii) a first selection option based on the theme, and (iii) a second selection option based on the theme, members of the group including users of the two or more second user terminals and a user of the first user terminal;
   displaying (i) the first selection option in a first display area and (ii) the second selection option in a second display area, which is different from the first display area, the first display area and the second display area being on a display of the first terminal;
   receiving, by using the one or more processors, (i) a first message from a first-second user terminal selecting the first selection option and (ii) a second message from a second-second user terminal selecting the second selection option, the first-second user terminal and the second-second user terminal being among the two or more second user terminals;
   displaying (i) the first message in a third display area and (ii) the second message in a fourth display area of the first terminal;
   sending, by using the one or more processors, to the two or more second user terminals, information related to a determined selection option among a plurality of selection options including at least the first selection option and the second selection option determined based on the first message from the first-second user terminal selecting the first selection option and the second message from the second-second user terminal selecting the second selection option; and
   displaying the information related to the determined selection option on a fifth display area of the display of the first terminal.

2. The display controlling method according to claim 1, wherein
   the displaying includes displaying an information item indicating a corresponding user in the display.

3. The display controlling method according to claim 1, wherein
   the first and second messages are displayed in chronological order in the display.

4. The display controlling method according to claim 3, further comprising:
   setting a tag indicating that the first message or the second message is related to the theme.

5. The display controlling method according to claim 1 further comprising:

receiving a change request from the first terminal for selecting the second selection option; and changing the display such that the first message is displayed in the second display area.

6. The display controlling method according to claim 1, further comprising:

before the second message and the second selection option are received, displaying an information item indicating a user of a third-second user terminal from among the two or more second user terminals in a selection awaiting area, the information item indicating that a-any selection option has not yet been received.

7. The display controlling method according to claim 1, further comprising:

displaying, on the display, a report prompting to set the theme and either one of the first selection option or the second selection option with respect to the theme at the two or more second user terminals, based on messages being sent and received among the two or more second user terminals at a frequency exceeding a threshold.

8. The display controlling method according to claim 1, further comprising:

reporting a content of one of the first and second selection options as a conclusion with respect to the theme to two or more selected second user terminals including the first-second user terminal and the second-second user terminal, wherein based on selections of the same one of the first and second selection options being received from greater than or equal to a ratio of the two or more selected second user terminals among the two or more second user terminals from which the selections of the first and second selection options are received, the same one of the first and second selection options is reported as the conclusion.

9. A first user terminal comprising:

a processor configured to execute a process including, sending, to two or more second user terminals, (i) a theme for a group, (ii) a first selection option based on the theme, and (iii) a second selection option based on the theme, members of the group including users of the two or more second user terminals and a user of the first user terminal, displaying (i) the first selection option in a first display area and (ii) the second selection option in a second display area, which is different from the first display area, the first display area and the second display area being on a display of the first user terminal, receiving (i) a first message from a first-second user terminal selecting the first selection option and (ii) a second message from a second-second user terminal selecting the second selection option, the first-second user terminal and the second-second user terminal being among the two or more second user terminals, displaying (i) the first message in the first a third display area and (ii) the second message in a fourth display area of the first terminal, sending to the two or more second user terminals, information related to a determined selection option among a plurality of selection options including at least the first selection option and the second selection option determined based on the first message from the first-second user terminal selecting the first selection option and the second message from the second-second user terminal selecting the second selection option, and displaying the information related to the determined selection option on a fifth display area of the display of the first terminal.

10. A non-transitory computer-readable recording medium storing a program that causes a computer including a processor to execute a method performed in a first user terminal, the method comprising:

sending to two or more second user terminals, (i) a theme for a group, (ii) a first selection option based on the theme, and (iii) a second selection option based on the theme, members of the group including users of the two or more second user terminals and a user of the first user terminal;

displaying (i) the first selection option in a first display area and (ii) the second selection option in a second display area, which is different from the first display area, the first display area and the second display area being on a display of the first terminal;

receiving (i) a first message from a first-second user terminal selecting the first selection option and (ii) a second message from a second-second user terminal selecting the second selection option, the first-second user terminal and the second-second user terminal being among the two or more second user terminals;

displaying (i) the first message in a third display area and (ii) the second message in a fourth display area of the first terminal;

sending to the two or more second user terminals, information related to a determined selection option among a plurality of selection options including at least the first selection option and the second selection option determined based on the first message from the first-second user terminal selecting the first selection option and the second message from the second-second user terminal selecting the second selection option; and displaying the information related to the determined selection option on a fifth display area of the display of the first terminal.

11. The display controlling method according to claim 1, further comprising:

receiving a third message from a third-second user terminal selecting the first selection option, the third-second user terminal being among the two or more second user terminals; and displaying the third message in the third display area.

12. The display controlling method according to claim 11, wherein the first message and the third message are displayed in the third display area in an order of receipt.

13. The display controlling method according to claim 1, wherein the displaying includes displaying the first selection option in the first display area and the first message in the third display area of each of the two or more second user terminals simultaneously; and displaying the second selection option in the second display area and the second message in the fourth display area of each of the two or more user terminals simultaneously.

14. The display controlling method according to claim 1, wherein the displaying includes displaying first information indicating a user of the first-second user terminal in the first display area and second information indicating a user of the second-second user terminal in the second display area.

15. The display controlling method according to claim 1, wherein
- (i) the theme, (ii) the first selection option and (iii) the second selection option are sent to the two or more second user terminals through a server.

16. The display controlling method according to claim 1, wherein the first message in the third display area and the second message in the fourth display area are displayed simultaneously.

17. The display controlling method according to claim 14, wherein
- the displaying includes displaying a third selection option which indicates a holding state, the holding state indicating that neither the first selection option nor the second selection option is selected, the third selection option being in another display area which is different from the first display area and the second display area; and
- the displaying includes displaying third information indicating a user of a third-second terminal in the another display area, the third-second terminal being among the two or more second user terminals.

* * * * *